(12) United States Patent
Isono et al.

(10) Patent No.: US 9,358,891 B2
(45) Date of Patent: Jun. 7, 2016

(54) VEHICLE BRAKE SYSTEM

(75) Inventors: Hiroshi Isono, Mishima (JP); Yasuji Mizutani, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 60 days.

(21) Appl. No.: 14/399,727

(22) PCT Filed: May 21, 2012

(86) PCT No.: PCT/JP2012/062961
§ 371 (c)(1),
(2), (4) Date: Nov. 7, 2014

(87) PCT Pub. No.: WO2013/175556
PCT Pub. Date: Nov. 28, 2013

(65) Prior Publication Data
US 2015/0130264 A1 May 14, 2015

(51) Int. Cl.
*B60T 13/68* (2006.01)
*B60L 7/18* (2006.01)
(Continued)

(52) U.S. Cl.
CPC ... *B60L 7/18* (2013.01); *B60T 1/10* (2013.01); *B60T 7/042* (2013.01); *B60T 8/17* (2013.01); *B60T 8/34* (2013.01); *B60T 11/103* (2013.01); *B60T 11/16* (2013.01); *B60T 13/146* (2013.01); *B60T 13/662* (2013.01); *B60T 13/686* (2013.01); *B60T 2270/604* (2013.01)

(58) Field of Classification Search
CPC ....... B60T 7/042; B60T 13/66; B60T 13/167; B60T 11/16; B60T 11/26; B60T 11/224; F16K 11/06

USPC ............... 60/533, 547.1–547.3, 548–590; 188/358–360; 303/114.1
See application file for complete search history.

(56) References Cited

U.S. PATENT DOCUMENTS

| 2008/0257670 A1 | 10/2008 | Drumm et al. |
| 2012/0144822 A1* | 6/2012 | Isono ................ B60T 7/042 60/533 |

(Continued)

FOREIGN PATENT DOCUMENTS

| JP | 2008-24098 | 2/2008 |
| JP | 2009-507714 | 2/2009 |

(Continued)

OTHER PUBLICATIONS

International Search Report issued Jul. 31, 2012, in PCT/JP2012/062961, filed May 21, 2012.

*Primary Examiner* — Christopher Schwartz
(74) *Attorney, Agent, or Firm* — Oblon, McClelland, Maier & Neustadt, L.L.P

(57) ABSTRACT

A vehicle brake system for braking a vehicle including a braking-mode switching mechanism configured to selectively effectuate, depending upon situations of the vehicle brake system, one of (A) a regulated-pressure-dependent braking mode in which is generated a regulated-pressure-dependent braking force having a magnitude that depends on a regulated pressure of a working fluid and (B) a braking mode depending on an operation force and the regulated pressure in which are generated both of an operation-force-dependent braking force having a magnitude that depends on the operation force by a driver and the regulated-pressure-dependent braking force.

19 Claims, 24 Drawing Sheets

(51) Int. Cl.
  *B60T 8/17* (2006.01)
  *B60T 8/34* (2006.01)
  *B60T 11/10* (2006.01)
  *B60T 11/16* (2006.01)
  *B60T 1/10* (2006.01)
  *B60T 7/04* (2006.01)
  *B60T 13/14* (2006.01)
  *B60T 13/66* (2006.01)

(56) References Cited

U.S. PATENT DOCUMENTS

2014/0345271 A1* 11/2014 Isono .................. B60T 13/66 60/533

2015/0175141 A1* 6/2015 Isono .................. B60T 7/042 60/533
2015/0251643 A1* 9/2015 Isono .................. B60T 7/042 60/588
2015/0285273 A1* 10/2015 Isono .................. B60T 11/18 60/533
2015/0291139 A1* 10/2015 Isono .................. B60T 7/042 60/533
2016/0052498 A1* 2/2016 Isono .................. B60T 13/686 303/115.2

FOREIGN PATENT DOCUMENTS

JP 2011-51400 3/2011
JP 2011-156998 8/2011

* cited by examiner $ST_0$ = NON-BRAKING STATE
$ST_1$ = REGENERATIVE-BRAKING-FORCE-DEPENDENT BRAKING STATE
$ST_2$ = BRAKING STATE DEPENDING ON OPERATION FORCE AND REGULATED PRESSURE
$ST_3$ = BRAKING STATE DEPENDING ON REGULATED PRESSURE AND REGENERATIVE BRAKING FORCE
$ST_4$ = BRAKING STATE DEPENDING ON OPERATION FORCE, REGULATED PRESSURE, AND REGENERATIVE BRAKING FORCE $ST_0$ = NON-BRAKING STATE
$ST_1$ = REGENERATIVE-BRAKING-FORCE-DEPENDENT BRAKING STATE
$ST_2$ = BRAKING STATE DEPENDING ON OPERATION FORCE AND REGULATED PRESSURE
$ST_3$ = BRAKING STATE DEPENDING ON REGULATED PRESSURE AND REGENERATIVE BRAKING FORCE
$ST_4$ = BRAKING STATE DEPENDING ON OPERATION FORCE, REGULATED PRESSURE, AND REGENERATIVE BRAKING FORCE $ST_0$ = NON-BRAKING STATE
$ST_1$ = REGENERATIVE-BRAKING-FORCE-DEPENDENT BRAKING STATE
$ST_2$ = BRAKING STATE DEPENDING ON OPERATION FORCE AND REGULATED PRESSURE
$ST_3$ = BRAKING STATE DEPENDING ON REGULATED PRESSURE AND REGENERATIVE BRAKING FORCE
$ST_4$ = BRAKING STATE DEPENDING ON OPERATION FORCE, REGULATED PRESSURE, AND REGENERATIVE BRAKING FORCE

VEHICLE BRAKE SYSTEM

TECHNICAL FIELD

The present invention relates to a vehicle brake system and a pressure regulator included therein.

BACKGROUND ART

In a vehicle brake system for braking or stopping a vehicle, there is widely used a hydraulic brake system, namely, a brake system configured to restrain or stop rotation of wheels by a frictional force generated based on a pressure of a pressurized working fluid, to thereby brake or stop the vehicle. In recent years, there has been used, in hybrid vehicles and electric vehicles, for instance, a regenerative brake system, namely, a brake system in which a motor utilized for driving wheels is driven by rotation of the wheels and a resistance generated when the motor is driven is utilized for braking or stopping the vehicle while regenerating electricity. However, even in vehicles equipped with the regenerative brake system, it is sometimes difficult to obtain a sufficient braking force only by the regenerative brake system. Accordingly, in general, such vehicles are equipped with a brake system in which the hydraulic brake system and the regenerative brake system are combined, as disclosed in the following Patent Literature.

CITATION LIST

Patent Literature

Patent Literature 1: JP-A-2011-051400

DISCLOSURE OF INVENTION

(A) Summary of Invention

In the vehicle brake system in which the hydraulic brake system and a brake system other the hydraulic brake system are combined, such as the disclosed brake system, it is possible, in general, to generate a braking force to be required only by one of the two brake systems or by both of the two brake systems. Where the braking force is generated by the two brake systems, it is possible to change a ratio between the braking force to be generated by one of the two brake systems and the braking force to be generated by the other of the two brake systems. Accordingly, the vehicle brake system in which the hydraulic brake system and the regenerative brake system are combined is relatively complicated and has a plenty of room for improvement. It is therefore possible to enhance the utility of the vehicle brake system by making some modifications. The present invention has been developed in the light of such situations. It is therefore an object of the invention to enhance the utility of the vehicle brake system.

To achieve the object indicated above, a vehicle brake system according to a first aspect of the invention has a hydraulic brake system having a braking-mode switching mechanism configured to selectively effectuate one of (A) a regulated-pressure-dependent braking mode in which the hydraulic brake system generates a braking force having a magnitude that depends on a regulated pressure that is a pressure of a working fluid supplied from a pressure regulator device, without substantially depending on an operation force applied by a driver; and (B) a braking mode depending on the operation force and the regulated pressure in which the hydraulic brake system generates a braking force having a magnitude that depends on both of the operation force and the regulated pressure. The brake system is configured (a) such that the braking mode depending on the operation force and the regulated pressure is effectuated and the braking force is not generated by a regenerative brake system, at least after the hydraulic brake system becomes capable of generating the braking force in a period from a time point of initiation of the brake operation to a time point when the operation amount of a brake operation member becomes constant and (b) such that the regulated-pressure-dependent braking mode is effectuated and the braking force is generated by the regenerative brake system, when the operation amount becomes constant.

A vehicle brake system according to a second aspect of the invention has a hydraulic brake system having the above-indicated braking-mode switching mechanism. The brake system is configured (c) such that the regulated-pressure-dependent braking mode is effectuated before the hydraulic brake system becomes capable of generating the braking force in a period from a time point of initiation of the brake operation to a time point when the operation amount becomes constant and (d) such that the braking mode depending on the operation force and the regulated pressure is effectuated after the brake device becomes capable of generating the braking force in the period from the time point of initiation of the brake operation to the time point when the operation amount becomes constant.

A pressure regulator according to a third aspect of the invention has a valve mechanism configured to selectively effectuate, by a movement of a movable member that is movably supported by a housing, one of: (A) a state in which communication between a high-pressure passage and a regulated-pressure chamber is shut off while communication between a low-pressure passage and the regulated-pressure chamber is established; and (B) a state in which the communication between the high-pressure passage and the regulated-pressure chamber is established while the communication between the low-pressure passage and the regulated-pressure chamber is shut off.

In the vehicle brake system according to the above first aspect of the invention, the braking force is generated only by the hydraulic brake system in dependence on the operation force and the regulated pressure of the working fluid after the brake device has become capable of generating the braking force. Accordingly, the vehicle brake system can generate a sufficient braking force, and a balance of the braking force generated in each wheel by the hydraulic brake system is not disturbed by the braking force generated by the regenerative brake system. Therefore, in a situation in which the operation amount keeps changing after initiation of the brake operation, namely, in a situation in which the posture of the vehicle changes due to a change in deceleration of the vehicle and it is accordingly estimated that the vehicle stability and maneuverability are relatively poor, it is possible to prevent the situation from being further deteriorated by disturbance of the balance in the braking force.

In the vehicle brake system according to the second aspect of the invention, the working fluid can be pressurized in dependence on the regulated pressure of the working fluid until the brake device becomes capable of generating the braking force. Accordingly, the hydraulic brake system can be constituted in which a forward movement of the brake operation member is not required until the brake device becomes capable of generating the braking force. Thus, it is possible to enhance an operation feeling in the brake operation.

In the pressure regulator according to the third aspect of the invention, where the pressure regulator is configured such that, when the pressure of the regulated-pressure chamber exceeds a set pressure, the movable member is biased toward the first-end side so as to shut off the communication between the high-pressure passage and the regulated-pressure chamber, the pressure of the regulated-pressure chamber is rapidly increased until the regulated pressure exceeds the set pressure after the high-pressure passage once communicates with the regulated-pressure chamber. Accordingly, where the above-indicated hydraulic brake system is configured to pressurize the working fluid in dependence on the pressure of the working fluid in the regulated-pressure chamber of the pressure regulator, the hydraulic brake system can generate the braking force at a relatively early stage after initiation of the brake operation.

(B) Forms of Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention. Some of the forms of the claimable invention correspond to an invention defined in claims.

(0) A vehicle brake system for braking a vehicle, comprising a hydraulic brake system configured to generate a braking force in dependence on a pressure of a working fluid,
wherein the hydraulic brake system includes:
a brake device provided for a wheel of the vehicle and configured to generate a braking force having a magnitude that depends on the pressure of the working fluid supplied thereto;
a master cylinder device configured to pressurize the working fluid and to supply the pressurized working fluid to the brake device;
a brake operation member which is connected to the master cylinder device and on which a brake operation by a driver is performed;
a high-pressure-source device configured to highly pressurize a working fluid;
a pressure regulator device configured to regulate the working fluid highly pressurized by the high-pressure-source device and to supply the working fluid whose pressure is regulated; and
a braking-mode switching mechanism configured to selectively effectuate, as a braking mode of the hydraulic brake system, one of (A) a regulated-pressure-dependent braking mode in which the hydraulic brake system generates a regulated-pressure-dependent braking force having a magnitude that depends on a regulated pressure that is a pressure of the working fluid supplied from the pressure regulator device, without substantially depending on an operation force applied by the driver to the brake operation member and (B) a braking mode depending on the operation force and the regulated pressure in which the hydraulic brake system generates both of an operation-force-dependent braking force having a magnitude that depends on the operation force and the regulated-pressure-dependent braking force.

In the vehicle brake system according to this form, a state in which the operation-force-dependent braking force is generated and a state in which the operation-force-dependent braking force is not generated are switched by switching the braking mode, whereby the magnitude of the braking force generated by the hydraulic brake system can be changed. In the present vehicle brake system, therefore, the braking mode of the hydraulic brake system can be switched depending on a running state of the vehicle, for instance. The present vehicle brake system can be suitably used in an instance where the vehicle is equipped with other brake systems such as a regenerative brake system, for example. In this instance, the present vehicle brake system may be configured such that the hydraulic brake system operates in the regulated-pressure-dependent braking mode when the regenerative brake system generates the braking force and such that the hydraulic brake system operates in the braking mode depending on the operation force and the regulated pressure when the regenerative brake system does not generate the braking force. Where the brake system is thus configured, the braking force by the regenerative brake system and the operation-force-dependent braking force are generated so as to compensate each other, so that the magnitude of the braking force generated by the hydraulic brake system can be largely changed in accordance with the braking force generated by the regenerative brake system, without considerably changing the regulated-pressure-dependent braking force. Thus, it is possible to avoid an occurrence of a situation in which the braking force to be generated in the vehicle as a whole largely changes depending on the braking state of the regenerative brake system.

(1) The vehicle brake system according to the form (0), further comprising:
a regenerative brake system configured to generate a braking force while regenerating running energy of the vehicle into electric energy; and
a brake controller configured to control the vehicle brake system,
wherein the vehicle brake system is configured (a) to brake the vehicle by the operation-force-dependent braking force and the regulated-pressure-dependent braking force, such that the braking-mode switching mechanism effectuates the braking mode depending on the operation force and the regulated pressure and such that the regenerative brake system does not generate a regenerative braking force that is the braking force generated by the regenerative brake system, at least after the brake device becomes capable of generating the braking force in a period from a time point of initiation of the brake operation to a time point when an operation amount of the brake operation member becomes constant and (b) to brake the vehicle by the regulated-pressure-dependent braking force and the regenerative braking force such that the braking-mode switching mechanism effectuates the regulated-pressure-dependent braking mode and such that the regenerative brake system generates the regenerative braking force, when the operation amount becomes constant.

The vehicle brake system according to this form has the regenerative brake system, and it is desirable to use the regenerative brake system as much as possible in braking the vehicle in terms of regeneration of electricity. In a four-wheel vehicle equipped with both of the hydraulic brake system and the regenerative brake system, for instance, the regenerative brake system is generally configured to generate the braking force only in two front wheels or in two rear wheels that are connected to a motor while the hydraulic brake system is configured to generate the braking force in all of four wheels. Further, the hydraulic brake system is designed in general such that the balance of the braking forces generated in the four wheels is optimum where the vehicle is braked or stopped only by the hydraulic brake system. In such a vehicle, when the vehicle is braked only by the regenerative brake system or by both of the regenerative brake system and the hydraulic brake system, the braking forces generated in the four wheels become out of balance because the regenerative braking force is generated in some of the four wheels but not generated in the other of the four wheels. Hence, the vehicle stability and maneuverability are impaired.

In the present vehicle brake system, at least in a situation in which the hydraulic brake system is capable of generating the braking force within the period from a time point of initiation of the brake operation to a time point when the operation amount of the brake operation member becomes constant (hereinafter referred to as "hydraulic-braking possible situation after operation initiation" where appropriate), the brake system is placed in a state in which the vehicle is braked by the braking force generated by the hydraulic brake system, namely, by the operation-force-dependent braking force and the regulated-pressure-dependent braking force (hereinafter referred to as "braking state depending on the operation force and the regulated pressure" where appropriate). Therefore, in a situation in which the operation amount keeps changing after initiation of the brake operation, namely, in a situation in which the posture of the vehicle changes due to a change in deceleration of the vehicle and it is accordingly estimated that the vehicle stability and maneuverability are relatively poor, the braking force is generated only by the hydraulic brake system in all wheels. It is accordingly possible to brake the vehicle in a state in which the balance of the braking forces in the wheels is optimum, thereby preventing the vehicle stability and maneuverability from being further deteriorated.

The present vehicle brake system is placed in a state in which the vehicle is braked by the regulated-pressure-dependent braking force and the regenerative braking force (hereinafter referred to as "braking state depending on the regulated pressure and the regenerative braking force" where appropriate), in a situation in which the operation amount is constant (hereinafter referred to as "operation-amount constant situation" where appropriate). In the above-indicated vehicle, therefore, the braking force by the regenerative brake system and the hydraulic brake system is generated in the drive wheels while the braking force by the hydraulic brake system is generated in the non-drive wheels. Accordingly, the balance of the braking forces in the wheels breaks down. However, the balance breaks down in a situation in which the brake operation amount is constant, namely, in a situation in which deceleration of the vehicle is constant and the posture of the vehicle body is relatively stable so that the vehicle stability and maneuverability are relatively good. Hence, the vehicle stability and maneuverability are kept relatively good without being deteriorated. Thus, in the present vehicle brake system, the vehicle can be braked or stopped without impairing the vehicle stability and maneuverability while sufficiently regenerating electricity, by appropriately utilizing the hydraulic brake system and the regenerative brake system in accordance with the brake operation.

When the braking state shifts from the braking state depending on the operation force and the regulated pressure to the braking state depending on the regulated pressure and the regenerative braking force, the braking mode of the hydraulic brake system changes from the braking mode depending on the operation force and the regulated pressure to the regulated-pressure-dependent braking mode. In view of this, it is preferable that the regenerative braking force generated in the shifting of the braking state described above be generated so as to compensate the operation-force-dependent braking force that is not generated after the shifting. Where the regenerative braking force is thus adjusted, the braking force of the vehicle brake system as a whole does not substantially change in the shifting of the braking state described above and deceleration of the vehicle does not substantially change. Accordingly, the posture of the vehicle does not change, and occupants in the vehicle do not feel unnatural or uncomfortable.

The braking force generated in the regulated-pressure-dependent braking mode by the hydraulic brake system has a magnitude that "depends on the regulated pressure" "without substantially depending on the operation force". Here, the meaning of "without substantially depending on the operation force" is that the magnitude of the braking force generated in dependence on the operation force is 0 or is considerably smaller, as compared with the magnitude of the braking force generated in dependence on the regulated pressure. In other words, it means that the braking force generated in dependence on the operation force does not contribute to braking of the vehicle or does not substantially contribute to braking of the vehicle. More specifically, the braking force generated by the hydraulic brake system does not substantially depend on the operation force where the magnitude of the braking force generated in dependence on the operation force is equal to or smaller than 10%, preferably, equal to or smaller than 5%, with respect to the magnitude of the braking force generated in dependence on the regulated pressure.

(2) The vehicle brake system according to the form (1) configured to brake the vehicle by the operation-force-dependent braking force, the regulated-pressure-dependent braking force, and the regenerative braking force, such that the braking-mode switching mechanism effectuates the braking mode depending on the operation force and the regulated pressure and such that the regenerative brake system generates the regenerative braking force, when the operation amount again changes after once having become constant.

In a situation in which the operation amount of the brake operation member again changes after once having become constant (hereinafter referred to as "operation-amount re-changed situation" where appropriate), the vehicle brake system according to this form is placed in a state in which the vehicle is braked by the operation-force-dependent braking force, the regulated-pressure-dependent braking force, and the regenerative braking force (hereinafter referred to as "braking state depending on the operation force, the regulated pressure, and the regenerative braking force" where appropriate). In the present vehicle brake system, therefore, it is possible to brake or stop the vehicle making the most of the hydraulic brake system and the regenerative brake system even in a situation in which the operation amount of the brake operation member is further increased, so that a relatively large braking force can be generated.

(3) The vehicle brake system according to the form (1) or (2), wherein the regenerative brake system is configured to stop generation of the regenerative braking force when a speed of the vehicle becomes equal to or lower than a set speed by the brake operation.

In the vehicle brake system according to this form, in a case where the regenerative brake system cannot generate a sufficient braking force due to a decrease in the speed of the vehicle, for instance, the vehicle can be braked depending on the hydraulic brake system without depending on the regenerative brake system.

(4) The vehicle brake system according to any one of the forms (1)-(3), wherein the brake controller is configured to:

determine a required braking force that is required for the vehicle brake system as a whole, based on a degree of the brake operation by the driver, and control at least one of the pressure regulator device and the regenerative brake system such that a sum of the regulated-pressure-dependent braking force and the regenerative braking force becomes equal to a residuary braking force that is a remainder of subtraction of the operation-force-dependent braking force from the required braking force.

In the vehicle brake system according to this form, it is defined how the three kinds of braking forces, i.e., the operation-force-dependent braking force, the regulated-pressure-dependent braking force, the regenerative braking force, are generated with respect to the required braking force. Briefly, in an instance in which the braking mode depending on the operation force and the regulated pressure is established in the hydraulic brake system, at least one of the pressure regulator device and the regenerative brake system is controlled such that, when the operation-force-dependent braking force is insufficient with respect to the required braking force, the regulated-pressure-dependent braking force and the regenerative braking force are generated to compensate for the shortage of the operation-force-dependent braking force. In an instance in which the regulated-pressure-dependent braking mode is established in the hydraulic brake system, one of the pressure regulator device and the regenerative brake system is controlled such that the regulated-pressure-dependent braking force and the regenerative braking force provide the required braking force.

Both of the regulated-pressure-dependent braking force and the regenerative braking force may have the same magnitude or one of the regulated-pressure-dependent braking force and the regenerative braking force may have a magnitude larger than the other of the regulated-pressure-dependent braking force and the regenerative braking force. Where electricity regeneration is emphasized, for instance, the regulated-pressure-dependent braking force may be determined after the regenerative braking force has been determined so as to be as large as possible, and at least one of the pressure regulator device and the regenerative brake system may be controlled such that the determined regulated-pressure-dependent braking force and regenerative braking force are generated. Where the vehicle stability and maneuverability are emphasized, the regulated-pressure-dependent braking force may be determined after the regenerative braking force has been determined so as to be as small as possible, and at least one of the pressure regulator device and the regenerative brake system may be controlled such that the determined regulated-pressure-dependent braking force and regenerative braking force are generated. The regenerative braking force is determined based on the operating condition of the brake operation member, the vehicle speed, the charge status of the battery that is charged with regenerative electricity, the vehicle stability and maneuverability, and so on.

(5) The vehicle brake system according to the form (4), wherein the brake controller is configured to determine a magnitude of the regenerative braking force to be generated so as to be equal to 0 and to control the regenerative brake system such that the regenerative braking force becomes equal to 0, at least after the brake device becomes capable of generating the braking force in the period from the time point of initiation of the brake operation to the time point when the operation amount becomes constant.

In the vehicle brake system according to this form, the vehicle can be braked by the hydraulic brake system that generates the operation-force-dependent braking force and the regulated-pressure-dependent braking force, in the above-indicated hydraulic-braking possible situation after operation initiation. The present vehicle brake system prevents the regenerative brake system from generating the braking force in a relatively simple method.

(6) The vehicle brake system according to the form (4) or (5), wherein the brake controller is configured to determine a magnitude of the regenerative braking force to be generated and to control the regenerative brake system such that the regenerative braking force has the determined magnitude, when the operation amount becomes constant.

In the vehicle brake system according to this form, in the above-indicated operation-amount constant situation, the regenerative braking force is determined with a higher priority than the regulated-pressure-dependent braking force. Accordingly, where electricity regeneration is emphasized, for instance, the regenerative braking force can be determined so as to be as large as possible.

(7) The vehicle brake system according to any one of the forms (4)-(6), wherein the brake controller is configured to determine a magnitude of the regenerative braking force to be generated and to control the regenerative brake system such that the regenerative braking force has the determined magnitude, when the operation amount again changes after once having become constant.

In the vehicle brake system according to this form, the regenerative braking force is determined with a higher priority than the regulated-pressure-dependent braking force in the above-indicated operation-amount re-changed situation. As in the vehicle brake system described above, the regenerative braking force can be determined so as to be as large as possible where electricity regeneration is emphasized.

(10) The vehicle brake system according to any one of the forms (0)-(7), configured (c) such that the braking-mode switching mechanism effectuates the regulated-pressure-dependent braking mode before the brake device becomes capable of generating the braking force in a period from a time point of initiation of the brake operation to a time point when the operation amount becomes constant and (d) such that the braking-mode switching mechanism effectuates the braking mode depending on the operation force and the regulated pressure after the brake device becomes capable of generating the braking force in the period from the time point of initiation of the brake operation to the time point when the operation amount becomes constant.

In general, the hydraulic brake system has the so-called "play" before the braking force is actually generated after initiation of the brake operation. It is accordingly difficult for the brake device to quickly generate the braking force after initiation of the brake operation. In the present vehicle brake system, the regulated-pressure-dependent braking mode is effectuated in such a situation, namely, a situation before the hydraulic brake system becomes capable of generating the braking force in the period from a time point of initiation of the brake operation to a time point when the operation amount becomes constant. (The situation will be hereinafter referred to as "hydraulic-braking impossible situation after operation initiation" where appropriate.) Accordingly, the working fluid can be pressurized by the regulated pressure before the brake device becomes capable of generating the braking force, thereby making it possible to eliminate the above-indicated "play" without moving the brake operation member forward. Thus, the present vehicle brake system avoids a useless increase in the operation amount of the brake operation member, in other words, avoids a phenomenon that the operation amount of the operation member increases even though the braking force is not generated in the hydraulic brake system. Therefore, the operation feeling in the brake operation can be enhanced.

In the above-indicated hydraulic-braking possible situation after operation initiation, the braking mode depending on the operation force and the regulated pressure is effectuated, so that the working fluid can be pressurized in dependence on not only the regulated pressure but also the operation force, enabling the hydraulic brake system to generate the braking force having a sufficiently large magnitude. Even in a case where the vehicle brake system according to this form is applied to the vehicle equipped with the regenerative brake system, the braking force can be generated in all of the wheels only by the hydraulic brake system in a situation in which the operation amount keeps changing after initiation of the brake operation and it is expected that the vehicle stability and maneuverability are relatively poor. It is accordingly possible to brake the vehicle in a state in which the balance of the braking forces in the wheels is optimum, thereby preventing the vehicle stability and maneuverability from being further deteriorated.

(11) The vehicle brake system according to the form (10), wherein the brake device includes a rotation member configured to rotate together with the wheel, a friction member supported by a carrier that rotatably supports the wheel, and a pressing mechanism configured to move the friction member toward the rotation member and to thereby press the friction member onto the rotation member, in dependence on the pressure of the working fluid supplied to the brake device, and wherein the vehicle brake system is configured to generate the braking force by use of a frictional force between the rotation member and the friction member.

The brake device according to this form may be the so called disc brake device or drum brake device. In the hydraulic brake system that supplies the working fluid to the brake device, the pressure of the working fluid to be supplied does not substantially increase until the friction member is pressed onto the rotation member, and the frictional force is not substantially generated. That is, in the brake device, a free running distance of the friction member before the friction member is pressed onto the rotation member may be regarded as the above-indicated "play". When the friction member is pressed onto the rotation member, the pressure of the working fluid is rapidly increased, whereby the frictional force, namely, the braking force, is generated. According to the present vehicle brake system, it is possible to judge that the hydraulic brake system has become capable of generating the braking force, by a relatively simple method such as by detecting the pressure of the working fluid to be supplied to the brake device.

(12) The vehicle brake system according to the form (10) or (11), further comprising:

a regenerative brake system configured to generate a braking force while regenerating running energy of the vehicle into electric energy; and a brake controller configured to control the vehicle brake system, wherein the vehicle brake system is configured to brake the vehicle by the regenerative braking force such that the regenerative brake system generates the regenerative braking force before the brake device becomes capable of generating the braking force in the period from the time point of initiation of the brake operation to the time point when the operation amount becomes constant.

In the hydraulic-braking impossible situation after operation initiation indicated above, the vehicle brake system according to this form is placed in a state in which the vehicle is braked by the regenerative braking force (hereinafter referred to as "regenerative-braking-force-dependent braking state" where appropriate). Even in a situation in which the hydraulic brake system cannot generate the braking force at the time of initiation of the brake operation, the braking force can be quickly generated utilizing the regenerative brake system. Individual hydraulic brake systems may suffer from a difference in a degree of the "play" due to variation in the "play" caused by production errors or due to changes of the "play" over time. According to the vehicle brake system of this form, the braking force can be generated similarly by the regenerative brake system with respect to the brake operation. Thus, in the vehicle brake system of this form, the braking force can be generated at the same timing with respect to the brake operation without being influenced by the degree of the "play" in each hydraulic brake system.

(13) The vehicle brake system according to the form (12), wherein the brake controller is configured to:

determine a required braking force that is required for the vehicle brake system as a whole, based on a degree of the brake operation by the driver, and control at least one of the pressure regulator device and the regenerative brake system such that a sum of the regulated-pressure-dependent braking force and the regenerative braking force becomes equal to a residuary braking force that is a remainder of subtraction of the operation-force-dependent braking force from the required braking force.

In the vehicle brake system according to this form, even in the above-indicated hydraulic-braking impossible situation after operation initiation, the three kinds of braking forces can be generated in the same way as in the vehicle brake system described above. Accordingly, even where the vehicle brake system of this form is combined with the vehicle brake system described above, the three kinds of braking forces can be generated in the same way, and the structure of the combination of the brake systems can be relatively simplified.

(14) The vehicle brake system according to the form (13), wherein the brake controller is configured to determine a magnitude of the regenerative braking force to be generated so as to be equal to a magnitude of the required braking force and to control the regenerative brake system such that the regenerative braking force has the determined magnitude, before the brake device becomes capable of generating the braking force in the period from the time point of initiation of the brake operation to the time point when the operation amount becomes constant.

In the vehicle brake system according to this form, a method of determining the regenerative braking force in the above-indicated hydraulic-braking impossible situation after operation initiation is specifically limited. According to the vehicle brake system of this form, the regenerative braking force can be determined by a relatively simple method.

(20) The vehicle brake system according to any one of the forms (0)-(14), wherein the master cylinder device has:
a housing;
a pressurizing piston disposed in the housing such that there is formed, forward of the pressurizing piston, a pressurizing chamber in which the working fluid to be supplied to the brake device is pressurized, the pressurizing piston being configured to move forward in dependence on a pressure of a working fluid supplied from the pressure regulator device to the master cylinder device; and an input piston disposed in the housing so as to be located rearward of the pressurizing piston, the brake operation member being connected to a rear end of the input piston, and wherein the braking-mode switching mechanism is configured to effectuate the braking mode depending on the operation force and the regulated pressure by permitting transmission of the operation force from the input piston to the pressurizing piston and to effectuate the regulated-pressure-dependent braking mode by substantially prohibiting the transmission of the operation force from the input piston to the pressurizing piston.

In the hydraulic brake system according to this form, the braking mode is switched depending upon whether the operation force is transmitted from the input piston to the pressurizing piston. In this sense, the braking-mode switching mechanism in this form may be regarded as an operation-force-transmission switching mechanism configured to switch whether or not to transmit the operation force to the pressurizing piston. The transmission of the operation force from the input piston to the pressurizing piston may be directly conducted by contact of the input piston with the pressurizing piston or may be indirectly conducted via the working fluid or another piton or the like interposed between the input piston and the pressurizing piston.

(21) The vehicle brake system according to the form (20), wherein the pressurizing piston has a body portion and a flange portion formed around an outer circumference of the body portion, wherein the master cylinder device has:

an input chamber which is defined by the flange portion of the pressurizing piston so as to be located rearward of the flange portion and into which the working fluid supplied from the pressure regulator device is introduced;

an annular opposing chamber defined by the flange portion of the pressurizing piston so as to be located forward of the flange portion, the opposing chamber being opposed to the input chamber with the flange portion interposed therebetween; and an inter-piston chamber defined by the body portion of the pressurizing piston and the input piston so as to be located between the pressurizing piston and the input piston, wherein a pressure receiving area of the pressurizing piston on which a pressure of a working fluid in the inter-piston chamber acts and a pressure receiving area of the pressurizing piston on which a pressure of a working fluid in the opposing chamber acts are made substantially equal to each other, wherein the braking-mode switching mechanism has an inter-chamber-communication switching mechanism configured to switch between: communication between the inter-piston chamber and the opposing chamber; and shutting off of the communication therebetween and has a low-pressure-source-communication switching mechanism configured to switch between: communication between the opposing chamber and a low-pressure source; and shutting off of the communication therebetween, and wherein the braking-mode switching mechanism is configured to:

effectuate the braking mode depending on the operation force and the regulated pressure such that the inter-chamber-communication switching mechanism shuts off the communication between the inter-piston chamber and the opposing chamber and such that the low-pressure-source-communication switching mechanism permits the communication between the opposing chamber and the low-pressure source; and effectuate the regulated-pressure-dependent braking mode such that the inter-chamber-communication switching mechanism permits the communication between the inter-piston chamber and the opposing chamber and such that the low-pressure-source-communication switching mechanism shuts off the communication between the opposing chamber and the low-pressure source.

In the vehicle brake system according to this form, when the inter-piston chamber is hermetically closed by the inter-chamber-communication switching mechanism and the opposing chamber is in communication with the low-pressure source by the low-pressure-source-communication switching mechanism, a forward force by the pressure of the working fluid in the inter-piston chamber acts on the pressurizing piston, so that the working fluid can freely flow into and out of the opposing chamber. Accordingly, the pressurizing piston can move forward by the operation force, whereby the working fluid in the pressurizing chamber is pressurized. That is, the operation force is transmitted to the pressurizing piston, and the hydraulic brake system can generate the operation-force-dependent braking force. In the hydraulic brake system, therefore, the braking mode depending on the operation force and the regulated pressure is effectuated.

On the other hand, when the inter-piston chamber and the opposing chamber are in communication with each other by the inter-chamber-communication switching mechanism and the communication between the opposing chamber and the low-pressure source is shut off by the low-pressure-source-communication switching mechanism, a forward force and a rearward force that act on the pressurizing piston are substantially cancelled. More specifically, in the vehicle brake system according to this form, the pressure receiving area of the pressurizing piston on which the pressure of the working fluid in the inter-piston chamber is substantially equal to the pressure receiving area of the pressurizing piston on which the pressure of the working fluid in the opposing chamber acts. Accordingly, a force that acts forward on the pressurizing piston by the pressure of the working fluid in the inter-piston chamber is substantially equal to a force that acts rearward on the pressurizing piston by the pressure of the working fluid in the opposing chamber. In other words, the forces are equal to each other or one of the forces is slightly larger than the other, whereby the forces substantially cancel each other. Thus, the operation force is transmitted to the working fluid in the inter-piston chamber form the brake operation member via the input piston. Even where the pressure of the working fluid in the inter-piston chamber and the opposing chamber is increased, a distance of a forward movement of the pressurizing piston by the pressure increase is considerably small. Accordingly, the operation force is not substantially transmitted to the pressurizing piston, and the hydraulic brake system does not substantially generate the operation-force-dependent braking force. In the hydraulic brake system, therefore, the regulated-pressure-dependent braking mode is effectuated.

In the vehicle brake system according to this form, in a state in which the regulated-pressure-dependent braking mode is established, even if the pressurizing piston moves forward by an increase of the regulated pressure, an amount of decrease in the volume of the opposing chamber by the forward movement is substantially equal to an amount of increase in the volume of the inter-piston chamber by the forward movement. Accordingly, the position of the input piston, namely, the operation position of the brake operation member, does not substantially change. Further, because the opposing chamber and the inter-piston chamber are hermetically closed while communicating with each other, the brake operation member and the input piston connected to the brake operation member do not substantially move even if the brake operation member is operated by the operation force. Thus, according to the vehicle brake system of this form, the hydraulic brake system is constituted which avoids a useless increase in the operation amount of the brake operation member, namely, avoids a phenomenon that the operation amount of the brake operation member increases even though the braking force is not generated in the hydraulic brake system, so as to eliminate the above-indicated "play".

(22) The vehicle brake system according to the form (21), wherein the inter-chamber-communication switching mechanism has an inter-chamber-communication shutoff valve configured to permit the communication between the inter-piston chamber and the opposing chamber before the brake device becomes capable of generating the braking force and to shut off the communication between the inter-piston chamber and the opposing chamber after the brake device becomes capable of generating the braking force, in a period from a time point of initiation of the brake operation to a time point when the operation amount becomes constant, and wherein the low-pressure-source-communication switching mechanism has a low-pressure-source communication valve configured to shut off the communication between the opposing chamber and the low-pressure source before the brake device becomes capable of generating the braking force and to permit the communication between the opposing chamber and the low-pressure source after the brake device becomes capable of generating the braking force, in the period from initiation of the brake operation to the time point when the operation amount becomes constant.

In the vehicle brake system according to this form, the regulated-pressure-dependent braking mode is effectuated in the hydraulic-braking impossible situation after operation initiation while the braking mode depending on the operation force and the regulated pressure is effectuated in the hydraulic-braking possible situation after operation initiation. The inter-chamber-communication shutoff valve and the low-pressure-source communication valve in this form may be configured to operate when the pressure of the pressurizing chamber becomes equal to a predetermined level, for instance. In the hydraulic brake system, the pressure of the working fluid to be supplied to the brake device, namely, the pressure of the pressurizing chamber, is rapidly increased when the brake device becomes capable of generating the braking force. It is accordingly possible to judge whether or not the brake device can generate the braking force by utilizing the rapid increase of the pressure. When the hydraulic brake system operates in the regulated-pressure-dependent braking mode, the pressure of the pressurizing chamber is also increased in accordance with an increase of the regulated pressure, whereby it is possible to judge whether or not the brake device can generate the braking force by utilizing the regulated pressure. Accordingly, there may be used, for instance, as the inter-chamber-communication shutoff valve and the low-pressure-source communication valve, an electromagnetic open/close valve whose operation is controlled by the brake controller based on detection of the pressure of the pressurizing chamber or the regulated pressure or a mechanical open/close valve which operates utilizing the pressure of the pressurizing chamber or the regulated pressure as the pilot pressure.

According to the master cylinder device of this form, where the pressure receiving area of the pressurizing piston on which the pressure of the working fluid in the inter-piston chamber acts is slightly larger than the pressure receiving area of the pressurizing piston on which the pressure of the working fluid in the opposing chamber acts, a force that acts forward on the pressurizing piston is slightly larger than a force that acts rearward on the pressurizing piston when the pressure of the inter-piston chamber and the opposing chamber is increased by an increase in the operation force. Therefore, even in the regulated-pressure-dependent braking mode, the pressurizing piston can be slightly moved forward by the operation force, and the pressure of the pressurizing chamber can be slightly increased by the forward movement in dependence on the operation force. Accordingly, the inter-chamber-communication shutoff valve and the low-pressure-source communication valve are activated by utilizing the pressure increase, so as to effectuate the braking mode depending on the operation force and the regulated pressure. In a case where the master cylinder device is configured as described above, the increase in the pressure of the pressurizing chamber by the operation force is slight, and it may be accordingly supposed that the braking force that depends on the operation force is not substantially generated. Accordingly, a difference between the above-indicated two pressure receiving areas is preferably equal to or smaller than 10% and more preferably equal to or smaller than 5%, with respect to the pressure receiving area on which the pressure of the working fluid in the opposing chamber acts.

(23) The vehicle brake system according to the form (22), wherein the inter-chamber-communication shutoff valve is a mechanical valve configured to utilize, as a pilot pressure, one of a pressure of the working fluid in the pressurizing chamber and a pressure of the working fluid in the input chamber and to shut off the communication between the inter-piston chamber and the opposing chamber in accordance with an increase in the pilot pressure, and wherein the low-pressure-source communication valve is a mechanical valve configured to utilize, as a pilot pressure, one of the pressure of the working fluid in the pressurizing chamber and the pressure of the working fluid in the input chamber and to permit the communication between the opposing chamber and the low-pressure source in accordance with an increase in the pilot pressure.

In the vehicle brake system according to this form, the braking mode can be shifted from the regulated-pressure-dependent braking mode in the hydraulic-braking impossible situation after operation initiation to the braking mode depending on the operation force and the regulated pressure in the hydraulic-braking possible situation after operation initiation, utilizing relatively inexpensive mechanical valves. Each of the inter-chamber-communication shutoff valve and the low-pressure-source communication valve may be a single mechanical valve. Alternatively, the two valves may be combined to provide a mechanical valve device.

(24) The vehicle brake system according to the from (22), wherein the braking-mode switching mechanism has: a check mechanism, as the inter-chamber-communication shutoff valve, configured to permit an inflow of the working fluid from the opposing chamber to the inter-piston chamber and to prohibit an inflow of the working fluid from the inter-piston chamber to the opposing chamber; and a pressure relief mechanism, as the low-pressure source communication valve, configured to permit the communication between the opposing chamber and the low-pressure source when a pressure of the working fluid of the opposing chamber is equal to or higher than a predetermined pressure, and wherein (a) the check mechanism permits the inflow of the working fluid from the opposing chamber to the inter-piston chamber when the brake operation is initiated and the pressurizing piston moves forward, (b) the pressure relief mechanism permits the communication between the opposing chamber and the low-pressure source when pressures of the working fluid in the inter-piston chamber and the opposing chamber become equal to or higher than the predetermined pressure by the operation force after the brake device becomes capable of generating the braking force, and (c) the check mechanism prohibits the inflow of the working fluid from the inter-piston chamber to the opposing chamber when the pressure of the working fluid in the opposing chamber becomes less than the pressure of the working fluid in the inter-piston chamber by the communication between the opposing chamber and the low-pressure source.

In the vehicle brake system according to this form, the braking mode can be shifted from the regulated-pressure-dependent braking mode to the braking mode depending on the operation force and the regulated pressure by a relatively simple method. For instance, a check valve may be used as the check mechanism, and a relief valve may be used as the pressure relief mechanism. Hence, the braking-mode switching mechanism can be constituted relatively inexpensively using ordinary check valves and relief valves.

(25) The vehicle brake system according to the form (24)
wherein the housing has a partition portion partitioning an interior of the housing into a front-side chamber and a rear-side chamber,
wherein the pressurizing piston is disposed such that the flange portion thereof is located in the front-side chamber,
wherein the input piston is disposed in the rear-side chamber, and
wherein the inter-piston chamber is formed between the pressurizing piston and the input piston by utilizing an opening formed in the partition portion.

In the vehicle brake system according to this form, a limitation relating to formation of the inter-piston chamber is added. In the vehicle brake system of this form, where the pressurizing piston has an extension portion that extends from the body portion into the rear-side chamber utilizing the opening, the inter-piston chamber may be formed between the extension portion and the input piston. Where the body portion of the pressurizing piston has a blind hole that is open on the rear side and a front-side portion of the input piston is located in the blind hole utilizing the opening, the inter-piston chamber may be formed in the blind hole.

(26) The vehicle brake system according to the form (25),
wherein the inter-chamber-communication switching mechanism has, in an inside of the body portion of the pressurizing piston, an inter-chamber communication passage whose one end is open to the inter-piston chamber and the other end is open to the opposing chamber, and
wherein the check mechanism is provided in the inter-chamber communication passage.

According to the vehicle brake system of this form, the inter-chamber-communication switching mechanism can be disposed in the pressurizing piston, whereby the hydraulic brake system of this form is relatively compact.

(27) The vehicle brake system according to the form (24),
wherein the body portion of the pressurizing piston has a blind hole that is open to a rear end thereof, and
wherein the input piston is fitted into the blind hole, whereby the inter-piston chamber is defined by the input piston and the pressurizing piston so as to be located forward of the input piston.

According to the vehicle brake system of this form, a concrete limitation relating to formation of the inter-piston chamber is added. In the vehicle brake system of this form, the inter-piston chamber can be relatively simply formed.

(28) The vehicle brake system according to the form (27),
wherein the inter-chamber-communication switching mechanism has: a first fluid passage defined by the body portion of the pressurizing piston and the housing so as to be formed around the body portion on a front side of the opposing chamber, the first fluid passage communicating with the opposing chamber; and a second fluid passage formed in the body portion of the pressurizing piston such that one end of the second fluid passage is open to the inter-piston chamber while the other end thereof is open to the first fluid passage, and
wherein the check mechanism is provided in the first fluid passage and is constituted by a seal member configured to permit a sliding contact of the body portion of the pressurizing piston and the housing via the seal member and is configured to permit the inflow of the working fluid from the opposing chamber into the inter-piston chamber and to prohibit the inflow of the working fluid from the inter-piston chamber into the opposing chamber.

According to the vehicle brake system of this form, the seal member necessary for sliding of the body portion of the pressurizing piston relative to the housing functions also as the check mechanism, so that the hydraulic brake system can be made relatively simple and compact.

(29) The vehicle brake system according to any one of the forms (0)-(14),
wherein the master cylinder device is configured to always pressurize the working fluid in dependence on both of the operation force and the pressure of the working fluid supplied from the pressure regulator device,
wherein the braking-mode switching mechanism includes: a regulated-pressure-fluid supply switching mechanism configured to switch between supply of the working fluid from the pressure regulator device to the brake device and shutting off of the supply; and a master-pressure-fluid supply switching mechanism configured to switch between supply of the working fluid from the master cylinder device to the brake device and shutting off of the supply,
wherein the regulated-pressure-fluid supply switching mechanism shuts off the supply of the working fluid from the pressure regulator device to the brake device and the master-pressure-fluid supply switching mechanism supplies the working fluid from the master cylinder device to the brake device, whereby the braking mode depending on the operation force and the regulated pressure is effectuated, and
wherein the regulated-pressure-fluid supply switching mechanism supplies the working fluid from the pressure regulator device to the brake device and the master-pressure-fluid supply switching mechanism shuts off the supply of the working fluid from the master cylinder device to the brake device, whereby the regulated-pressure-dependent braking mode is effectuated.

According to the hydraulic brake system of this form, the master cylinder device pressurizes the working fluid always in dependence on the operation force and the regulated pressure. Therefore, when the working fluid is supplied form the master cylinder device to the brake device, the braking mode depending on the operation force and the regulated pressure is effectuated. On the other hand, when the working fluid is supplied from the pressure regulator device to the brake device, the brake device generates the braking force in dependence on the regulated pressure, so that the regulated-pressure-dependent braking mode is effectuated. That is, the hydraulic brake system of this form may be regarded as a hydraulic brake system of the so-called master-cut type.

The regulated-pressure-fluid supply switching mechanism and the master-pressure-fluid supply switching mechanism may be constituted independently of each other or may be integrally constituted. For instance, it is possible to constitute a switching mechanism in which the regulated-pressure-fluid supply switching mechanism and the master-pressure-fluid supply switching mechanism are integral, as long as the mechanism has, in its inside, a switching valve for switching fluid passages and the mechanism is configured to switch between: a state in which the working fluid is supplied from the pressure regulator device to the brake device; and a state in which the working fluid is supplied from the master cylinder device to the brake device.

(30) The vehicle brake system according to the form (29), wherein the master cylinder device has:
 a housing;
 a pressurizing piston disposed in the housing such that there is formed, forward of the pressurizing piston, a pressurizing chamber in which the working fluid to be supplied to the brake device is pressurized, the pressurizing piston being configured to move forward in dependence on a pressure of a working fluid supplied from the pressure regulator device to the master cylinder device; and
 an input piston disposed in the housing so as to be located rearward of the pressurizing piston, such that a hermetically closed inter-piston chamber is defined between the input piston and the pressurizing piston, the brake operation member being connected to a rear end of the input piston, and
 wherein the master cylinder device is configured such that the operation force is transmitted from the input piston to the pressurizing piston via a working fluid in the hermetically closed the inter-piston chamber.

According to the hydraulic brake system of this form, the operation force is transmitted from the input piston to the pressurizing piston via the working fluid in the inter-piston chamber located between the input piston and the pressurizing piston.

(35) A pressure regulator configured to regulate a working fluid having a high pressure and supplied from a high-pressure-source device, to a pressure in accordance with a pilot pressure introduced thereinto and configured to supply the working fluid whose pressure is regulated, comprising:
 a housing;
 a high-pressure passage which is formed in the housing and through which the working fluid supplied from the high-pressure-source device is introduced into the housing;
 a low-pressure passage which is formed in the housing and through which the working fluid is discharged from the housing to a low-pressure source;
 a regulated-pressure chamber from which the working fluid whose pressure is regulated is supplied;
 a pilot chamber that receives the working fluid whose pressure is equal to the pilot pressure;
 a movable member provided in and supported by the housing so as to be movable in an axial direction of the housing;
 a first plunger disposed on a first-end side of the movable member so as to be movable in the axial direction of the housing, the first-end side being defined as one of opposite sides of the housing in the axial direction;
 a second plunger disposed on the first-end side or a second-end side of the movable member so as to be movable in the axial direction of the housing, the second-end side being defined as the other of the opposite sides of the housing in the axial direction;
 a first biasing mechanism configured to bias the movable member toward the first-end side;
 a second biasing mechanism configured to bias the movable member toward the second-end side via the first plunger by a pressure of the pilot chamber;
 a third biasing mechanism configured such that, when a pressure of the regulated-pressure chamber exceeds a set pressure, the third biasing mechanism biases one of the movable member and the first plunger toward the first-end side via the second plunger by the pressure of the regulated-pressure chamber, with the second plunger held in contact with the one of the movable member and the first plunger; and
 a valve mechanism configured to selectively effectuate one of (A) a state in which communication between the high-pressure passage and the regulated-pressure chamber is shut off while communication between the low-pressure passage and the regulated-pressure chamber is established; and (B) a state in which the communication between the high-pressure passage and the regulated-pressure chamber is established while the communication between the low-pressure passage and the regulated-pressure chamber is shut off, by an action of the movable member owing to biasing forces of the first biasing mechanism, the second biasing mechanism, and the third biasing mechanism, respectively.

The pressure regulator of this form may be configured such that, when the pilot pressure is 0, namely, when the pilot pressure is equal to the level of the pressure of the low-pressure source, e.g., atmospheric pressure, the movable member is located at a moving end position on the first-end side by the biasing force of the first biasing mechanism. Further, the valve mechanism may be configured such that, when the movable member is located at the moving end position on the first-end side, the communication between the high-pressure passage and the regulated-pressure chamber is shut off while the communication between the low-pressure passage and the regulated-pressure chamber is established. In this state, the pressure of the regulated-pressure chamber is decreased. The pressure regulator of this form may be configured such that, when the pilot pressure is increased, the biasing force of the second biasing mechanism biases the movable member toward the second-end side via the first plunger against the biasing force of the first biasing mechanism. Further, the valve mechanism may be configured such that the communication between the high-pressure passage and the regulated-pressure chamber is established while the communication between the low-pressure passage and the regulated-pressure chamber is shut off, by the movable member biased toward the second-end side. In this state, the pressure of the regulated-pressure chamber is increased.

The pressure regulator of this form may be configured such that, when the pressure of the regulated-pressure chamber exceeds the set pressure, the third biasing mechanism biases one of the movable member and the first plunger toward the first-end side, thereby shutting off the communication between the high-pressure passage and the regulated-pressure chamber. According to the thus configured pressure regulator, when the pressure of the regulated-pressure chamber starts to increase, the communication between the high-pressure passage and the regulated-pressure chamber is not shut off until the pressure of the regulated-pressure chamber exceeds the set pressure. That is, after the high-pressure passage and the regulated-pressure chamber are once brought into communication with each other, the pressure of the regulated-pressure chamber is rapidly increased until it exceeds the set pressure. In this instance, a gradient of an increase in the pressure of the regulated-pressure chamber with respect to an increase in the pilot pressure (hereinafter referred to as "increase gradient of the regulated pressure" where appropriate) is considerably large. Where the biasing force of the first biasing mechanism is relatively small, the second biasing mechanism can move the movable member toward the second-end side against the biasing force of the first biasing mechanism, by slightly increasing the pilot pressure, for thereby enabling the high-pressure passage and the regulated-pressure chamber to communicate with each other. Thus, in the pressure regulator of this form, the pressure of the regulated-pressure chamber can be rapidly increased to the set pressure by slightly increasing the pilot pressure.

When the pressure of the regulated-pressure chamber exceeds the set pressure and the movable member is moved toward the first-end side by the biasing force of the third biasing mechanism so as to be located at the moving end position, the low-pressure passage and the regulated-pressure chamber are brought into communication with each other, so that the pressure of the regulated-pressure chamber is decreased. When the biasing force of the third biasing mechanism is decreased by the decrease in the pressure of the regulated-pressure chamber, the movable member is moved toward the second-end side by the biasing force of the second biasing mechanism, so that the pressure of the regulated-pressure chamber stops decreasing. In other words, according to the pressure regulator of this form, the pressure of the regulated-pressure chamber is regulated such that a force that biases the movable member toward the second-end side by the pilot pressure and a force that biases the movable member toward the first-end side by the pressure of the regulated-pressure chamber are balanced with each other. In this instance, there is provided a pressure regulator in which the increase gradient of the regulated pressure is kept constant after the pressure of the regulated-pressure chamber has exceeded the set pressure, namely, a pressure regulator in which the pressure of the regulated-pressure chamber increases at a substantially constant rate with respect to an increase of the pressure of the pilot chamber after the pressure of the regulated-pressure chamber has exceeded the set pressure. In particular when the biasing force of the first biasing mechanism is relatively small and does not almost change by the movement of the movable member, the movement of the movable member depends substantially on the pilot pressure and the pressure of the regulated-pressure chamber.

Thus, the pressure regulator of this form is suitably used as a pressure regulator device of the hydraulic brake system in the vehicle brake system described above. In this instance, the pressure regulator of this form may be configured such that the working fluid in the regulated-pressure chamber is supplied as the working fluid having the regulated pressure in the hydraulic brake system, utilizing the pressure of the inter-piston chamber as the pilot pressure, for example. According to the hydraulic brake system having the pressure regulator constructed as described above, a slight brake operation, namely, a slight increase in the pressure of the working fluid in the inter-piston chamber by the operation force, enables the regulated pressure to be rapidly increased, thereby moving the pressurizing piston forward. As a result, the brake device can generate the braking force. Therefore, the hydraulic-braking impossible situation after operation initiation can be shifted to the hydraulic-braking possible situation after operation initiation at a relatively early stage after initiation of the brake operation. Where the master cylinder device is configured such that the pressurizing piston can be slightly moved forward by the operation force even in the hydraulic-braking impossible situation after operation initiation, namely, even in the regulated-pressure-dependent braking mode, the pressure of the working fluid in the pressurizing chamber can be utilized as the pilot pressure.

The pressure regulator of this form may be suitably provided in a pressure regulator device of a hydraulic brake system that is not equipped with a stroke simulator, namely, a mechanism for permitting the brake operation by a driver without utilizing the driver's brake operation for the hydraulic braking force. Further, the pressure regulator of this form is particularly suitably used as a pressure regulator device in the above-indicated hydraulic brake system, i.e., the hydraulic brake system in which a useless increase in the operation amount is not caused. In this hydraulic brake system, when the braking mode of the hydraulic brake system is the regulated-pressure-dependent braking mode in the hydraulic-braking impossible situation after operation initiation, the brake operation member is not substantially advanced even where the brake operation is initiated. In this case, there is a possibility that the brake operation is felt heavy by the driver. According to the pressure regulator of this form, the hydraulic-braking impossible situation after operation initiation is shifted to the hydraulic-braking possible situation after operation initiation at a relatively early stage after initiation of the brake operation. Therefore, the brake operation member is permitted to be advanced before the brake operation is felt heavy by the driver, so that the driver does not feel unnatural or awkward in the brake operation.

The valve mechanism may be configured to effectuate, in addition to the above-indicated two states, a state in which the communication between the high-pressure passage and the regulated-pressure chamber is shut off and the communication between the low-pressure passage and the regulated-pressure chamber is shut off. If this state is effectuated when the movable member is stationary at a certain position by the biasing forces of the respective first, second, and third biasing mechanisms that are balanced with one another, the pressure of the regulated-pressure chamber is kept at the pressure at that time.

The third biasing mechanism in the pressure regulator of this form biases one of the movable member and the first plunger toward the second-end side when the pressure of the regulated-pressure chamber exceeds the set pressure. Accordingly, the pressure regulator of this form may be configured such that, until the pressure of the regulated-pressure chamber exceeds the set pressure, the third biasing mechanism is spaced apart from the second plunger or the second plunger is spaced apart from the movable member or the first plunger. Alternatively, the third biasing mechanism may be configured to generate a reaction force against a force by the pressure of the regulated-pressure chamber before exceeding the set pressure, such that the movable member or the first plunger is not biased by the force in question. To this end, the third biasing mechanism may have a reaction-force generating member for generating the reaction force. The reaction-force generating member may be configured to apply, in advance, a set load to the second plunger toward the second-end side. The set load is a load corresponding to a force that acts on the second plunger toward the first-end side when the movable member or the first plunger starts to be biased toward the first-end side. In this instance, the movable member or the first plunger is not biased toward the first-end side before a force toward the first-end side that has a magnitude exceeding the set load acts on the second plunger. In this respect, the reaction-force generating member may be regarded as a set load applying member that applies the set load to the second plunger.

The pressure regulator that regulates the high-pressure working fluid to a pressure in accordance with the pilot pressure and that supplies the pressure-regulated working fluid generally has, in its inside, fluid chambers and fluid passages that store the working fluid of different pressures. The fluid chambers and the fluid passages are isolated from one another via seals or the like. When various constituent members of the pressure regulator slide via the seals or the like, the sliding causes a frictional force. Where the frictional force is relatively large, there may be a risk that the pressure regulator is hard to operate in response to the pilot pressure. More specifically, the pressure regulator does not operate when the change of the pilot pressure is slight or the working fluid is hard to be regulated following the change of the pilot pressure. In the pressure regulator in which the movable member is supported by another member, such as a plunger, that can move, the movable member tends to be also moved in conjunction with another member when another member moves. Further, the pressure regulator is hard to operate due to friction caused by another member. In these instances, the pressure regulator is hard to operate in response to the pilot pressure. In the pressure regulator of this form, the movable member is supported directly by the housing, whereby the movement of another member that can move is less likely to influence the movement of the movable member. Therefore, the movable member can move while relatively sensitively responding to the change of the pilot pressure, and the pressure regulator is capable of regulating the pressure of the working fluid while relatively sensitively responding to the change of the pilot pressure.

(36) The pressure regulator according to the form (35),
wherein the second plunger is disposed on the second-end side of the movable member so as to be movable in the axial direction of the housing, and
wherein the valve mechanism is configured to effectuate: (a) the state in which the communication between the high-pressure passage and the regulated-pressure chamber is shut off while the communication between the low-pressure passage and the regulated-pressure chamber is established, when the movable member is located at a moving end position on the first-end side; and (b) the state in which the communication between the high-pressure passage and the regulated-pressure chamber is established while the communication between the low-pressure passage and the regulated-pressure chamber is shut off, when the movable member moves from the moving end position toward the second-end side.

The valve mechanism of the pressure regulator according to this form may have a spool, for instance, that moves together with the movable member and may be configured to switch fluid passages for the working fluid by a movement of the spool. Alternatively, the movable member per se may function as the spool. Where such a spool is provided, the pressure regulator may be configured to switch between: the communication between the low-pressure passage and the regulated-pressure chamber; and the communication between the high-pressure passage and the regulated-pressure chamber, in accordance with the movement of the spool.

(37) The pressure regulator according to the form (36), wherein the third biasing mechanism is configured such that a ratio of an increase in the biasing force for biasing the movable member with respect to an increase in the pressure of the regulated-pressure chamber increases when the pressure of the regulated-pressure chamber exceeds a second set pressure that is higher than the set pressure.

Where the pressure regulator is configured to operate such that the force that biases the movable member toward the second-end side by the pilot pressure and the force that biases the movable member toward the first-end side by the regulated-pressure chamber are balanced with each other as described above, the forces can be balanced with each other by a smaller increase amount of the pressure of the regulated-pressure chamber with respect to an increase amount of the pilot pressure, after the pressure of the regulated-pressure chamber has exceeded the second set pressure. Therefore, the increase gradient of the regulated pressure indicated above becomes small after the pressure of the regulated-pressure chamber has exceeded the second set pressure. Accordingly, in a case where the pressure regulator of this form is provided in the hydraulic brake system described above, the increase gradient of the regulated pressure becomes small in the midst of the brake operation, and the pressure of the pressurizing chamber is hard to be increased. As a result, it is possible to prevent the regulated pressure from being excessively increased with respect to an increase of the operation amount and to thereby prevent the hydraulic braking force from being excessively increased, whereby the operation feeling in the brake operation can be enhanced. Here, the increase gradient of the regulated pressure that changes when the pressure of the regulated-pressure chamber exceeds the second set pressure may change from a time point when the pilot pressure reaches a certain level or may change stepwise or moderately, in accordance with an increase of the pilot pressure.

(38) The pressure regulator according to the form (36) or (37),
wherein the third biasing mechanism has:
a hollow piston supported by the housing on the second-side end of the movable member and configured to receive, at its end face on the first-end side, the pressure of the regulated-pressure chamber, so as to be movable toward the second-end side, the second plunger being fitted in the hollow piston; and
a rubber member disposed on the second-end side of the second plunger and the hollow piston such that the second plunger and the hollow piston cooperate with the housing to sandwich the rubber member therebetween, and
wherein the third biasing mechanism is configured such that, when the hollow piston moves toward the second-end side by the pressure of the regulated-pressure chamber, a central portion of the rubber member elastically deforms toward the first-end side so as to protrude into the hollow piston while a perimeter portion of the rubber member is compressed toward the second-end side and such that, when the pressure of the regulated-pressure chamber exceeds the set pressure, the rubber member biases, by its elastic reaction force, the movable member toward the first-end side via the second plunger, with the central portion of the rubber member held in contact with an end face of the second plunger on the second-end side.

The third biasing mechanism of this form utilizes properties of the rubber member, namely, properties that the rubber member deforms in accordance with a force that acts thereon. In the pressure regulator of this form, the central portion of the rubber member is spaced apart from the second plunger until the pressure of the regulated-pressure chamber becomes equal to the set pressure, and a force by the pressure of the regulated-pressure chamber is utilized for deforming the rubber member. That is, the pressure regulator of this form operates such that a force that pushes the hollow piston by the pressure of the regulated-pressure chamber and the elastic reaction force by deformation of the rubber member are balanced with each other. Thus, the rubber member may be regarded as a reaction-force generating member that generates, owing to its elastic reaction force, a reaction force against the regulated pressure. When the pressure of the regulated-pressure chamber exceeds the set pressure, the central portion of the rubber member comes into contact with the second plunger, and the movable member is accordingly biased toward the first-end side via the second plunger, so that the pressure of the regulated-pressure chamber stops increasing. In the pressure regulator of this form, the second plunger is fitted in the hollow piston, whereby the entire length of the pressure regulator can be made relatively small, and the pressure regulator is accordingly compact in size.

(39) The pressure regulator according to the form (38), wherein an end portion of the second plunger on the second-end side has a shape whose cross-sectional area increases in a direction from the second-end side toward the first-end side, such that a contact area of the end face of the second plunger on the second-end side with which the central portion of the rubber member comes into contact increases with an increase in an amount by which the central portion protrudes into the hollow piston.

According to the pressure regulator of this form, an area of the second plunger on which the pressure generated by the rubber member acts increases as deformation of the rubber member proceeds, so that a force that acts on the second plunger from the rubber member increases. Therefore, the above-indicated forces can be balanced with each other, namely, the force that biases the movable member toward the second-end side by the pilot pressure and the force that biases the movable member toward the first-end side by the regulated-pressure chamber can be balanced with each other, such that the increase gradient of the regulated pressure becomes smaller as deformation of the rubber member proceeds. It is accordingly possible to prevent the regulated pressure from being excessively increased and to thereby prevent the hydraulic braking force from being excessively increased with respect to an increase of the brake operation amount, whereby the operation feeling in the brake operation can be enhanced.

The end portion of the second plunger on the second-end side may have a shape whose cross-sectional area reduces in a direction from the first-end side toward the second-end side, for instance. In this case, the end portion of the second plunger on the second-end side may be continuously tapered, namely, pointed, toward the second-end side, for instance. Alternatively, the end portion may have a shape whose cross-sectional area reduces stepwise, in other words, the end portion may have a stepped surface facing the second-end side. In a case where the end portion has the stepped surface, the rubber member comes into contact first with the foremost face of the second plunger on the second-end side and then with the stepped surface as deformation of the rubber member proceeds. Because the increase gradient of the regulated pressure described above becomes small after the rubber member has contacted the stepped surface, the pressure of the regulated-pressure chamber at the time of contact of the rubber member with the stepped surface may be regarded as the second set pressure.

(40) The pressure regulator according to the form (36) or (37),
wherein the second plunger is configured to be movable toward the first-end side by the pressure of the regulated-pressure chamber that acts on an end face of the second plunger on the second-end side,
wherein the third biasing mechanism has a second-plunger biasing member configured to bias the second plunger toward the second-end side, and
wherein the third biasing mechanism is configured such that the second plunger moves, by the pressure of the regulated-pressure chamber, toward the first-end side against the biasing toward the second-end side by the second-plunger biasing member and such that, when the pressure of the regulated-pressure chamber exceeds the set pressure, the second plunger comes into contact with the movable member and the movable member is biased toward the first-end side via the second plunger with the second plunger held in contact with the movable member.

According to the pressure regulator of this form, a force generated toward the second-end side by the second-plunger biasing member when the second plunger comes into contact with the movable member may be regarded as the set load for setting initiation of biasing the movable member toward the first-end side by the second plunger. In other words, when the force by the pressure of the regulated-pressure chamber for biasing the second plunger toward the first-end side exceeds the set load, the second plunger starts to bias the movable member toward the first-end side. In this respect, the second-plunger biasing member may be regarded as a set load applying member that applies the set load to the second plunger.

(41) The pressure regulator according to the form (40),
wherein the third biasing mechanism has:
a second-plunger support member that is movably supported by the housing and that movably supports the second plunger, the second-plunger support member being movable toward the first-end side by the pressure of the regulated-pressure chamber that acts on an end face thereof on the second-end side; and
a support-member biasing member configured to bias the second-plunger support member toward the second-end side,
wherein the third biasing mechanism is configured such that the second-plunger support member moves, by the pressure of the regulated-pressure chamber, toward the first-end side against the biasing toward the second-end side by the support-member biasing member and such that, when the pressure of the regulated-pressure chamber exceeds a second set pressure that is higher than the set pressure, a movement of the second-plunger support member with respect to the second plunger is prohibited and the second-plunger support member biases the movable member toward the first-end side via the second plunger in a state in which the movement is prohibited.

According to the pressure regulator of this form, the movable member is biased toward the first-end side by the force by the pressure of the regulated-pressure chamber that acts on the second plunger until the pressure of the regulated-pressure chamber exceeds the second set pressure. When the pressure of the regulated-pressure chamber exceeds the second set pressure, the movable member is biased also by the force by the pressure of the regulated-pressure chamber that acts on the second-plunger support member, in addition to the force by the pressure of the regulated-pressure chamber that acts on the second plunger. Therefore, after the second-plunger support member has been prohibited from moving relative to the second plunger, an increase amount of the force that biases the movable member toward the first-end side by the pressure of the regulated-pressure chamber is increased with respect to an increase amount of the pressure of the regulated-pressure chamber. In other words, the increase gradient of the regulated pressure described above becomes small. Accordingly, in a case where the pressure regulator of this form is provided in the hydraulic brake system described above, it is possible to prevent the regulated pressure from being excessively increased and to thereby prevent the hydraulic braking force from being excessively increased with respect to the operation amount, whereby the operation feeling in the brake operation can be enhanced.

The second-plunger support member is prohibited from moving relative to the second plunger by contact of the second-plunger support member with the second plunger, for instance. It may be regarded that the second plunger is subjected to the second set load toward the second-end side applied by the support-member biasing member and the second-plunger biasing member. That is, when the force by the pressure of the regulated-pressure chamber for biasing the second-plunger support member and the second plunger toward the first-end side exceeds the second set load, the second-plunger support member starts to bias the movable member toward the first-end side. In this respect, the support-member biasing member and the second-plunger biasing member may be regarded as a second set load applying member that applies the second set load to the second plunger.

(42) The pressure regulator according to the form (41),
wherein the second plunger has a flange formed on an outer circumference thereof,
wherein the second-plunger support member has a hollow shape,
wherein the second plunger is fitted into the second-plunger support member from the first-end side such that the second-plunger support member comes into contact with the flange of the second plunger from the second-end side, and
wherein, when the pressure of the regulated-pressure chamber exceeds the second set pressure, the second-plunger support member comes into contact with the flange of the second plunger, whereby the movement of the second-plunger support member toward the first-end side with respect to the second plunger is prohibited.

According to the pressure regulator of this form, it is possible to prohibit the second-plunger support member from moving relative to the second plunger by a relatively simple structure. Further, because the second plunger is fitted in the second-plunger support member, the entire length of the pressure regulator can be made relatively small, and the pressure regulator is relatively compact in size.

(45) The pressure regulator according to the form (35),
wherein the regulated-pressure chamber is formed around an outer circumference of the movable member,
wherein the first biasing mechanism is configured to also bias the first plunger toward the first-end side,
wherein the valve mechanism has:
a regulated-pressure passage formed in the movable member, the regulated-pressure passage communicating, at one end thereof, with the regulated-pressure chamber and having, at the other end thereof, an opening that is open to an end face of the movable member on the first-end side; and
a structure in which an end portion of the first plunger on the second-end side is abuttable on the movable member so as to close the opening of the regulated-pressure passage, and
wherein the valve mechanism is configured to effectuate
(a) a state in which communication between the high-pressure passage and the regulated-pressure chamber is shut off while communication between the low-pressure passage and the regulated-pressure chamber is established, when the movable member is located at a moving end position on the first-end side in a state in which the first plunger is spaced apart from the movable member and (b) a state in which the communication between the high-pressure passage and the regulated-pressure chamber is established while the communication between the low-pressure passage and the regulated-pressure chamber is shut off, when the movable member moves from the moving end position toward the second-end side in a state in which the first plunger is in abutting contact with the movable member.

The valve mechanism of the pressure regulator of this form may be regarded as having two valve devices. Where one of the two valve devices is referred to as a first valve device, the first valve device may be a poppet valve, for instance. In this case, the poppet valve may be configured such that, when the movable member is located at the moving end position of the first-end side, a valve element comes into contact with a valve seat so as to shut off the communication between the high-pressure passage and the regulated-pressure chamber and such that, when the movable member moves from the moving end position toward the second-end side, the valve element is separated away from the valve seat so as to permit the communication between the high-pressure passage and the regulated-pressure chamber. Alternatively, the first valve device may be a device having the spool described above and configured to permit the communication between the high-pressure passage and the regulated-pressure chamber and to shut off the communication therebetween. Where the other of the two valve devices is referred to as a second valve device, the second valve device may be a poppet valve, for instance, configured such that the end portion of the first plunger on the second-end side functions as a valve element and the opening of the regulated-pressure passage on the first-end side functions as a valve seat.

(46) The pressure regulator according to the form (45),
wherein the third biasing mechanism is configured such that a ratio of an increase in the biasing force for biasing the one of the movable member and the first plunger, with respect to an increase in the pressure of the regulated-pressure chamber increases when the pressure of the regulated-pressure chamber exceeds a second set pressure that is higher than the set pressure.

Like the pressure regulator described above, the pressure regulator of this form may be configured such that the increase gradient of the regulated pressure becomes small after the pressure of the regulated-pressure chamber has exceeded the second set pressure. Accordingly, where the pressure regulator of this form is provided in the hydraulic brake system described above, it is possible to enhance the operation feeling in the brake operation.

(47) The pressure regulator according to the form (45) or (46),
wherein the second plunger is configured to be movable toward the first-end side by the pressure of the regulated-pressure chamber that acts on an end face of the second plunger on the second-end side,
wherein the third biasing mechanism has a second-plunger biasing member configured to bias the second plunger toward the second-end side, and
wherein the third biasing mechanism is configured such that the second plunger moves, by the pressure of the regulated-pressure chamber, toward the first-end side against the biasing toward the second-end side by the second-plunger biasing member and such that, when the pressure of the regulated-pressure chamber exceeds the set pressure, the second plunger comes into contact with the one of the movable member and the first plunger and the one of the movable member and the first plunger is biased toward the first-end side via the second plunger with the second plunger held in contact with the one of the movable member and the first plunger.

As in the pressure regulator described above, in the pressure regulator of this form, a force generated toward the second-end side by the second-plunger biasing member when the second plunger comes into contact with the movable member or the first plunger may be regarded as the set load for setting initiation of biasing the movable member or the first plunger toward the first-end side by the second plunger. In this respect, the second-plunger biasing member may be regarded as a set load applying member that applies the set load to the second plunger.

(48) The pressure regulator according to the form (47),
wherein the second plunger is disposed on the second-end side of the movable member, and
wherein the third biasing mechanism is configured such that, when the pressure of the regulated-pressure chamber exceeds the set pressure, the second plunger comes into contact with the movable member and such that the movable member is biased toward the first-end side with the second plunger held in contact with the movable member.

According to the pressure regulator of this form, the second plunger comes into contact with the movable member. Accordingly, an increase in the pressure of the regulated-pressure chamber is effectuated such that a force that biases the movable member toward the second-end side by the pilot pressure is balanced with the biasing force that acts on the end portion of the first plunger on the second-end side by the pressure of the regulated-pressure chamber and a force that biases the movable member toward the first-end side via the second plunger by the pressure of the regulated-pressure chamber.

(49) The pressure regulator according to the form (47),
wherein the second plunger is disposed on the first-end side of the movable member, and
wherein the third biasing mechanism is configured such that, when the pressure of the regulated-pressure chamber exceeds the set pressure, the second plunger comes into contact with the first plunger and such that the first plunger is biased toward the first-end side with the second plunger held in contact with the first plunger.

According to the pressure regulator of this form, the second plunger comes into contact with the first plunger. Accordingly, an increase in the pressure of the regulated-pressure chamber is effectuated such that the force that biases the movable member toward the second-end side by the pilot pressure is balanced with the biasing force that acts on the end portion of the first plunger on the second-end side by the pressure of the regulated-pressure chamber and a force that biases the first plunger toward the first-end side via the second plunger by the pressure of the regulated-pressure chamber.

(50) The pressure regulator according to the form (47),
wherein the third biasing mechanism has:
a second-plunger support member that is movably supported by the housing and that movably supports the second plunger, the second-plunger support member being movable toward the first-end side by the pressure of the regulated-pressure chamber that acts on an end face thereof on the second-end side; and
a support-member biasing member configured to bias the second-plunger support member toward the second-end side, and
wherein the third biasing mechanism is configured such that the second-plunger support member moves, by the pressure of the regulated-pressure chamber, toward the first-end side against the biasing toward the second-end side by the support-member biasing member and such that, when the pressure of the regulated-pressure chamber exceeds a second set pressure that is higher than the set pressure, a movement of the second-plunger support member with respect to the second plunger is prohibited and the second-plunger support member biases the one of the movable member and the first plunger toward the first-end side via the second plunger in a state in which the movement is prohibited.

Like the pressure regulator described above, the pressure regulator of this form is configured such that the increase gradient of the regulated pressure becomes small after the pressure of the regulated-pressure chamber has exceeded the second set pressure. Accordingly, where the pressure regulator of this form is provided in the hydraulic brake system described above, it is possible to prevent the regulated pressure from being excessively increased and to thereby prevent the hydraulic braking force from being excessively increased, so that the operation feeling in the brake operation can be enhanced.

As in the pressure regulator described above, in the third biasing mechanism of the pressure regulator according to this form, it may be regarded that the second plunger is subjected to the second set load toward the second-end side applied by the support-member biasing member and the second-plunger biasing member. In this respect, the support-member biasing member and the second-plunger biasing member may be regarded as a second set load applying member that applies the second set load to the second plunger.

(51) The pressure regulator according to the form (50),
wherein the second plunger is disposed on the second-end side of the movable member, and
wherein the third biasing mechanism is configured (a) such that, when the pressure of the regulated-pressure chamber exceeds the set pressure, the second plunger comes into contact with the movable member and the movable member is biased toward the first-end side with the second plunger held in contact with the movable member and (b) such that, when the pressure of the regulated-pressure chamber exceeds the second set pressure, the movement of the second-plunger support member with respect to the second plunger is prohibited and the second-plunger support member biases the movable member toward the first-end side via the second plunger in a state in which the movement is prohibited.

As in the pressure regulator described above, in the pressure regulator according to this form, an increase in the pressure of the regulated-pressure chamber is effectuated such that the force that biases the movable member toward the second-end side by the pilot pressure is balanced with the biasing force that acts on the end portion of the first plunger on the second-end side by the pressure of the regulated-pressure chamber and a force that biases the movable member toward the first-end side via the second plunger by the pressure of the regulated-pressure chamber. Further, the pressure regulator of this form is configured such that the increase gradient of the regulated pressure becomes small after the pressure of the regulated-pressure chamber has exceeded the second set pressure. Accordingly, where the pressure regulator of this form is provided in the hydraulic brake system described above, it is possible to prevent the regulated pressure from being excessively increased and to thereby prevent the hydraulic braking force from being excessively increased, so that the operation feeling in the brake operation can be enhanced.

(52) The pressure regulator according to the form (51),
wherein the second plunger has a stepped surface formed on an outer circumference thereof so as to face toward the second-end side,
wherein the second-plunger support member has a hollow shape,
wherein the second plunger is fitted into the second-plunger support member from the first-end side such that the second-plunger support member comes into contact with the stepped surface of the second plunger from the second-end side, and wherein the third biasing mechanism is configured such that the second plunger moves, by the pressure of the regulated-pressure chamber, toward the first-end side against the biasing toward the second-end side by the second-plunger biasing member, (a) such that, when the pressure of the regulated-pressure chamber exceeds the set pressure, the second plunger comes into contact with the movable member and the movable member is biased toward the first-end side with the second plunger held in contact with the movable member, and (b) such that, when the pressure of the regulated-pressure chamber exceeds the second set pressure, the second-plunger support member comes into contact with the stepped surface of the second plunger to thereby prohibit a movement of the second-plunger support member toward the first-end side with respect to the second plunger and the second-plunger support member biases the movable member toward the first-end side via the second plunger in a state in which the movement is prohibited.

The pressure regulator according to this form is configured such that, when the pressure of the regulated-pressure chamber exceeds the set pressure, the second plunger comes into contact with the movable member and such that, when the pressure of the regulated-pressure chamber exceeds the second set pressure, the increase gradient of the regulated pressure becomes small. According to the pressure regulator of this form, it is possible to prohibit the second-plunger support member from moving relative to the second plunger in a relatively simple structure. Further, because the second plunger is fitted in the second-plunger support member, the entire length of the pressure regulator can be made relatively small, and the pressure regulator is relatively compact in size.

(53) The pressure regulator according to the form (50), wherein the second plunger is disposed on the first-end side of the movable member, and wherein the third biasing mechanism is configured (a) such that, when the pressure of the regulated-pressure chamber exceeds the set pressure, the second plunger comes into contact with the first plunger and the first plunger is biased toward the first-end side with the second plunger held in contact with the first plunger and (b) such that, when the pressure of the regulated-pressure chamber exceeds the second set pressure, the movement of the second-plunger support member with respect to the second plunger is prohibited and the second-plunger support member biases the first plunger toward the first-end side via the second plunger in a state in which the movement is prohibited.

As in the pressure regulator described above, in the pressure regulator according to this form, an increase in the pressure of the regulated-pressure chamber is effectuated such that the force that biases the movable member toward the second-end side by the pilot pressure is balanced with the biasing force that acts on the end portion of the first plunger on the second-end side by the pressure of the regulated-pressure chamber and the force that biases the first plunger toward the first-end side via the second plunger by the pressure of the regulated-pressure chamber. Further, the pressure regulator of this form is configured such that the increase gradient of the regulated pressure becomes small after the pressure of the regulated-pressure chamber has exceeded the second set pressure. Accordingly, where the pressure regulator of this form is provided in the hydraulic brake system described above, it is possible to prevent the regulated pressure from being excessively increased and to thereby prevent the hydraulic braking force from being excessively increased, so that the operation feeling in the brake operation can be enhanced.

(54) The pressure regulator according to the form (53), wherein the second plunger has a hollow shape and a stepped surface formed on an outer circumference thereof so as to face toward the second-end side, wherein the first plunger has a stepped surface formed on an the outer circumference thereof so as to face toward the second-end side, wherein the second-plunger support member has a hollow shape, wherein the first plunger is fitted into the second plunger from the first-end side such that the second plunger comes into contact with the stepped surface of the first plunger from the second-end side, wherein the second plunger is fitted into the second-plunger support member from the first-end side such that the second-plunger support member comes into contact with the stepped surface of the second plunger from the second-end side, and wherein the third biasing mechanism is configured (A) such that, when the pressure of the regulated-pressure chamber exceeds the set pressure, the second plunger comes into contact with the stepped surface of the first plunger and the first plunger is biased toward the first-end side with the second plunger held in contact with the stepped surface and (B) such that, when the pressure of the regulated-pressure chamber exceeds the second set pressure, the second-plunger support member comes into contact with the stepped surface of the second plunger to thereby prohibit the movement of the second-plunger support member toward the first-end side with respect to the second plunger and the second-plunger support member biases the first plunger toward the first-end side via the second plunger in a state in which the movement is prohibited.

The pressure regulator according to this form is configured such that, when the pressure of the regulated-pressure chamber exceeds the set pressure, the second plunger comes into contact with the first plunger and such that, when the pressure of the regulated-pressure chamber exceeds the second set pressure, the increase gradient of the regulated pressure becomes small. According to the pressure regulator of this form, it is possible to prohibit the second-plunger support member from moving relative to the second plunger in a relatively simple structure. Further, because the second plunger is fitted in the second-plunger support member and the first plunger is fitted in the second plunger, the entire length of the pressure regulator can be made relatively small, and the pressure regulator is relatively compact in size.

(60) The vehicle brake system according to any one of the forms (0)-(30), wherein the pressure regulator device includes the pressure regulator defined in any one of the forms (35)-(54).

According to the vehicle brake system of this form, the pressure of the working fluid supplied from the high-pressure source is regulated by the pressure regulator described above, and the pressure-regulated working fluid is supplied to the master cylinder device or the brake device. As a result, the regulated pressure is equal to the pressure of the working fluid in the regulated-pressure chamber of the pressure regulator. In the hydraulic brake system of this form, therefore, the pressure of the working fluid can be regulated by a relatively inexpensive mechanical pressure regulator that operates utilizing the pilot pressure.

(61) The vehicle brake system according to the form (60), wherein the pressure regulator device is configured such that the pressure of the working fluid is regulated by the pressure regulator in a period from a time point of initiation of the brake operation to a time point when the operation amount becomes constant.

In the vehicle brake system according to this form, the pressure regulator described above is utilized for regulating the pressure of the working fluid supplied from the high-pressure source, in the hydraulic-braking impossible situation after operation initiation and in the hydraulic-braking possible situation after operation initiation. In the pressure regulator described above, the pressure of the regulated-pressure chamber can be rapidly increased by slightly increasing the pilot pressure. Where the working fluid to be supplied to the brake device is pressurized in dependence on the pressure of the working fluid regulated by the pressure regulator, the brake device becomes capable of generating the braking force by applying a slight operation force. According to the vehicle brake system of this form, therefore, the braking force can be generated by the hydraulic brake system relatively quickly after initiation of the brake operation, so that the vehicle can be braked or stopped by the hydraulic brake system, thereby preventing deterioration in the vehicle stability and maneuverability.

DESCRIPTION OF EMBODIMENTS

There will be hereinafter explained in detail embodiments of the claimable invention with reference to drawings. It is to be understood that the claimable invention is not limited to the following embodiments and modified examples, but may be embodied with various changes and modifications based on the knowledge of those skilled in the art.

First Embodiment

<Structure of Vehicle>

Figure 1:
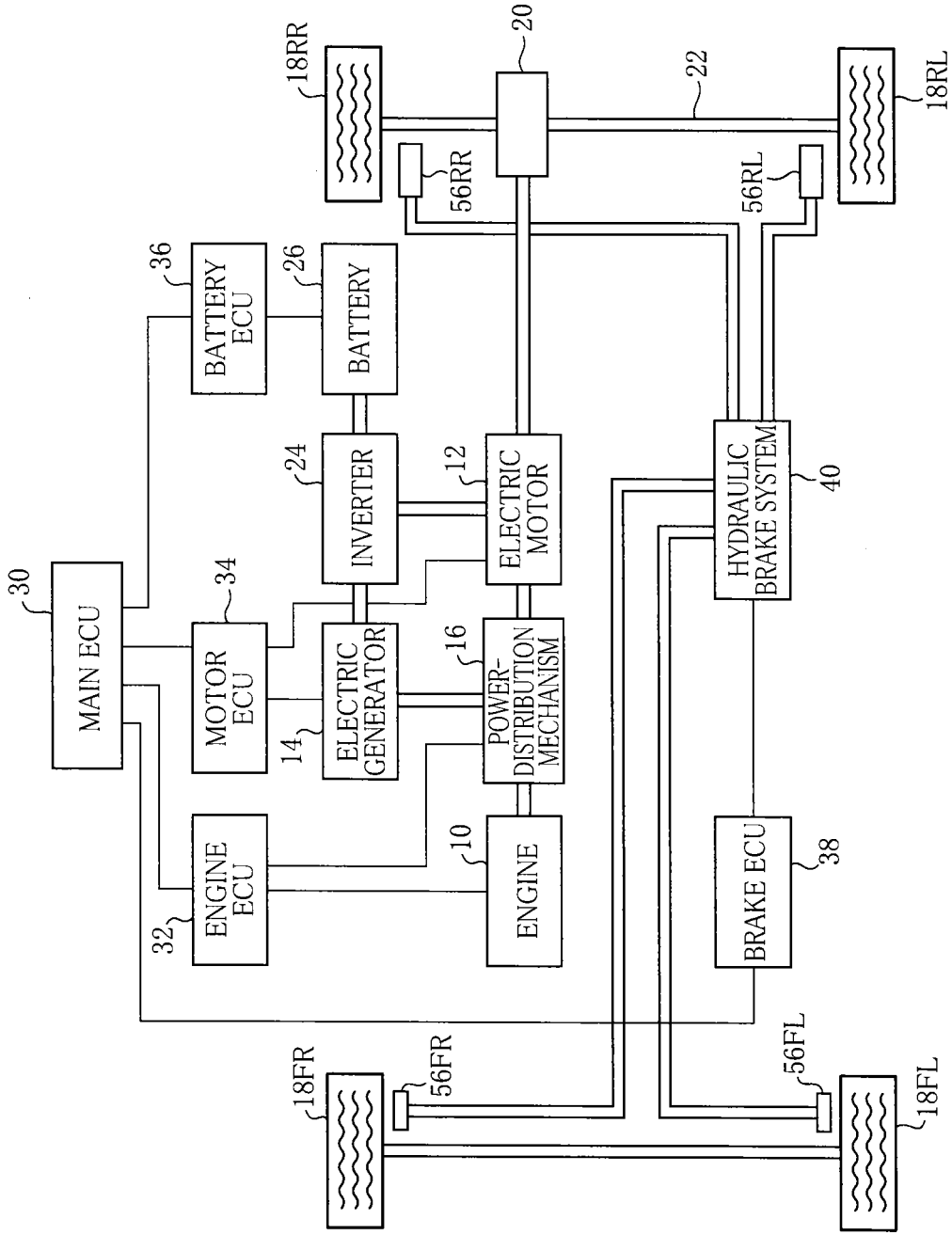
FIG. 1 is a schematic view showing a drive system and a brake system of a hybrid vehicle on which are mounted a vehicle brake system and a pressure regulator according to a first embodiment of the claimable invention.

FIG. 1 schematically shows a drive system and a brake system of a hybrid vehicle. The vehicle is equipped with an engine 10 and an electric motor 12, each as a power source, and is also equipped with an electric generator 14 that generates electricity by an output power of the engine 10. The engine 10, the electric motor 12, and the electric generator 14 are connected to one another by a power-distribution mechanism 16. By controlling the power-distribution mechanism 16, the output power of the engine 10 is divided into an output power for driving the electric generator 14 and an output power for rotating drive wheels among four wheels 18, and an output power of the electric motor 12 is transmitted to the drive wheels. That is, the power-distribution mechanism 16 functions as a speed changing mechanism with respect to a driving power to be transmitted to the drive wheels via a speed reducer 20 and a drive shaft 22. Where it is necessary to indicate to which one of the four wheels each of some constituent elements such as "wheels 18" corresponds, there is attached, to a reference numeral of a constituent element, a suitable one of suffixes "FL", "FR", "RL", and "RR" respectively indicative of a front left wheel, a front right wheel, a rear left wheel, and a rear right wheel. According to the usage of the suffixes, the drive wheels of the vehicle are represented as a wheel 18RL and a wheel 18RR.

The electric motor 12 is an alternating current (AC) synchronous motor and is driven by AC electricity. The vehicle is equipped with an inverter 24 by which electricity of direct current is inverted to electricity of alternating current and vice versa. Accordingly, by controlling the inverter 24, electricity of alternating current generated by the electric generator 14 is inverted into electricity of direct current for charging a battery 26 and electricity of direct current that is charged in the battery 26 is inverted into electricity of alternating current for driving the electric motor 12. Like the electric motor 12, the electric generator 14 is configured as an alternating current (AC) synchronous motor. Accordingly, the vehicle of the present embodiment may be regarded as having two AC synchronous motors. One of them is the electric motor 12 used to mainly output the driving power, and the other of them is the electric generator 14 used to generate electricity mainly by the output power of the engine 10.

The electric motor 12 is configured to also generate (regenerate) electricity by utilizing rotation of the wheels 18RL, 18RR in association with running of the vehicle. In this instance, the electric motor 12 connected to the wheels 18RL, 18RR generates a resistance for restraining rotation of the electric motor 12 while generating electricity. Accordingly, it is possible to utilize the resistance as a braking force to brake or stop the vehicle. That is, the electric motor 12 is utilized as a means for a regenerative brake for braking the vehicle while generating electricity. Thus, the vehicle is braked by controlling the regenerative brake system together with an engine brake and a hydraulic brake that will be explained. On the other hand, the electric generator 14 generates electricity mainly by the output power of the engine 10 and functions also as an electric motor that operates by electricity supplied from the battery 26 via the inverter 24.

In the vehicle, the above controls of braking and other controls relating to the vehicle are executed by a plurality of electronic control units (ECU). Among the plurality of ECUs, a main ECU 30 has a function of supervising execution of the controls. For instance, the hybrid vehicle is configured to run by driving of the engine 10 and driving of the electric motor 12 that are controlled as a whole by the main ECU 30. To the main ECU 30 is also connected a battery ECU 36 for controlling the battery 26. The battery ECU 36 monitors a charge status of the battery 26 and sends a charge-request command to the main ECU 30 when the charge is short. When the main ECU 30 receives the charge-request command, the main ECU 30 sends, to a motor ECU 34, a command for electricity generation by the electric generator 14, so as to charge the battery 26.

To the main ECU 30 is also connected a brake ECU 38 for controlling the braking. The vehicle in the present embodiment is provided with a brake operating member (hereinafter simply referred to as "operating member" where appropriate) that is operated by a driver. The brake ECU 38 determines a required braking force on the basis of a brake operation force (hereinafter simply referred to as "operation force" where appropriate) that is a force applied to the operating member by the driver. As later explained in detail, the brake ECU 38 further determines, in the required braking force, a braking force generated by a regenerative brake system (hereinafter simply referred to as "regenerative braking force" where appropriate) and a braking force generated by a hydraulic brake system 40 mounted on the vehicle (hereinafter simply referred to as "hydraulic braking force" where appropriate). The brake ECU 38 outputs the regenerative braking force to the main ECU 30, and the main ECU 30 outputs the regenerative braking force to the motor ECU 34. The motor ECU 34 controls the electric motor 12 on the basis of a value of the regenerative braking force. The hydraulic brake system 40 is controlled by the brake ECU 38 on the basis of a value of the hydraulic braking force. Thus, in the vehicle, the regenerative brake system utilizing the electric motor 12 and the hydraulic brake system 40 constitute a brake system for braking the vehicle.

<Structure of Hydraulic Brake System>

Figure 2:
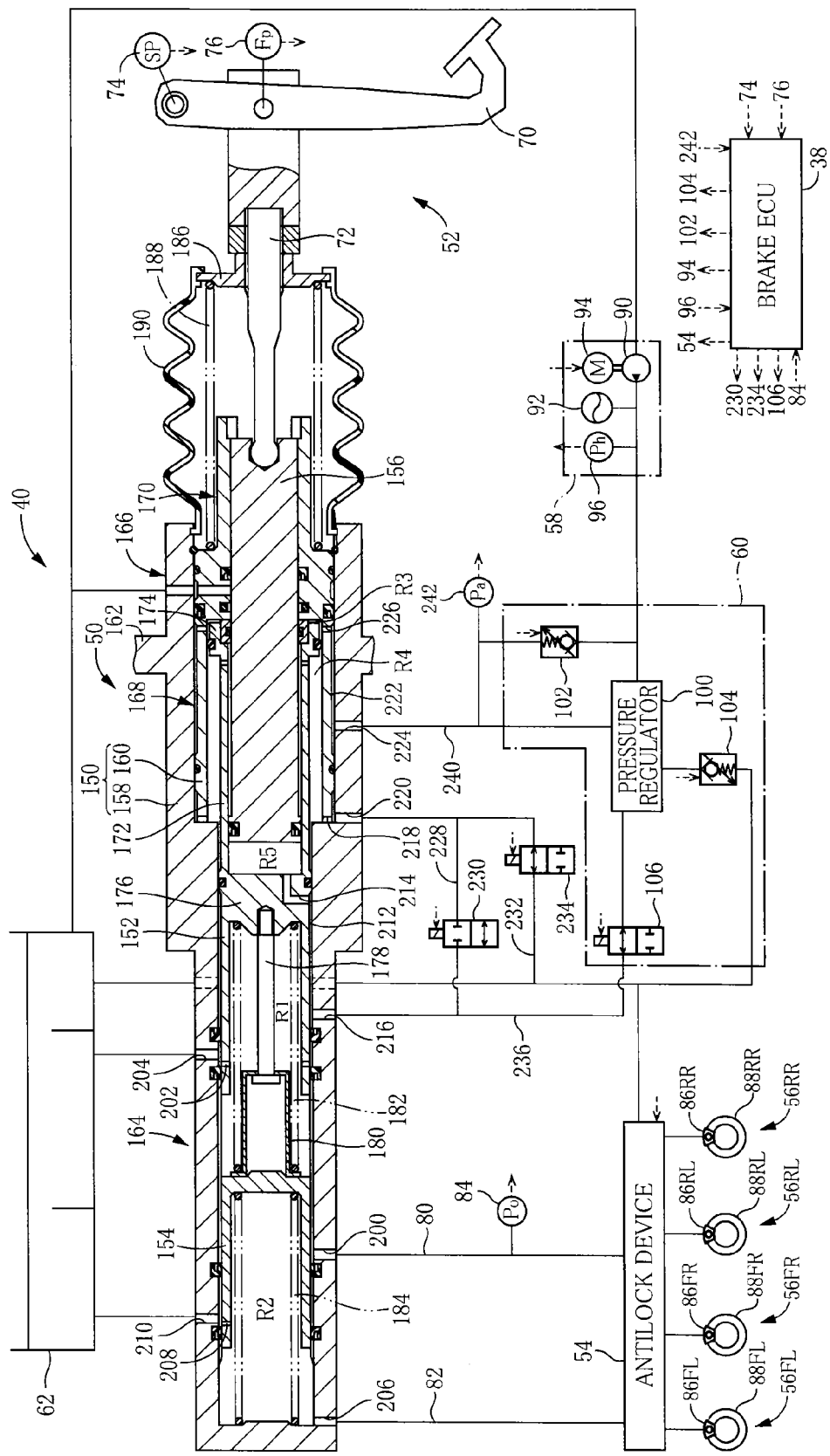
FIG. 2 is a view showing a hydraulic brake system for the vehicle brake system of the first embodiment.

Referring next to FIG. 2, the hydraulic brake system 40 mounted on the hybrid vehicle constructed as described above will be explained in detail. In the following explanation, terms such as "frontward (forward)" and "rearward" are used to indicate the leftward direction and the rightward direction, respectively, in FIG. 2. Further, terms such as "front side", "front end", "forward movement (advancing movement)", "rear side", "rear end", and "rearward movement (retracting movement)" are used similarly. In the following explanation, characters enclosed with square brackets [ ] represent sensors and the like in the drawings.

FIG. 2 schematically shows the hydraulic brake system 40 of the vehicle in the present embodiment. The hydraulic brake system 40 has a master cylinder device 50 for pressurizing a working fluid. A driver of the vehicle can activate the master cylinder device 50 by operating an operating device 52 connected to the master cylinder device 50. The master cylinder device 50 pressurizes the working fluid by its own activation. The pressurized working fluid is supplied to each of brake devices 56 provided for the respective wheels via an antilock device 54 connected to the master cylinder device 50. Each brake device 56 generates a force for restraining rotation of the corresponding wheel 18, namely, the hydraulic braking force, in dependence on a pressure of the pressurized working fluid (hereinafter referred to as "master pressure" where appropriate).

The hydraulic brake system 40 has, as a high-pressure source, a high-pressure-source device 58 for increasing the pressure of the working fluid. The high-pressure-source device 58 is connected to the master cylinder device 50 via a pressure regulator device 60. The pressure regulator device 60 is configured to control the pressure of the working fluid that is highly increased by the high-pressure-source device 58 (hereinafter referred to as "high-pressure-source pressure" where appropriate) to be decreased to a level equal to or lower than the pressure and is configured to increase and decrease a pressure of the working fluid to be input to the master cylinder device 50 (hereinafter referred to as "regulated pressure" where appropriate). That is, the regulated pressure is a pressure of the working fluid having the high-pressure-source pressure regulated by the pressure regulator device 60 and may be referred to as a controlled high-pressure-source pressure. The master cylinder device 50 is operable by the decrease and the increase of the regulated pressure. The hydraulic brake system 40 has, as a low-pressure source, a reservoir 62 that stores the working fluid at atmospheric pressure. The reservoir 62 is connected to the master cylinder device 50, the pressure regulator device 60, and the high-pressure-source device 58.

The operating device 52 includes a brake pedal 70 as the brake operation member and an operation rod 72 connected to the brake pedal 70. The brake pedal 70 is pivotally held, at its upper end portion, by a body of the vehicle. The operation rod 72 is connected, at its rear end portion, to the brake pedal 70 and is connected, at its front end portion, to the master cylinder device 50. Further, the operating device 52 has an operation-amount sensor [SP] 74 for detecting the operation amount of the brake pedal 70 and an operation-force sensor [FP] 76 for detecting an operation force. The operation-amount sensor 74 and the operation-force sensor 76 are connected to the brake ECU 38.

The brake devices 56 are connected to the master cylinder device 50 via fluid passages 80, 82. The fluid passages 80, 82 are for supplying, to the brake devices 56, the working fluid pressurized to the master pressure by the master cylinder device 50. In this respect, the fluid passage 80 is connected to the brake device 56RL, 56RR for the rear wheels while the fluid passage 82 is connected to the brake devices 56FL, 56FR for the front wheels. A master pressure sensor [Po] 84 is provided on the fluid passage 80 and is connected to the brake ECU 38. While a detailed explanation of the brake devices 56 is omitted, each of the brake devices 56 is an ordinary disc brake device including a brake caliper 86 held by a carrier that supports the corresponding wheel and a brake disc 88, as a rotor, configured to rotate with the corresponding wheel 18. While a detailed explanation of the structure of the brake caliper 86 is omitted, the brake caliper 86 has a brake cylinder configured to operate based on the master pressure and brake pads configured to be pressed onto the brake disc 88 by the operation of the brake cylinder. In other words, each brake device 56 is configured such that the brake cylinder as a pressing mechanism presses, based on the master pressure, the brake pads, each as a friction member, onto the brake disc 88, thereby restraining rotation of the corresponding wheel owing to a friction force generated by the pressing. The brake devices 56FL, FR for the front wheels and the brake devices 56RL, RR for the rear wheels are designed such that a balance between the braking force on the front-wheel side and the braking force on the rear-wheel side is optimum when the vehicle is braked only by the hydraulic brake system 40.

The antilock device 54 is an ordinary device and, in short, has four pairs of open/close valves corresponding to the respective wheels. One of the open/close valves in each pair is a pressure-increase open/close valve and is kept in an open state when the wheel is not locked while the other of the open/close valves in each pair is a pressure-decrease open/close valve and is kept in a closed state when the wheel is not locked. The antilock device 54 is configured such that, when the wheel is locked, the pressure-increase open/close valve shuts off a flow of the working fluid from the master cylinder device 50 to the brake device 56 and the pressure-decrease open/close valve permits a flow of the working fluid from the brake device 56 to the reservoir, in order to release the lock of the wheel.

The high-pressure-source device 58 includes: a hydraulic pump 90 that pumps up the working fluid from the reservoir 62 so as to increase the pressure of the working fluid; and an accumulator 92 in which is stored the pressure-increased working fluid. The hydraulic pump 90 is driven by an electric motor 94. The high-pressure-source device 58 further includes a high-pressure-source pressure sensor [Ph] 96 for detecting the pressure of the working fluid that is highly increased. The brake ECU 38 monitors values detected by the high-pressure-source pressure sensor 96, and the hydraulic pump 90 is drivingly controlled based on the detected values, whereby the high-pressure-source device 58 constantly supplies, to the pressure regulator device 60, the working fluid having a predetermined pressure.

The pressure regulator device 60 has: a pressure regulator 100 connected to the high-pressure-source device 58 and the reservoir 62; a pressure-increase linear valve 102 connected to the high-pressure-source device 58; and a pressure-decrease linear valve 104 connected to the reservoir 62. As later explained in detail, the pressure regulator 100 regulates the pressure of the working fluid from the high-pressure-source device 58 on the basis of a pilot pressure introduced thereinto and supplies the pressure-regulated working fluid to the master cylinder device 50. The pressure-increase linear valve 102 and the pressure-decrease linear valve 104 are connected to the brake ECU 38 and operate on the basis of a command from the brake ECU 38. The pressure-increase linear valve 102 is operable such that the pressure of the working fluid supplied to the master cylinder device 50 is increased while the pressure-decrease linear valve 104 is operable such that the pressure of the working fluid supplied to the master cylinder device 50 is decreased. The pressure-increase linear valve 102 is configured to be closed in a non-energized state while the pressure-decrease linear valve 104 is configured to be opened in a non-energized state. The pressure regulator device 60 further has a pilot-pressure introduction valve 106 that is a normally open valve and that is configured to perform introduction and shut-off of the working fluid having the pilot pressure and introduced into the pressure regulator 100. The pilot-pressure introduction valve 106 is connected to the brake ECU 38 and operates based on a command from the brake ECU 38.

<Structure of Master Cylinder Device>

The master cylinder device 50 includes: a housing 150 that is a casing of the master cylinder device 50; a first pressurizing piston 152 and a second pressurizing piston 154 that pressurize the working fluid to be supplied to the brake devices 56; and an input piston 156 to which an operation of the driver is input through the operation device 52. FIG. 2 shows a state in which the master cylinder device 50 is not operated, namely, a state in which a brake operation is not performed.

The housing 150 is constituted mainly by two members, i.e., a first housing member 158 and a second housing member 160. The first housing member 158 has a generally hollow cylindrical shape whose front end is closed. The first housing member 158 is fixed, to the body of the vehicle, at a flange 162 formed on an outer circumference at a rear end portion thereof. The first housing member 158 is sectioned into two portions having mutually different inner diameters, i.e., a front small-diameter portion 164 located on the front side and having a small inner diameter and a rear large-diameter portion 166 located on the rear side and having a large inner diameter. The second housing member 160 has a generally cylindrical shape and is sectioned into a front large-diameter portion 168 located on the front side and having a large inner diameter and a rear small-diameter portion 170 located on the rear side and having a small inner diameter. The second housing member 160 is fitted into the first housing member 158 such that a front end portion of the second housing member 160 is in contact with a stepped surface formed between the front small-diameter portion 164 and the rear large-diameter portion 166 of the first housing member 158.

The second pressurizing piston 154 has a cylindrical shape whose rear end is closed. The second pressurizing piston 154 is slidably fitted into the front small-diameter portion 164 of the first housing member 158 via seals. The first pressurizing piston 152 is disposed rearward of the second pressurizing piston 154 and has a body portion 172 having a cylindrical shape. A flange portion 174 is formed on an outer circumference of a rear end portion of the body portion 172. An inside of the body portion 172 is partitioned into two sections by a partition wall portion 176 provided at a middle position of the body portion 172 in a front-rear direction thereof. That is, the first pressurizing piston 152 has two blind holes which are defined by the partition wall portion 176 and which are open respectively at a front end and a rear end of the first pressurizing piston 152. The first pressurizing piston 152 is restricted from moving rearward by contact of the flange portion 174 with a stepped surface formed between the front large-diameter portion 168 and the rear small-diameter portion 170 of the second housing member 160.

There is defined, between the first pressurizing piston 152 and the second pressurizing piston 154, a first pressurizing chamber R1 for pressurizing the working fluid to be supplied to the brake device 56RL, RR provided for the respective two rear wheels. There is defined, forward of the second pressurizing piston 154, a second pressurizing chamber R2 for pressurizing the working fluid to be supplied to the brake device 56FL, FR provided for the respective two front wheels. In the first pressurizing piston 152, a headed pin 178 is screwed so as to extend from the bottom of the blind hole that is open on the front side. In the second pressurizing piston 154, a pin retaining tube 180 is fixed to a rear end face thereof. A distance by which the first pressurizing piston 152 and the second pressurizing piston 154 are spaced apart from each other is limited so as to be held within a predetermined range by the headed pin 178 and the pin retaining tube 180. In the first pressurizing chamber R1 and the second pressurizing chamber R2, there are respectively disposed compression coil springs 182, 184 (hereinafter each referred to as "return spring" where appropriate). The first pressurizing piston 152 and the second pressurizing piston 154 are biased rearward by the respective springs 182, 184 while being biased in directions in which the pistons 152, 154 separate from each other.

The input piston 156 has a generally columnar shape. The input piston 156 is fitted, on its front side, into the first pressurizing piston 152 so as to be held in a sliding contact with an inner circumferential surface of the blind hole of the first pressurizing piston 152 that is open at its rear end. Further, the input piston 156 is fitted, on its rear side, into the second housing member 160 so as to be held in a sliding contact with an inner circumferential surface of the rear small-diameter portion 170 of the second housing member 160. The operation rod 72 is connected to a rear end portion of the input piston 156 so as to transmit an operation force of the brake pedal 70 to the input piston 156 and so as to move the input piston 156 forward and rearward in accordance with the operation amount of the brake pedal 70. The input piston 156 is restricted from moving rearward by engagement of its rear end portion with a rear end portion of the second housing member 160. A disc-like spring seat 186 is fixed to the operation rod 72, and a compression coil spring 188 is disposed between the spring seat 186 and the second housing member 160. The operation rod 72 is biased rearward by the compression coil spring 188. A boot 190 is provided between the spring seat 186 and the housing 150 so as to protect a rear portion of the master cylinder device 50 from dust.

In the thus constructed master cylinder device 50, there is defined, between the flange portion 174 of the first pressurizing piston 152 and the second housing member 160, an annular fluid chamber (hereinafter referred to as "input chamber" where appropriate) R3 to which the working fluid is supplied from the pressure regulator device 60. It is noted that the input chamber R3 is illustrated in an almost deflated or compressed state in FIG. 2. On the front side of the flange portion 174, there is defined, between an inner circumferential surface of the second housing member 160 and an outer circumferential surface of the first pressurizing piston 152, an annular fluid chamber (hereinafter referred to as "opposing chamber" where appropriate) R4. The opposing chamber R4 is opposed to the input chamber R3 with the flange portion 174 interposed therebetween. There is provided a space between the blind hole of the first pressurizing piston 152 and a front end face of the input piston 156. That is, there is defined a fluid chamber (hereinafter referred to as "inter-piston chamber" where appropriate) R5. The first pressurizing piston 152 and the input piston 156 are opposed to each other with the inter-piston chamber R5 interposed therebetween. In the first pressurizing piston 152, a pressure receiving area of the first pressurizing piston 152 on which a pressure of the working fluid in the inter-piston chamber R5 acts forward, namely, an area of the bottom surface of the blind hole of the first pressurizing piston 152, is made equal to a pressure receiving area of the first pressurizing piston 152 on which a pressure of the working fluid in the opposing chamber R4 acts rearward, namely, an area of a front end face of the flange portion 174 of the first pressurizing piston 152.

The first pressurizing chamber R1 communicates with the fluid passage 80 connected to the antilock device 54, via a communication hole 200 provided in the first housing member 158, and is communicable with the reservoir 62 via a communication hole 202 provided in the first pressurizing piston 152 and a communication hole 204 provided in the first housing member 158. On the other hand, the second pressurizing chamber R2 communicates with the fluid passage 82 connected to the antilock device 54, via a communication hole 206 provided in the first housing member 158, and is communicable with the reservoir 62 via a communication hole 208 provided in the second pressurizing piston 154 and a communication hole 210 provided in the first housing member 158.

The first pressurizing piston 152 has an outer diameter somewhat smaller than an inner diameter of the front small-diameter portion 164 of the first housing member 158. There is formed, between the first pressurizing piston 152 and the front small-diameter portion 164, a fluid passage 212 having a certain cross-sectional area for fluid flow. In a bottom wall of the blind hole that is open on the rear side of the first pressurizing piston 152, there is formed a communication hole 214 whose one end is open to the inter-piston chamber R5 while the other end is open to the fluid passage 212. In the first housing member 158, there is provided a communication hole 216 whose one end is open to the fluid passage 212 while the other end functions as a connection port that is open to the exterior. Accordingly, the inter-piston chamber R5 communicates with the exterior via the communication hole 214, the fluid passage 212, and the communication hole 216.

At a front end of the front large-diameter portion 168 of the second housing member 160, there is provided a communication hole 218 whose one end is open to the opposing chamber R4 while the other end is open to the outer circumferential surface of the second housing member 160. In the first housing member 158, there is provided a communication hole 220 whose one end is open so as to be opposed to the other end of the communication hole 218 and whose other end functions as a connection port that is open to the exterior. Accordingly, the opposing chamber R4 communicates with the exterior via the communication hole 218, 220.

The front large-diameter portion 168 of the second housing member 160 has, at its rear portion, an outer diameter somewhat smaller than an inner diameter of the rear large-diameter portion 166 of the first housing member 158, whereby there is defined, between the housing members 158, 160, a fluid passage 222 having a certain cross-sectional area for fluid flow. The fluid passage 222 communicates with the exterior via a communication hole 224 whose opening functions as a connection port. In the second housing member 160, there is provided a communication hole 226 whose one end is open to the fluid passage 222 while the other end is open to the input chamber R3. Accordingly, the input chamber R3 communicates with the exterior via the communication hole 226, the fluid passage 222, and the communication hole 224.

There is provided, outside the housing 150, an inter-chamber communication passage 228 whose one end is connected to the connection port of the communication hole 216 while the other end is connected to the connection port of the communication hole 220. Accordingly, the inter-piston chamber R5 and the opposing chamber R4 are fluidly communicable to each other via the inter-chamber communication passage 228. An electromagnetic communication open/close valve 230 is provided at a certain position in the inter-chamber communication passage 228. Accordingly, the communication open/close valve 230 functions as an inter-chamber-communication switching mechanism for switching between: communication between the inter-piston chamber R5 and the opposing chamber R4; and shutting off of the communication therebetween. It is noted that the communication open/close valve 230 is a normally closed valve configured to be closed in a non-energized state.

A low-pressure release passage 232 branches off from the inter-chamber communication passage 228 at a position between the communication hole 220 and the communication open/close valve 230. The low-pressure release passage 232 is connected to the reservoir 62. An electromagnetic low-pressure release valve 234 is provided at a certain position in the low-pressure release passage 232. Accordingly, the low-pressure release valve 234 functions as a low-pressure-source-communication switching mechanism for switching between: communication between the opposing chamber R4 and the reservoir 62; and shutting off of the communication therebetween. The low-pressure release valve 234 is a normally open valve configured to be open in a non-energized state. A pilot-pressure supply passage 236 branches off from the inter-chamber communication passage 228 at a position between the communication hole 216 and the communication open/close valve 230. The pilot-pressure supply passage 236 is connected to the pressure regulator 100 of the pressure regulator device 60. The pilot-pressure introduction valve 106 described above is provided at a certain position in the pilot-pressure supply passage 236.

To the connection port of the communication hole 224, there is connected the other end of a regulated-pressure supply passage 240 whose one end is connected to the pressure regulator device 60 and to which is supplied the pressure-regulated working fluid. Accordingly, the working fluid whose pressure is regulated by the pressure regulator device 60 can be supplied to the input chamber R3. At a certain position in the regulated-pressure supply passage 240, there is disposed a regulated-pressure sensor [Pa] 242 for detecting a regulated pressure $P_A$ that is a pressure of the working fluid in the input chamber R3. The regulated-pressure sensor 242 is connected to the brake ECU 38.

<Structure of Pressure Regulator>

Figure 3:
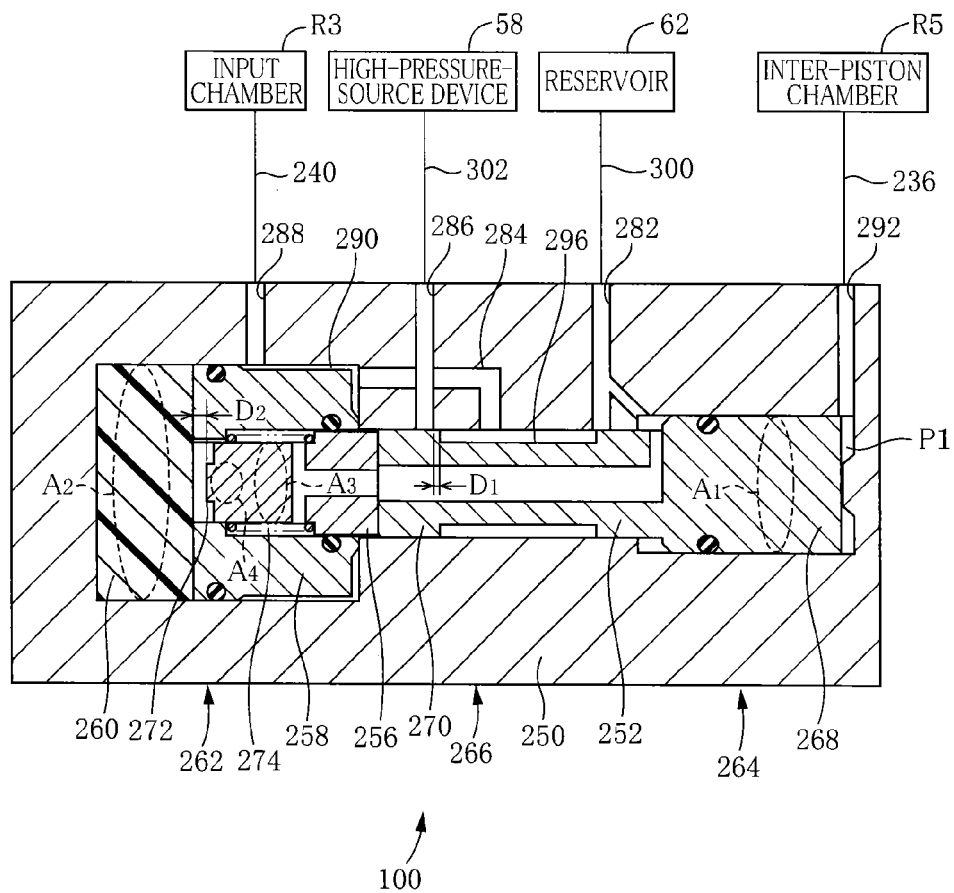
FIG. 3 is a view showing the pressure regulator of the hydraulic brake system shown in FIG. 2.

There will be hereinafter explained in detail a structure of the pressure regulator 100 with reference to FIG. 3. In the following explanation, terms such as "frontward (forward)" and "rearward" are used to indicate the leftward direction and the rightward direction, respectively, in FIG. 3.

The pressure regulator 100 includes: a cylindrical housing 250 whose opposite ends are closed; a movable rod 252 disposed in the housing 250; a reaction-force plunger 256 disposed forward of the movable rod 252; a cylindrical balance piston 258 fitted on the reaction-force plunger 256; and a reaction disc 260 disposed forward of the reaction-force plunger 256 and the balance piston 258.

One of opposite end sides of the housing 250 that is on the rear side is defined as a first-end side while the other of the opposite end sides that is on the front side is defined as a second-end side. The housing 250 is sectioned roughly into three portions having mutually different inner diameters, namely, a front portion 262 located on the front side and having a large inner diameter, a rear portion 264 located on the rear side and having an inner diameter smaller than that of the front portion 262, and an intermediate portion 266 located between the front portion 262 and the rear portion 264 and having an inner diameter smaller than those of the front portion 262 and the rear portion 264. The movable rod 252 has a proximal portion 268 located on the rear side and a spool portion 270 that extends forward from the proximal portion 268. The movable rod 252 is disposed in the housing 250 such that the proximal portion 268 is in a sliding contact with an inner circumferential surface of the rear portion 264 of the housing 250 and such that the spool portion 270 is in a sliding contact with an inner circumferential surface of the intermediate portion 266 of the housing 250. The balance piston 258 is disposed in the front portion 262 of the housing 250 so as to be held in a sliding contact with an inner circumferential surface of the front portion 262. A reaction disc 260 is further disposed in the front portion 262. The reaction disc 260 has a disc-like shape and is formed of rubber. The reaction disc 260 has an outer diameter that enables the reaction disc 260 to be closely fitted in the front portion 262. The balance piston 258 and the reaction disc 260 are disposed in the front portion 262 such that no clearance exist between the housing 250, the balance piston 258, and the reaction disc 260 in the front-rear direction. Therefore, the cylindrical balance piston 258 is always in contact with a perimeter portion of the reaction disc 260, namely, a portion of the reaction disc 260 except for its central portion. The reaction-force plunger 256 is disposed such that its front end face is opposed to the central portion of the reaction disc 260 and such that the reaction-force plunger 256 is held in a sliding contact with an inner circumferential surface of the balance piston 258. The reaction-force plunger 256 has, at its front end portion, a protruding portion 272 that protrudes forward, whereby the front end portion of the reaction-force plunger 256 has a stepped surface facing forward.

In the pressure regulator 100, a compression coil spring 274 is disposed between a stepped surface formed on an inner circumferential surface of the balance piston 258 and a stepped surface formed on an outer circumferential surface of the reaction-force plunger 256. Accordingly, the reaction-force plunger 256 and the movable rod 252 are biased rearward by an elastic force generated by the compression coil spring 274.

In the thus constructed pressure regulator 100, there is defined, between the rear end face of the movable rod 252 and the housing 250, a fluid chamber P1 for receiving the working fluid having a pilot pressure by which the pressure regulator 100 is activated. (The fluid chamber P1 will be hereinafter referred to as "pilot chamber" where appropriate.).

In the housing 250, a plurality of communication holes are formed. More specifically, there is formed, in the intermediate portion 266, a communication hole 282 whose one end is open to the inner circumferential surface of the intermediate portion 266 while the other end functions as a connection port so as to be open to the exterior. There is further formed, in the intermediate portion 266, a communication hole 284 whose one end is open to the inner circumferential surface of the intermediate portion 266 while the other end is open to a rear end face of the front portion 262. There is further formed, in the intermediate portion 266, a communication hole 286, whose one end is open to the inner circumferential surface of the intermediate portion 266 while the other end functions as a connection port so as to be open to the exterior. There is formed, in the front portion 262, a communication hole 288 whose one end is open to the inner circumferential surface of the front portion 262 while the other end functions as a connection port so as to be open to the exterior. The communication hole 288 communicates with the communication hole 284 via a fluid passage 290 formed between the inner circumferential surface of the front portion 262 and the outer circumferential surface of the balance piston 258. In the housing 250, there is further formed a communication hole 292 whose one end is open to the pilot chamber P1 while the other end functions as a connection port so as to be open to the exterior. The outer diameter of the spool portion 270 of the movable rod 252 is partly reduced, whereby there is formed, on an outer circumference of the spool portion 270, a communication portion 296 through which the working fluid is permitted to flow. The length of the communication portion 296 in the front-rear direction is made slightly smaller than a distance between the opening of the communication hole 282 and the opening of the communication hole 286. That is, the communication portion 296 is formed such that communication between the communication hole 282 and the communication hole 286 by the communication portion 296 is prohibited.

A low-pressure communication passage 300 that communicates with the reservoir 62 is connected to the connection port of the communication hole 282. A high-pressure communication passage 302 that communicates with the high-pressure-source device 58 is connected to the connection port of the communication hole 286. Accordingly, in the pressure regulator 100, the communication hole 282 functions as a low-pressure passage through which the working fluid is discharged from the inside of the housing 250 to the reservoir 62, and the communication hole 286 functions as a high-pressure passage through which the working fluid supplied from the high-pressure-source device 58 is introduced into the inside of the housing 250. The regulated-pressure supply passage 240 is connected to the connection port of the communication hole 288, and the working fluid whose pressure has been regulated by the pressure regulator 100 is supplied to the input chamber R3 of the master cylinder device 50 via the regulated-pressure supply passage 240, as later explained. To the connection port of the communication hole 292, the pilot-pressure supply passage 236 that communicates with the inter-piston chamber R5 is connected. Therefore, the pressure of the pilot chamber P1 is equal to the pressure of the inter-piston chamber R5.

In the pressure regulator 100, an area, in the axial direction, of the rear end face of the movable rod 252 is $A_1$. The reaction disc 260 has a cross-sectional area $A_2$. The reaction-force plunger 256 has a cross-sectional area $A_3$. The protruding portion 272 of the reaction-force plunger 256 has a cross-sectional area $A_4$. In the state shown in FIG. 3, a distance between a front end of the communication portion 296 and the opening of the communication hole 286 is $D_1$, and a distance between a front end face of the protruding portion 272 of the reaction-force plunger 256 and a rear end face of the reaction disc 260 is $D_2$. It is noted that the distance $D_2$ is somewhat larger than the distance $D_1$.

<Operation of Pressure Regulator>

There will be hereinafter explained in detail an operation of the thus constructed pressure regulator 100. Because a spring constant of the compression coil spring 274 is made relatively small, an influence of a force generated by the compression coil spring 274 is ignored in the following explanation of the operation of the pressure regulator 100. When the movable rod 252 moves forward by the pressure of the pilot chamber P1 that acts thereon, the movable rod 252 pushes the reaction-force plunger 256 forward. That is, in the pressure regulator 100, the pressure of the working fluid introduced into the pilot chamber P1 functions as the pilot pressure by which the pressure regulator 100 is activated or operated. When the pilot pressure is equal to the atmospheric pressure, the movable rod 252 is located at a moving end position on the rear side by the elastic force of the compression coil spring 274 and the communication hole 282 and the communication hole 284 are in communication with each other via the communication portion 296 of the movable rod 252. That is, the communication hole 284 communicates with the reservoir 62, and the pressure of the communication hole 284 accordingly becomes equal to the atmospheric pressure. When the pilot pressure increases from this condition, the movable rod 252 is moved forward and communication between the communication hole 284 and the reservoir 62 is shut off when the rear end of the communication portion 296 is located forward of the opening of the communication hole 282. When the movable rod 252 is further moved forward by a slight distance, the front end of the communication portion 296 reaches the opening of the communication hole 286, so that the communication hole 286 and the communication hole 284 are brought into communication with each other via the communication portion 296. That is, the communication hole 284 is brought into communication with the high-pressure-source device 58, so that the pressure of the communication hole 284 is increased.

When the pressure of the communication hole 284 is increased, the pressure of the fluid passage 290 that communicates with the communication hole 284 is increased, whereby the balance piston 258 receives the pressure on its rear end face so as to be pushed forward. As a result, the balance piston 258 moves forward while compressing the perimeter portion of the reaction disc 260, whereby the reaction disc 260 is deformed such that its central portion that does not contact the balance piston 258 protrudes rearward, namely, such that the central portion protrudes into an inside of the balance piston 258. When the reaction disc 260 is deformed further, the central portion thereof comes into contact with the protruding portion 272 of the reaction-force plunger 256 and the movable rod 252 is pushed rearward in a state in which the reaction-force plunger 256 is held in contact with the movable rod 252. In consequence, the communication between the communication hole 286 and the communication hole 284 is shutoff, so that the pressure of the fluid passage 290 stops increasing. When the pilot pressure is decreased from this condition, the movable rod 252 is moved rearward, whereby the communication hole 284 is brought into communication with the communication hole 282. That is, the communication hole 284 communicates with the reservoir 62, so that the pressure of the communication hole 284 and the fluid passage 290 is decreased. Therefore, the force of the reaction disc 260 for pushing the reaction-force plunger 256 and the movable rod 252 rearward is reduced, so that the movable rod 252 moves forward and the pressure of the communication hole 284 and the fluid passage 290 stops decreasing. Thus, the working fluid having a pressure regulated in accordance with the pilot pressure, namely, the working fluid having the regulated pressure, is supplied to the fluid passage 290. Accordingly, the fluid passage 290 may be regarded as a regulated-pressure chamber in the pressure regulator 100. The working fluid whose pressure is regulated to the regulated pressure is supplied to the input chamber R3 of the master cylinder device 50 via the communication hole 288.

In the pressure regulator 100, a portion of the reaction-force plunger 256 that contacts the reaction disc 260 is only a front end face of the protruding portion 272 at a time of initiation of the contact. However, as the pressure of the fluid passage 290 increases, namely, as an amount of deformation of the reaction disc 260 increases, the reaction disc 260 contacts also a front end face of the reaction-force plunger 256 located around the protruding portion 272. That is, an area of contact of the reaction disc 260 and the reaction-force plunger 256 increases with an increase in the deformation amount of the reaction disc 260. Accordingly, an area of the reaction-force plunger 256 on which the pressure generated by the reaction disc 260 increases with an increase in the deformation amount of the reaction disc 260.

Figure 4:
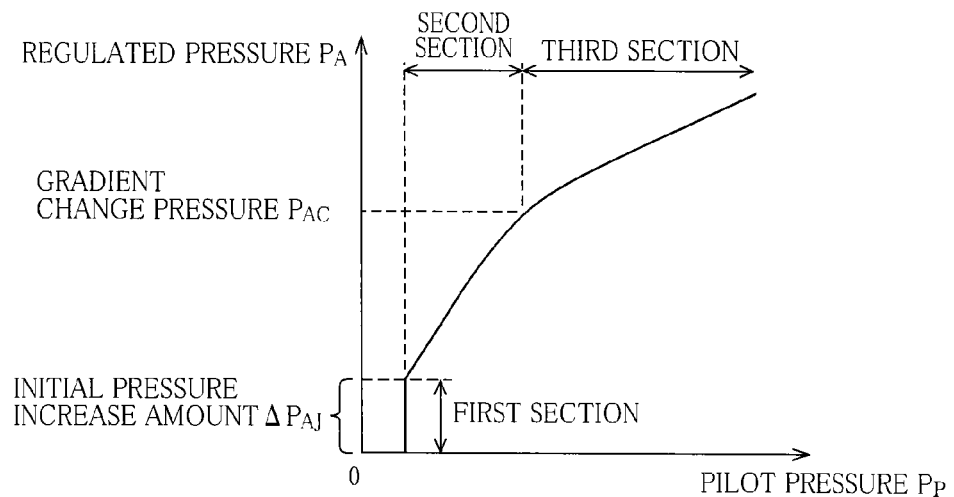
FIG. 4 is a graph showing a relationship between a pressure of a pilot chamber and a pressure of a working fluid regulated in accordance with the pressure of the pilot chamber, in the pressure regulator shown in FIG. 3.

In the pressure regulator 100 that operates as described above, the regulated pressure $P_A$ changes with respect to a change of the pilot pressure $P_P$, as indicated in the graph of FIG. 4. When the pilot pressure $P_P$ increases to a certain level by the brake operation, the movable rod 252 moves forward against friction or the like due to a sliding contact with the housing 250, so that the regulated pressure is increased as described above in the pressure regulator 100. Further, the reaction disc 260 needs to be deformed such that its central portion fills a space corresponding to a distance $D_2-D_1$ before the central portion of the reaction disc 260 comes into contact with the front end face of the protruding portion 272 and then pushes the reaction-force plunger 256 after the regulated pressure has been increased, namely, before the regulated pressure stops increasing after the regulated pressure has been increased.

Figure 5:
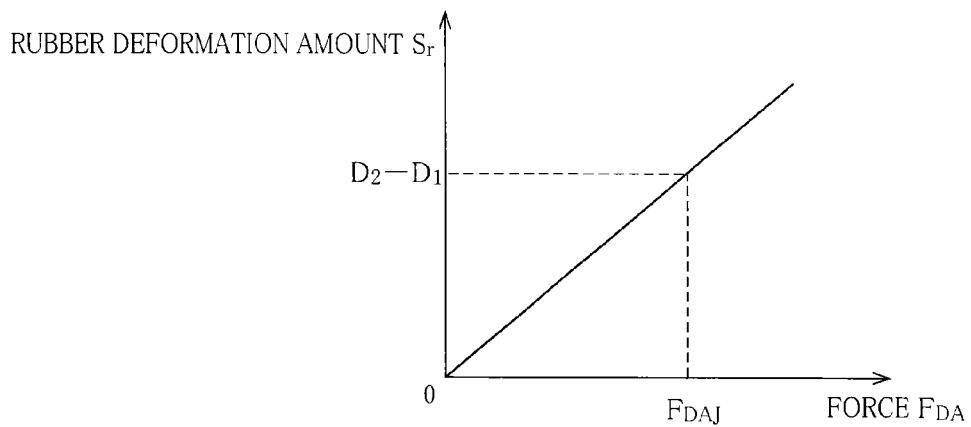
FIG. 5 is a graph showing a relationship between a force that acts on a perimeter portion of a rubber member of the pressure regulator shown in FIG. 3 and an amount by which a central portion of the rubber member protrudes by an action of the force.

In the reaction disc 260, a deformation amount Sr of the reaction disc 260, more specifically, an amount of protrusion of the central portion of the reaction disc 260 with respect to the perimeter portion thereof, proportionally changes, as shown in the graph of FIG. 5, with respect to a force FDA that acts on the perimeter portion of the reaction disc 260 due to an increase in the regulated pressure $P_A$. In other words, a ratio $dF_{DA}/dSr$ that is a ratio of a change amount $dF_{DA}$ of the force $F_{DA}$ to a change amount dSr of the deformation amount Sr is a constant value C. Accordingly, a force $F_{DAJ}$ when the central portion of the reaction disc 260 is deformed so as to fill the space corresponding to the distance $D_2-D_1$ is calculated according to the following expression:

$$F_{DAJ}=C\times(D_2-D_1)$$

Therefore, an initial pressure increase amount $\Delta P_{AJ}$ that is an amount of increase of the regulated pressure $P_A$ before the regulated pressure $P_A$ stops increasing is calculated according to the following expression:

$$\Delta P_{AJ}=C\times(D_2-D_1)/(A_2-A_3)$$

The magnitude of the initial pressure increase amount $\Delta P_{AJ}$ is set in dependence on the structure of the pressure regulator 100 such as the value C that depends on the characteristics of the reaction disc 260, the distance $D_2$ and the distance $D_1$, and the area $A_2$ and the area $A_3$. In the pressure regulator 100, the initial pressure increase amount $\Delta P_{AJ}$ is set to be relatively large. Hence, as indicated in a first section in the graph of FIG. 4, the regulated pressure $P_A$ rapidly increases by the initial pressure increase amount $\Delta P_{AJ}$ at a certain level of the pilot pressure $P_P$. In other words, an increase gradient of the regulated pressure, i.e., a gradient of an increase of the regulated pressure $P_A$ with respect to an increase of the pilot pressure $P_P$, is considerably large.

When the pilot pressure $P_P$ is further increased, the regulated pressure $P_A$ is increased proportionally with respect to an increase of the pilot pressure $P_P$, such that a force that biases the movable rod 252 frontward by the pilot pressure and a force that biases the movable rod 252 rearward by the pressure of the fluid passage 290 are balanced with each other, as indicated in a second section in the graph of FIG. 4. Further, as the pilot pressure $P_P$ is further increased, the reaction disc 260 is further deformed, so that the reaction disc 260 also comes into contact with the front end face of the reaction-force plunger 256 located around the protruding portion 272, as explained above. Due to this contact, the area of the reaction-force plunger 256 on which the pressure generated by the reaction disc 260 acts becomes large, thereby increasing the force that pushes the reaction-force plunger 256 and the movable rod 252 rearward, as explained above.

As shown in FIG. 4, in a third section after the contact of the reaction disc 260 with the front end face of the reaction-force plunger 256, in other words, in the regulated pressure $P_A$ equal to or higher than a gradient change pressure $P_{AC}$ that is a level of the regulated pressure $P_A$ at the time of the contact, the increase gradient of the regulated pressure is smaller than that in the second section. To be more specific, where the level of the pressure that acts from the reaction disc 260 on the reaction-force plunger 256 is defined as "$P_R$", a force by the pressure $P_R$ that acts form the reaction disc 260 on the reaction-force plunger 256 and a force by the pilot pressure $P_P$ that acts from the reaction-force plunger 256 on the reaction disc 260 are balanced with each other in a state indicated by the following expression, in the second section:

$$P_R\times A_4=P_P\times A_1$$

On the other hand, these forces are balanced with each other in a state indicated by the following expression, in the third section:

$$P_R\times A_3=P_P\times A_1$$

The area on which the pressure $P_R$ acts is larger in the third section (the area $A_3$) than in the second section (the area $A_4$). Accordingly, an increase of the pressure $P_R$ necessary for the forces to be balanced with respect to an increase of the pilot pressure $P_P$ may be smaller in the third section than in the second section. That is, the increase gradient of the regulated pressure in the second section and the increase gradient of the regulated pressure in the third section differ from each other by an amount corresponding to a difference between the cross-sectional area $A_3$ of the reaction-force plunger 256 and the cross-sectional area $A_4$ of the protruding portion 272. Because the reaction disc 260 is made of rubber, the reaction disc 260 gradually comes into contact with the front end face of the reaction-force plunger 256 when the reaction disc 260 comes into contact first with the protruding portion 272 and then the front end face of the reaction-force plunger 256. Accordingly, transition from the second section to the third section is relatively gentle.

The pressure regulator 100 that operates as described above may be considered as a pressure regulator configured to regulate the high-pressure working fluid supplied from the high-pressure-source device 58 to a pressure in accordance with the pilot pressure and to supply the pressure-regulated working fluid. In the pressure regulator, the spool portion 270 of the movable rod 252 functions as a movable member that moves in the axial direction of the housing 250. Further, the proximal portion 268 of the movable rod 252 functions as a first plunger disposed rearward of the spool portion 270 so as to be movable in the axial direction of the housing 250. In other words, the movable rod 252 may be regarded as an integral member constituted by the movable member and the first plunger. In the pressure regulator 100, the movable rod 252 is supported directly by the housing 250, so that an influence of movements of other movable members on the movable rod 252 is relatively small. Accordingly, the movable rod 252 is capable of moving while responding relatively sensitively to the change of the pilot pressure, and the pressure regulator 100 is capable of regulating the pressure of the working fluid while responding relatively sensitively to the change of the pilot pressure. It is noted that the proximal portion 268 and the spool portion 270 may be provided as separate members, namely, the movable member and the first plunger may be provided as separate members.

In the pressure regulator 100, the reaction-force plunger 256 functions as a second plunger disposed forward of the spool portion 270 so as to be movable in the axial direction of the housing 250. Further, the spool portion 270 of the movable rod 252 is configured such that, when the movable rod 252 is located at the moving end position on the rear side, the spool portion 270 shuts off communication between the communication hole 286 and the communication hole 284 and permits communication between the communication hole 282 and the communication hole 284 and is configured such that, when the movable rod 252 moves forward from the moving end position, the spool portion 270 permits the communication between the communication hole 286 and the communication hole 284 and shuts off the communication between the communication hole 282 and the communication hole 284. In the pressure regulator 100, therefore, the movable rod 252 functions as a valve mechanism that selectively effectuates, by the movement of the movable rod 252, one of: a state in which communication between the high-pressure passage 286 and the fluid passage 290 is shut off while communication between the low-pressure passage 282 and the fluid passage 290 is permitted; and a state in which the communication between the high-pressure passage 286 and the fluid passage 290 is permitted while the communication between the low-pressure passage 282 and the fluid passage 290 is shut off.

In the pressure regulator 100, a mechanism including the compression coil spring 274 corresponds to a first biasing mechanism that biases the movable rod 252 rearward by the elastic reaction force generated by the compression coil spring 274. A mechanism including the pilot chamber P1 corresponds to a second biasing mechanism that biases the movable rod 252 forward by the pressure of the pilot chamber P1. The balance piston 258 corresponds to a hollow piston that is movable forward by the pressure of the fluid passage 290 formed at its rear portion and that is disposed such that the reaction-force plunger 256 is fitted thereinto. The reaction disc 260 corresponds to a rubber member disposed forward of the reaction-force plunger 256 and the balance piston 258 and is supported, at a front end face thereof, by the housing 250. Accordingly, a mechanism including the reaction-force plunger 256 and the reaction disc 260 corresponds to a third biasing mechanism configured such that, when the regulated pressure exceeds a set pressure that is equal to a pressure increased by the initial pressure increase amount $\Delta P_{AJ}$, the third biasing mechanism biases the movable rod 252 rearward by the regulated pressure, with the reaction-force plunger 256 held in contact with the movable rod 252.

In the third biasing mechanism, the reaction disc 260 may be regarded as a reaction-force generating member that generates, owing to an elastic reaction force by its own deformation, a reaction force against a force by the regulated pressure before the regulated pressure is increased by the initial pressure increase amount $\Delta P_{AJ}$, such that the movable rod 252 is not biased by the force. The third biasing mechanism is configured such that, when the regulated pressure exceeds a gradient change pressure $P_{AC}$ that is a second set pressure higher than the set pressure, the reaction disc 260 comes into contact also with the front end face of the reaction-force plunger 256 located around the protruding portion 272 and the movable rod 252 is biased rearward in a state in which the reaction disc 260 is in contact with the front end face of the reaction-force plunger 256.

<Operation of Vehicle Brake System>

Figure 6:
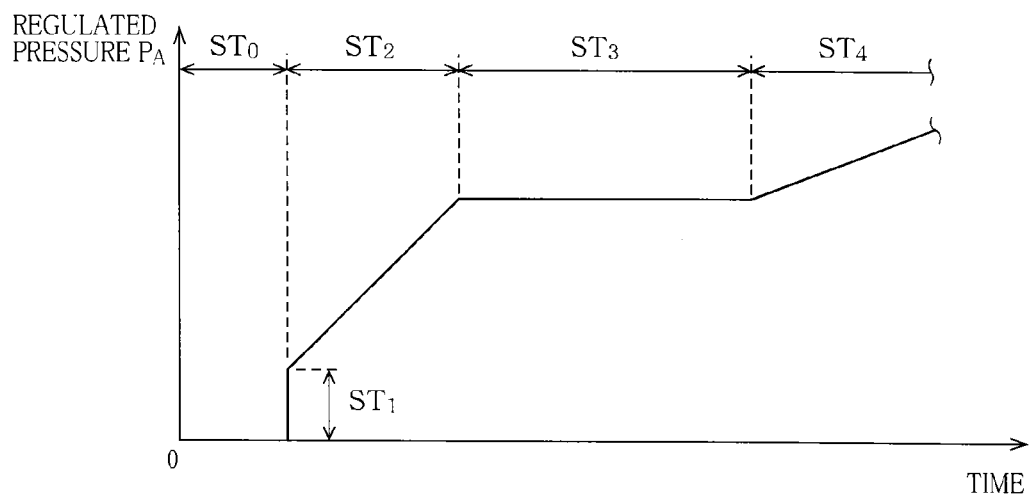
FIG. 6 is a schematic view showing how a regulated pressure changes and how a braking state shifts with respect to a time in the progress of a brake operation.

The vehicle brake system according to the present embodiment is configured such that a manner of generating a braking force is changed depending on a brake operation by a driver, as explained below. In other words, the vehicle brake system according to the present embodiment has some braking states in accordance with the brake operation by the driver. The braking states will be explained in detail below. FIG. 6 schematically shows how the regulated pressure $P_A$ changes and how the braking state shifts, with respect to a time in the progress of the brake operation. It is noted that "ST" is used as an index indicative of the braking state of the vehicle brake system.

When the driver applies an operation force to the brake pedal 70 in a condition in which the brake pedal 70 is not depressed, i.e., a non-braking state $ST_0$, the communication open/close valve 230 and the low-pressure release valve 234 are energized so as to be opened and closed, respectively. As a result, the inter-piston chamber R5 and the opposing chamber R4 are brought into communication with each other while communication of the opposing chamber R4 with the reservoir 62 is shut off. Accordingly, the operation force by the brake operation is transmitted to the working fluid in the inter-piston chamber R5 via the input piston 156, so that the pressure of the working fluid in the inter-piston chamber R5 and the opposing chamber R4 is increased. As described above, the area of the bottom surface of the blind hole of the first pressurizing piston 152 and the area of the front end face of the flange portion 174 of the first pressurizing piston 152 are made equal to each other. Therefore, a force that moves the first pressurizing piston 152 forward by the pressure of the working fluid in the inter-piston chamber R5 becomes equal to a force that moves the first pressurizing piston 152 rearward by the pressure of the working fluid in the opposing chamber R4. Accordingly, even if the pressure of the working fluid in the inter-piston chamber R5 and the opposing chamber R4 is increased by the operation force, the first pressurizing piston 152 is not moved by the increased pressures. That is, in the master cylinder device 50, when the communication open/close valve 230 and the low-pressure release valve 234 are in the energized state, transmission of the operation force from the input piston 156 to the first pressurizing piston 152 is prohibited.

When the brake operation is initiated in this condition and the working fluid is supplied from the pressure regulator device 60 to the input chamber R3, the first pressurizing piston 152 moves forward in dependence on the pressure of the working fluid in the input chamber R3, thereby pressurizing the working fluid in the first pressurizing chamber R1. In association with the pressurization by the first pressurizing piston 152, the second pressurizing piston 154 moves forward, thereby pressurizing the working fluid in the second pressurizing chamber R2. Accordingly, the working fluid to be supplied to the brake devices 56 is pressurized depending on the regulated pressure without substantially depending on the operation force, and the hydraulic brake system 40 operates in a regulated-pressure-dependent braking mode in which the hydraulic brake system 40 generates a regulatedpressure-dependent braking force having a magnitude that depends on the regulated pressure. In this sense, the communication open/close valve 230 and the low-pressure release valve 234 may be regarded as an operation-force-transmission switching mechanism that switches between: a state in which the operation force is transmitted to the first pressurizing piston 152; and a state in which the operation force is not transmitted to the first pressurizing piston 152.

In each brake device 56, there is provided a "play", i.e., a clearance, between the brake pad and the brake disc 88, for preventing friction from being generated in the brake pad when the brake operation is not performed. Accordingly, even if the hydraulic brake system 40 operates in the regulated-pressure-dependent braking mode immediately after initiation of the brake operation, no braking force is generated in each brake device 56 before the brake pad comes into contact with the brake disc 88. In the vehicle brake system, therefore, the regenerative brake system, namely, the electric motor 12, generates the regenerative braking force immediately after initiation of the brake operation. Accordingly, the braking state of the vehicle brake system becomes a regenerative-braking-force-dependent braking state $ST_1$, namely, a state in which the vehicle is braked by the regenerative braking force, in a hydraulic-braking impossible situation after operation initiation, i.e., a situation before the hydraulic brake system 40 becomes capable of generating the braking force while the operation amount is being increased after initiation of the brake operation. In the vehicle brake system, therefore, the braking force can be quickly generated utilizing the regenerative brake system even in a situation in which the hydraulic braking force cannot be generated at the time of initiation of the brake operation. Further, even if individual hydraulic brake systems suffer from a difference in the degree of the "play" due to variations in the "play" caused by production errors or due to changes of the "play" over time, the braking force can be generated similarly by the regenerative brake system with respect to initiation of the brake operation. Hence, in the present vehicle brake system, the braking force can be generated at the same timing with respect to the brake operation without being influenced by the degree of the "play" in each hydraulic brake system.

Even if the first pressurizing piston 152 moves forward by an increase of the regulated pressure when the hydraulic brake system 40 operates in the regulated-pressure-dependent braking mode, an amount of decrease in the volume of the opposing chamber R4 by the forward movement is substantially equal to an amount of increase in the volume of the inter-piston chamber R5 by the forward movement. Accordingly, the position of the input piston 156, namely, the operation position of the brake pedal 70, does not substantially change. Further, because the opposing chamber R4 and the inter-piston chamber R5 are hermetically closed while communicating with each other, the brake pedal 70 and the input piston 156 do not move even if the brake pedal 70 is operated by the operation force. That is, the hydraulic brake system 40 is configured such that the brake pedal 70 cannot be moved forward by the operation force in the regulated-pressure-dependent braking mode. Therefore, the hydraulic brake system 40 avoids a useless increase in the operation amount of the brake pedal 70, namely, avoids a phenomenon that the operation amount of the brake pedal 70 is increased even though the braking force is not generated in the brake devices 56, so as to eliminate the above-indicated "play". Thus, the operation feeling in the brake operation is improved in the present brake system.

In the hydraulic brake system 40 that operates in the regulated-pressure-dependent braking mode, when the master pressure exceeds a preset start pressure $P_T$ of hydraulic braking force generation, the brake pads come into contact with the brake disc 88, and it is accordingly judged that the hydraulic braking force starts to be generated. In this instance, the communication open/close valve 230 and the low-pressure release valve 234 are non-energized, so as to be closed and opened, respectively. As a result, the communication between the inter-piston chamber R5 and the opposing chamber R4 is shut off while the opposing chamber R4 is brought into communication with the reservoir 62. Accordingly, the operation force is transmitted to the first pressurizing piston 152 via the working fluid in the inter-piston chamber R5, and the first pressurizing piston 152 moves forward in dependence on the operation force, thereby pressurizing the working fluid in the first pressurizing chamber R1. Further, the first pressurizing piston 152 moves forward also in dependence on the regulated pressure as described above, thereby pressurizing the working fluid in the first pressurizing chamber R1. That is, the working fluid in the first pressurizing chamber R1 is pressurized in dependence on both of the operation force and the regulated pressure. In association with the pressurization by the first pressurizing piston 152, the second pressurizing piston 154 moves forward, thereby pressurizing the working fluid in the second pressurizing chamber R2. Accordingly, the hydraulic brake system 40 operates in a braking mode depending on the operation force and the regulated pressure in which the hydraulic brake system 40 generates both of an operation-force-dependent braking force having a magnitude that depends on the operation force and the regulated-pressure-dependent braking force in a hydraulic-braking possible situation after operation initiation, i.e., a situation after the hydraulic brake system 40 becomes capable of generating the braking force while the operation amount is being increased after initiation of the brake operation.

In the hydraulic-braking possible situation after operation initiation, the regenerative braking force that has been generated immediately after initiation of the brake operation is not generated. Accordingly, the braking state of the vehicle brake system becomes a braking state $ST_2$ depending on the operation force and the regulated pressure, namely, a state in which the vehicle is braked by the operation-force-dependent braking force and the regulated-pressure-dependent braking force. According to the present vehicle brake system, therefore, the braking force can be generated only by the hydraulic brake system 40 in all of the wheels 18 in a situation in which the operation amount keeps changing after initiation of the brake operation, namely, in a situation in which the posture of the vehicle changes due to a change in deceleration of the vehicle and it is accordingly estimated that the vehicle stability and maneuverability are relatively poor. Accordingly, the balance between the braking force of the rear wheels 18RL, RR that are the drive wheels and the braking force of the front wheels 18FL, FR that are the non-drive wheels does not break down, thereby making it possible to prevent the vehicle stability and maneuverability from being further deteriorated.

In transition from the hydraulic-braking possible situation after operation initiation to the hydraulic-braking impossible situation after operation initiation, the pressure of the working fluid supplied to the master cylinder device is regulated by the pressure regulator 100, as explained below in detail. Where the pressure of the working fluid in the inter-piston chamber R5 and the pressure of the working fluid in the pilot chamber P1 that communicates with the inter-piston chamber R5 are slightly increased by the brake operation, the regulated pressure is increased by the pressure regulator 100 rapidly to a level exceeding the set pressure, whereby the master pressure is increased to a level exceeding the start pressure $P_T$ of hydraulic braking force generation. That is, the brake devices 56 become capable of generating the braking force. The hydraulic brake system 40 is not equipped with a stroke simulator, namely, a mechanism for permitting the brake operation by the driver without utilizing the driver's brake operation force for the hydraulic braking force, and, the hydraulic brake system 40 is configured such that the brake pedal 70 is not advanced in the hydraulic-braking impossible situation when the driver initiates the brake operation. Accordingly, there is a possibility that the brake operation is felt heavy by the driver at the time of initiation of the brake operation. According to the present vehicle brake system, however, the regulated pressure is increased rapidly to a level that exceeds the set pressure merely by applying a slight brake operation force by the brake operation, so as to allow transition from the hydraulic-braking impossible situation after operation initiation to the hydraulic-braking possible situation after operation initiation at a relatively early stage after initiation of the brake operation. Accordingly, the brake operation member is permitted to be advanced before the brake operation is felt heavy by driver, so that the driver does not feel unnatural or awkward in the brake operation.

When the situation changes from the hydraulic-braking possible situation after operation initiation to an operation-amount constant situation, i.e., to a situation in which the operation amount in the brake operation is constant, the communication between the inter-piston chamber R5 and the opposing chamber R4 is established while the communication between the opposing chamber R4 and the reservoir 62 is shut off. That is, the hydraulic brake system 40 operates in the regulated-pressure-dependent braking mode in which the hydraulic brake system 40 generates the regulated-pressure-dependent braking force. Further, the regenerative brake system generates the regenerative braking force. Accordingly, the braking state of the vehicle brake system becomes a braking state $ST_3$ depending on the regulated pressure and the regenerative braking force, namely, a state in which the vehicle is braked by the regulated-pressure-dependent braking force and the regenerative braking force. To be more specific, in the braking state $ST_3$, the regulated-pressure-dependent braking force and the regenerative braking force are generated in the rear wheels 18RL, 18RR that are the drive wheels while the regulated-pressure-dependent braking force is generated in the front wheels 18FL, 18FR that are the non-drive wheels. As a result, the balance between the braking force of the rear wheels 18RL, 18RR and the braking force of the front wheels 18FL, 18FR breaks down. However, the balance breaks down in a situation in which the brake operation amount is constant, namely, in a situation in which the posture of the vehicle body is relatively stable and the vehicle stability and maneuverability are relatively good. Hence, the vehicle stability and maneuverability are kept relatively good without being deteriorated.

When the situation changes from the operation-amount constant situation to an operation-amount re-changed situation, namely, to a situation in which the operation amount of the brake pedal 70 again changes after once having become constant, the communication between the inter-piston chamber R5 and the opposing chamber R4 is shut off while the opposing chamber R4 is brought into communication with the reservoir 62. Accordingly, the hydraulic brake system 40 operates in the braking mode depending on the operation force and the regulated pressure. Further, the regenerative brake system continues to generate the regenerative braking force. Accordingly, the braking state of the vehicle brake system becomes a braking state $ST_4$ depending on the operation force, the regulated pressure, and the regenerative braking force, namely, a state in which the vehicle is braked by the operation-force-dependent braking force, the regulated-pressure-dependent braking force, and the regenerative braking force. Thus, in the present vehicle brake system, it is possible to brake or stop the vehicle making the most of the hydraulic brake system 40 and the regenerative brake system in a situation in which the brake pedal 70 is further depressed, so that a relatively large braking force can be generated.

Thus, in the hydraulic brake system 40, it may be regarded that the communication open/close valve 230 and the low-pressure release valve 234 constitute a braking-mode switching mechanism that selectively effectuates one of the regulated-pressure-dependent braking mode and the braking mode depending on the operation force and the regulated pressure. Further, in the present vehicle brake system, the vehicle can be braked or stopped while sufficiently regenerating electricity, by appropriately utilizing the hydraulic brake system 40 and the regenerative brake system in accordance with the brake operation without impairing the vehicle stability and maneuverability.

In either of the situations described above, the regenerative braking force stops being generated when the speed of the vehicle becomes equal to or lower than a set speed, i.e., 6 km/h, by the brake operation. That is, when the regenerative brake system becomes incapable of generating a sufficient braking force due to a reduction in the vehicle speed, the vehicle is braked by the hydraulic braking force.

The pressure regulator device 60 operates depending upon the situations described above so as to switch between: a valve mechanism operating mode, i.e., a mode in which the pressure regulator 100 regulates the pressure of the working fluid supplied from the high-pressure-source device 58; and a linear valve operating mode, i.e., a mode in which the pressure-increase linear valve 102 and the pressure-decrease linear valve 104 regulate the pressure of the working fluid supplied from the high-pressure-source device 58. To be more specific, in the hydraulic-braking impossible situation after operation initiation and the hydraulic-braking possible situation after operation initiation, the pilot-pressure introduction valve 106 is non-energized so as to be opened, and the pressure-increase linear valve 102 and the pressure-decrease linear valve 104 are also non-energized so as to be closed and opened, respectively. Accordingly, the pressure regulator device 60 operates in the valve mechanism operating mode, and the pressure of the working fluid is regulated by the pressure regulator 100 and the pressure-regulated working fluid is supplied to the master cylinder device 50. On the other hand, in the operation-amount constant situation and the operation-amount re-changed situation, the pilot-pressure introduction valve 106 is energized so as to be closed, and the pressure-increase linear valve 102 and the pressure-decrease linear valve 104 are operated based on commands sent from the brake ECU 38. Accordingly, the pressure regulator device 60 operates in the linear valve operating mode, and the pressure of the working fluid is regulated by the pressure-increase linear valve 102 and the pressure-decrease linear valve 104 and the pressure-regulated working fluid is supplied to the master cylinder device 50.

In a case where electricity supplied to the vehicle brake system is cut off due to some failures, the pilot-pressure introduction valve 106, the pressure-increase linear valve 102, and the pressure-decrease linear valve 104 are non-energized. Accordingly, the pressure regulator device 60 operates in the valve mechanism operating mode. Further, the communication open/close valve 230 is closed and the low-pressure release valve 234 is opened, so that the hydraulic brake system 40 operates in the braking mode depending on the operation force and the regulated pressure. Therefore, even where electricity supplied to the vehicle brake system is cut off, the pressure regulator 100 regulates the pressure of the working fluid and the pressure-regulated working fluid is supplied to the master cylinder device 50 as long as the working fluid having a high pressure remains in the high-pressure-source device 58, whereby the hydraulic brake system 40 brakes the vehicle by both of the operation-force-dependent braking force and the regulated-pressure-dependent braking force. Even after the pressure-regulated working fluid is not supplied any more, the hydraulic brake system 40 can brake or stop the vehicle by the operation-force-dependent braking force. That is, the present vehicle brake system is excellent in terms of failsafe.

<Control for Vehicle Brake System>

Figure 7:
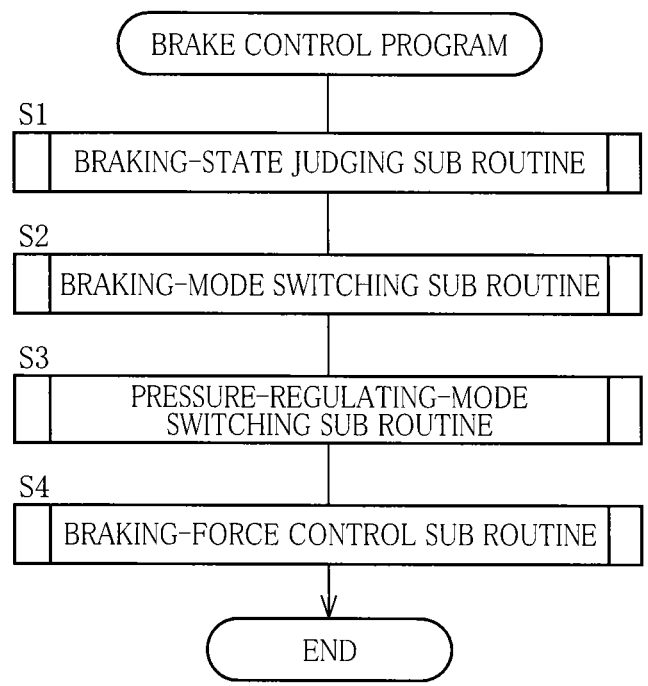
FIG. 7 is a flow chart showing a control program executed in the vehicle brake system of the first embodiment.

The brake ECU 38 repeatedly executes a brake control program represented by a flow chart of FIG. 7 at a short period from several msec. to several tens of msec. Switching of braking force generating states and control of the braking force to be generated are executed based on processing according to the program. In the processing according to this program, a sub routine for judging the braking state is executed at Step 1 (hereinafter abbreviated as "S1" and other steps will be similarly abbreviated). At S2, a sub routine for switching the braking mode of the hydraulic brake system 40 according to the braking state judged at S1 is executed. At S3, the mode in which the pressure regulator device 60 operates is switched according to the braking state judged at S1. At S4, a sub routine for controlling the regulated-pressure-dependent braking force and the regenerative braking force is executed.

Figure 8:
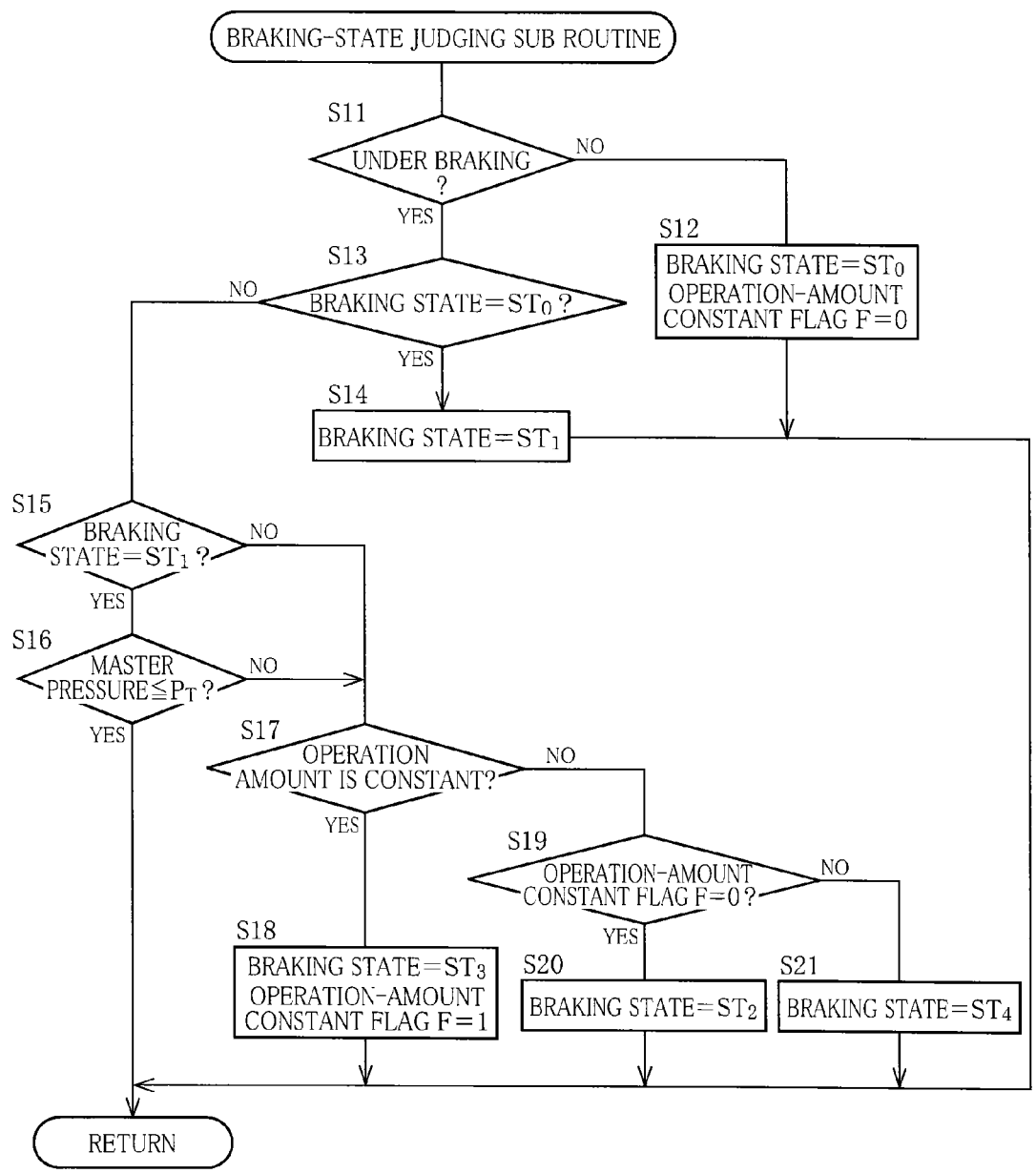
FIG. 8 is a flow chart showing a program for judging the braking state executed in the vehicle brake system of the first embodiment.

FIG. 8 is a flow chart showing a program of a braking-state judging sub routine for judging the braking state. In processing according to this program, it is judged at S11 whether or not the brake pedal 70 is being depressed, namely, whether or not the operation force is being applied to the brake pedal 70, based on an operation force F. Where it is judged that the operation force is not being applied, S12 is implemented to determine the braking state of the vehicle brake system as the non-braking state $ST_0$ and to set an operation-amount constant flag F (that will be later explained in detail) to 0. Where it is judged that the operation force is being applied, it is judged at S13 whether or not the braking state of the vehicle brake system is the non-braking state $ST_0$. Where it is judged that the braking state is the non-braking state $ST_0$, S14 is implemented to determine the braking state of the vehicle brake system as the regenerative-braking-force-dependent braking state $ST_1$.

Where it is judged at S13 that the braking state is not the non-braking state $ST_0$, it is judged at S15 whether or not the braking state is the regenerative-braking-force-dependent braking state $ST_1$. Where it is judged that the braking state is the regenerative-braking-force-dependent braking state $ST_1$, it is judged at S16 whether or not the master pressure is equal to or lower than the start pressure $P_T$ of hydraulic braking force generation. Where it is judged that the master pressure is equal to or lower than the start pressure $P_T$ of hydraulic braking force generation, the regenerative-braking-force-dependent braking state $ST_1$ is maintained. On the other hand, where it is judged that the master pressure is higher than the start pressure $P_T$ of hydraulic braking force generation, it is judged at S17 whether or not the brake operation amount is constant, namely, whether or not the brake pedal 70 is held with a certain constant operation amount. Where it is judged that the operation amount is constant, S18 is implemented to determine the braking state as the braking state $ST_3$ depending on the regulated pressure and the regenerative braking force and to set the operation-amount constant flag F to 1. The operation-amount constant flag F indicates that there has occurred a situation in which the operation amount becomes constant after initiation of the brake operation. Where it is judged that the operation amount is not constant, it is judged at S19 whether or not the operation-amount constant flag F is 0. Where the operation-amount constant flag is 0, S20 is implemented to determine the braking state as the braking state $ST_2$ depending on the operation force and the regulated pressure. Where the operation-amount constant flag F is not 0, namely, the flag F is 1, S21 is implemented to determine the braking state as the braking state $ST_4$ depending on the operation force, the regulated pressure, and the regenerative braking force.

Figure 9:
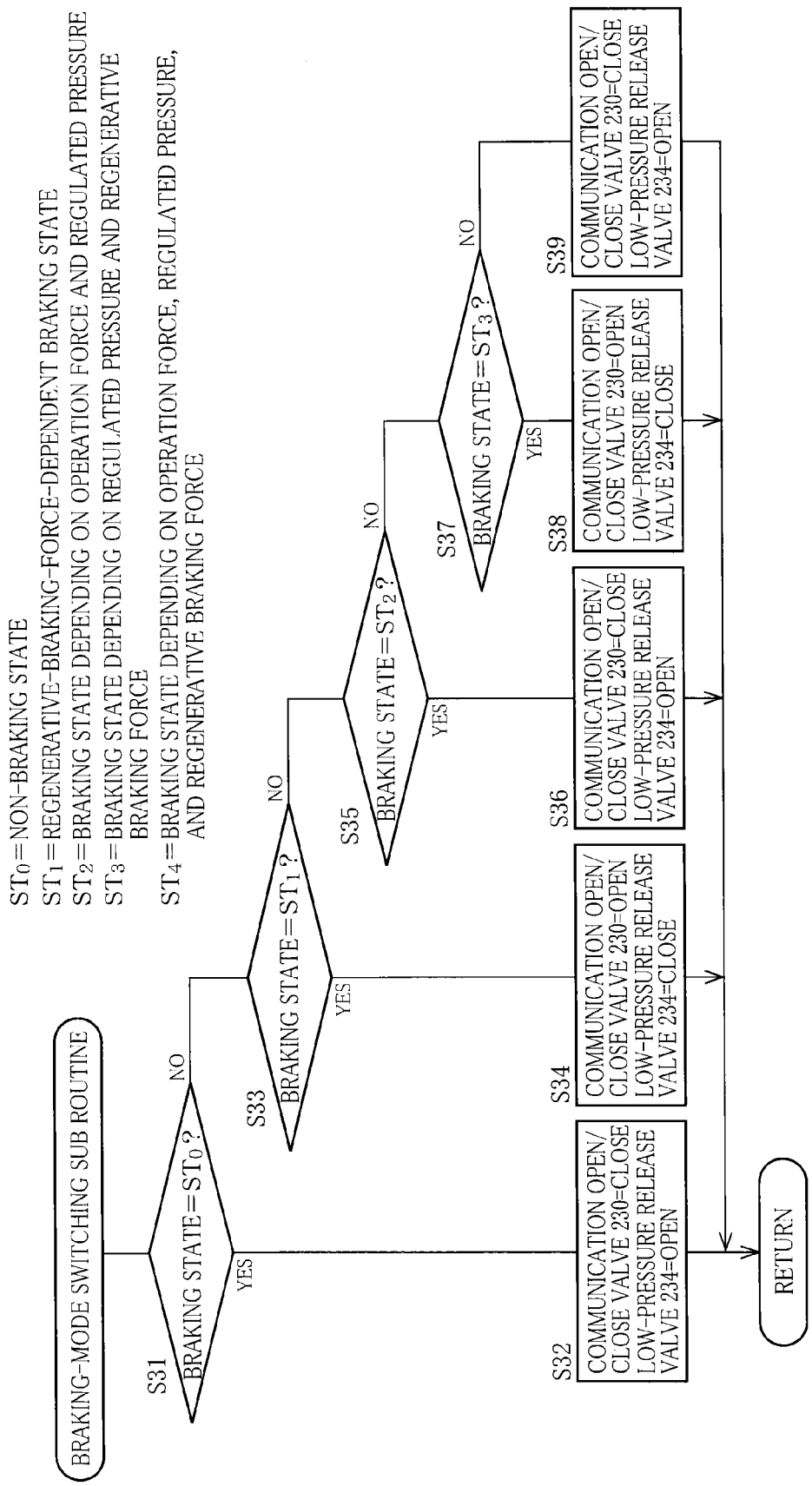
FIG. 9 is a flow chart showing a program for controlling a braking-mode switching mechanism executed in the vehicle brake system of the first embodiment.

FIG. 9 is a flow chart showing a program of a braking-mode switching sub routine for controlling the communication open/close valve 230 and the low-pressure release valve 234, namely, for controlling the braking-mode switching mechanism. By execution of the braking-mode switching sub routine, the hydraulic brake system 40 operates in the regulated-pressure-dependent braking mode or the braking mode depending on the operation force and the regulated pressure. In processing according to this program, where it is judged at S31 that the braking state of the vehicle brake system is the non-braking state $ST_0$, the communication open/close valve 230 is closed while the low-pressure release valve 234 is opened at S32. Where it is judged that the braking state is not the non-braking state $ST_0$, it is judged at S33 whether or not the braking state is the regenerative-braking-force-dependent braking state $ST_1$. Where it is judged that the braking state is the regenerative-braking-force-dependent braking state $ST_1$, the communication open/close valve 230 is opened while the low-pressure release valve 234 is closed at S34. Where it is judged that the braking state is not the regenerative-braking-force-dependent braking state $ST_1$, it is judged at S35 whether the braking state is the braking state $ST_2$ depending on the operation force and the regulated pressure. Where it is judged that the braking state is the braking state $ST_2$ depending on the operation force and the regulated pressure, the communication open/close valve 230 is closed while the low-pressure release valve 234 is opened at S36. Where it is judged that the braking state is not the braking state $ST_2$ depending on the operation force and the regulated pressure, it is judged at S37 whether or not the braking state is the braking state $ST_3$ depending on the regulated pressure and the regenerative braking force. Where it is judged that the braking state is the braking state $ST_3$ depending on the regulated pressure and the regenerative braking force, the communication open/close valve 230 is opened and the low-pressure release valve 234 is closed at S38. Where it is judged that the braking state is not the braking state $ST_3$ depending on the regulated pressure and the regenerative braking force, the braking state is the braking state $ST_4$ depending on the operation force, the regulated pressure, and the regenerative braking force. In this case, the communication open/close valve 230 is closed and the low-pressure release valve 234 is opened at S39. Accordingly, in the hydraulic brake system 40, by execution of the braking-mode switching sub routine, the communication open/close valve 230 is closed and the low-pressure release valve 234 is opened for effectuating the braking mode depending on the operation force and the regulated pressure, while the communication open/close valve 230 is opened and the low-pressure release valve 234 is closed for effectuating the regulated-pressure-dependent braking mode.

Figure 10:
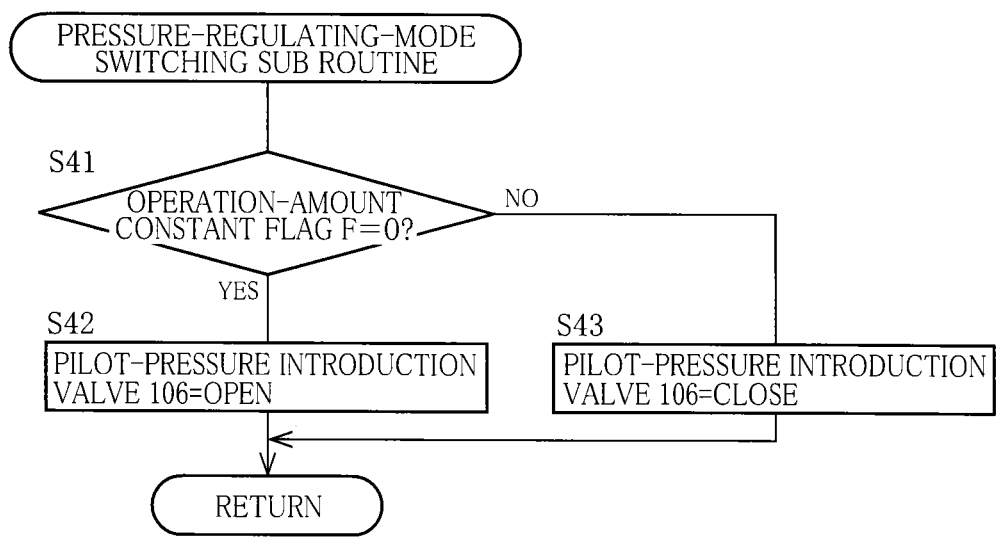
FIG. 10 is a flow chart showing a program for switching operations of a pressure regulator device executed in the vehicle brake system of the first embodiment.

FIG. 10 is a flow chart showing a program of a pressure-regulating-mode switching sub routine for switching modes in which the pressure regulator device 60 operates. In processing according to this program, it is judged at S41 whether or not the operation-amount constant flag F is 0. Where it is judged that the flag is 0, namely, where it is judged that the braking state is the regenerative-braking-force-dependent braking state $ST_1$ or the braking state depending on the operation force and the regulated pressure $ST_2$, in other words, where it is judged that the current situation is the hydraulic-braking impossible situation after operation initiation or the hydraulic-braking possible situation after operation initiation, the pilot-pressure introduction valve 106 is non-energized so as to be opened at S42. Accordingly, the pressure regulator device 60 operates in the valve mechanism operating mode so as to supply the working fluid to the master cylinder device 50. On the other hand, where it is judged at S41 that the operation-amount constant flag F is not 0, but 1, namely, where it is judged that the braking state is the braking state $ST_3$ depending on the regulated pressure and the regenerative braking force or the braking state $ST_4$ depending on the operation force, the regulated pressure, and the regenerative braking force, in other words, where it is judged that the current situation is the operation-amount constant situation or the operation-amount re-changed situation, the pilot-pressure introduction valve 106 is energized so as to be closed at S43. That is, when the operation-amount constant flag is 1, the pressure regulator device 60 operates in the linear valve operating mode so as to supply the working fluid to the master cylinder device 50.

Figure 11:
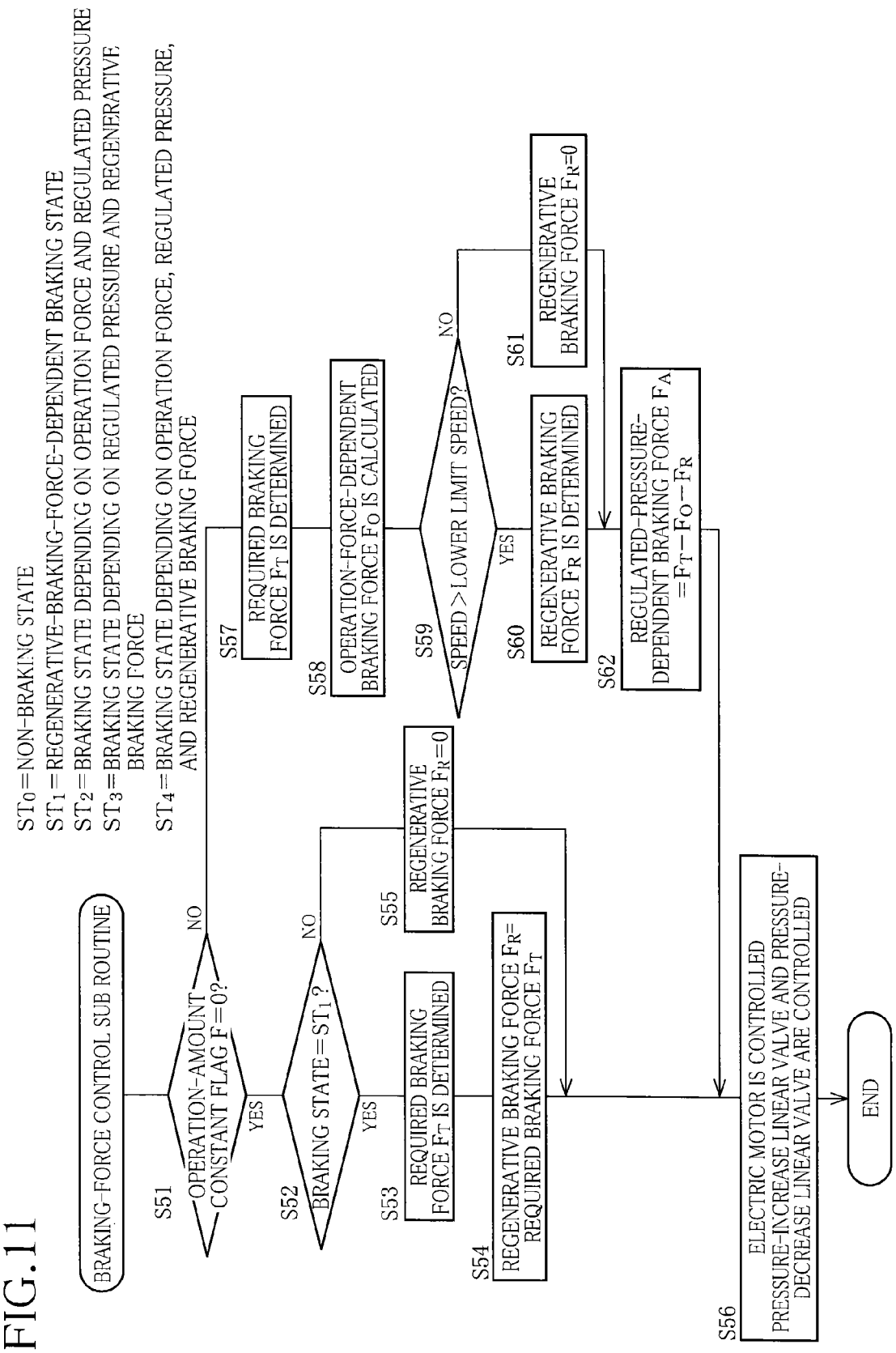
FIG. 11 is a flow chart showing a program for determining a braking force executed in the vehicle brake system of the first embodiment.

FIG. 11 shows a flow chart showing a program of a braking-force control sub routine for controlling the regulated-pressure-dependent braking force and the regenerative braking force. In processing according to this program, it is judged at S51 whether or not the operation-amount constant flag F is 0. Where it is judged that the flag F is 0, it is judged at S52 whether or not the braking state is the regenerative-braking-force-dependent braking state $ST_1$. Where the braking state is the regenerative-braking-force-dependent braking state $ST_1$, there is determined at S53 a required braking force $F_T$ that is a braking force required for the vehicle brake system as a whole. More specifically, the brake ECU 38 stores a map representing a relationship between the operation force and the required braking force $F_T$. The required braking force $F_T$ is determined based on the map. In the regenerative-braking-force-dependent braking state $ST_1$, the required braking force $F_T$ is generated only by the regenerative braking force $F_R$. Accordingly, at S54, the regenerative braking force $F_R$ is determined so as to have the same magnitude as the required braking force $F_T$. Where it is judged at S52 that the braking state is not the regenerative-braking-force-dependent braking state $ST_1$, it means that the braking state is the braking state $ST_2$ depending on the operation force and the regulated pressure since the operation-amount constant flag F is 0. In this case, the regenerative braking force $F_R$ is determined to be equal to 0 at S55. Subsequently, at S56, the electric motor 12 is controlled for generating the regenerative braking force $F_R$. To be more specific, data on the regenerative braking force $F_R$ having the determined magnitude is sent from the brake ECU 38 to the main ECU 30. The main ECU 30 sends the data to the motor ECU 34, and the motor ECU 34 controls the electric motor 12 such that the regenerative braking force $F_R$ having the determined magnitude is generated. The pressure regulator device 60 operates in the valve mechanism operating mode when the operation-amount constant flag F is 0. Accordingly, at S56, the pressure-increase linear valve 102 and the pressure-decrease linear valve 104 are non-energized so as to be closed and opened, respectively.

Where it is judged at S51 that the operation-amount constant flag F is not 0, namely, where it is judged that the flag F is 1, the required braking force $F_T$ is determined at S57 based on the operation force applied by the driver referring to the above-indicated map. Subsequently, there is calculated, at S58, an operation-force-dependent braking force $F_O$ generated by the hydraulic brake system 40 in dependence on the operation force. Where the hydraulic brake system 40 operates in the braking mode depending on the operation force and the regulated pressure, the entirety of the operation force is utilized for the braking force. The brake ECU 38 stores a map representing a relationship between values detected by the operation-force sensor 76 and the operation-force-dependent braking force $F_O$. The operation-force-dependent braking force $F_O$ is calculated based on the map. Where the hydraulic brake system 40 operates in the regulated-pressure-dependent braking mode, the operation-force-dependent braking force $F_O$ is calculated so as to be equal to 0. At S59, it is judged whether or not the speed of the vehicle is higher than the set speed, i.e., 6 km/h. Where it is judged that the vehicle speed is higher than the set speed, the regenerative braking force $F_R$ is determined at S60 as explained later in detail. Where it is judged that the vehicle speed is equal to or lower than the set speed, the regenerative braking force $F_R$ cannot be sufficiently generated due to the reduction in the speed. In this case, the regenerative braking force $F_R$ is determined to be equal to 0 at S61. That is, the regenerative braking force $F_R$ stops being generated.

Subsequently, there is calculated, at S62, a regulated-pressure-dependent braking force $F_A$ having a magnitude that depends of the regulated pressure, on the basis of the operation-force-dependent braking force $F_O$ and the regenerative braking force $F_R$, according to the following expression:

$$F_A = F_T - F_O - F_R$$

In this expression, a residuary braking force that is the remainder obtained by subtracting the operation-force-dependent braking force $F_O$ from the required braking force $F_T$ is equal to a sum of the regulated-pressure-dependent braking force $F_A$ and the regenerative braking force $F_R$, and the regenerative braking force $F_R$ is already determined in the previous step. Accordingly, the regulated-pressure-dependent braking force $F_A$ is calculated by subtracting the regenerative braking force $F_R$ from the residuary braking force. Thus, in the present vehicle brake system, the regenerative braking force $F_R$ is determined with a higher priority than the regulated-pressure-dependent braking force $F_A$, making it possible to determine the regulated-pressure-dependent braking force $F_A$ and the regenerative braking force $F_R$ such that the regenerative braking force $F_R$ is as large as possible. Accordingly, the present vehicle brake system is excellent in terms of electricity regeneration.

At S60, the regenerative braking force $F_R$ is determined based on the operation amount of the brake pedal 70, the vehicle speed, the charge status of the battery 26, the vehicle stability and maneuverability, and so on. In the process of repeated execution of the brake control program, the regenerative braking force $F_R$ may be determined so at to increase or decrease even when the operation force is constant or the regenerative braking force $F_R$ may be determined so as to decrease even when the operation force is being increased. To be more specific, there is a case in which, even when the operation amount is constant, the regenerative braking force $F_R$ is determined so as to decrease where the vehicle stability and maneuverability are deteriorated. In this case, the regulated-pressure-dependent braking force $F_A$ is determined at S62 so as to increase. Further, there is a case in which, even when the required braking force $F_T$ is increased by an increase in the operation amount, the regenerative braking force $F_R$ is determined so as to be constant or so as to decrease where the vehicle stability and maneuverability would be deteriorated if the regenerative braking force $F_R$ was increased. In this case, the regulated-pressure-dependent braking force $F_A$ is determined so as to increase. Therefore, the vehicle stability and maneuverability remain relatively good without being deteriorated.

At S56, the electric motor 12 is controlled to generate the regenerative braking force $F_R$. Further, when the operation-amount constant flag F is 1, the pressure-increase linear valve 102 and the pressure-decrease linear valve 104 are controlled at S56 to generate the calculated regulated-pressure-dependent braking force $F_A$. More specifically, the brake ECU 38 stores a map representing a relationship between the regulated-pressure-dependent braking force $F_A$ and the regulated pressure $P_A$, and the level of the regulated pressure $P_A$ for generating the calculated regulated-pressure-dependent braking force $F_A$ is determined based on the map. Subsequently, electricity to be supplied to the pressure-increase to linear valve 102 and the pressure-decrease linear valve 104 is adjusted such that the regulated pressure $P_A$ has the determined level. Accordingly, the pressure-increase linear valve 102 and the pressure-decrease linear valve 104 are opened at respective pressures in accordance with the adjusted electricity. To be more specific, where the regulated pressure $P_A$ becomes lower than a level that is equal to a difference obtained by subtracting a predetermined margin from the determined level, the pressure-increase linear valve 102 is opened and the regulated pressure $P_A$ is increased. Where the regulated pressure $P_A$ becomes higher than a level that is equal to a sum obtained by adding a predetermined margin to the determined level, the pressure-decrease linear valve 104 is opened and the regulated pressure $P_A$ is decreased. That is, the regulated pressure $P_A$ is regulated so as to fall within a predetermined range that includes the determined level.

Even where the operation-amount constant flag F is 0, the pilot-pressure introduction valve 106 may be controlled so as to be closed, namely, the pressure regulator device 60 may be operated in the linear valve operating mode, in the pressure-regulating-mode switching sub routine of FIG. 10, and the pressure-increase linear valve 102 and the pressure-decrease linear valve 104 may be controlled such that the regulated-pressure-dependent braking force $F_A$ is generated, at S56 of the braking-force control sub routine of FIG. 11. In this case, there may be added, after S55, a step corresponding to S58, i.e., a step for calculating the operation-force-dependent braking force $F_O$, and thereafter, there may be added a step corresponding to S62, i.e., a step for calculating the regulated-pressure-dependent braking force $F_A$ whose magnitude depends on the regulated pressure, based on the operation-force-dependent braking force $F_O$ and the regenerative braking force $F_R$. When the vehicle brake system is thus controlled, the regulated pressure is generally controlled utilizing the pressure-increase linear valve 102 and the pressure-decrease linear valve 104. However, unlike the pressure regulator 100, the pressure-increase linear valve 102 and the pressure-decrease linear valve 104 cannot increase the regulated pressure rapidly to a level that exceeds the set pressure, so that the brake devices 56 cannot generate the braking force. However, the present vehicle brake system can quickly generate the braking force utilizing the regenerative brake system as explained above.

<Relationship Between Control Programs and Functional Portions of Brake ECU>

Figure 12:
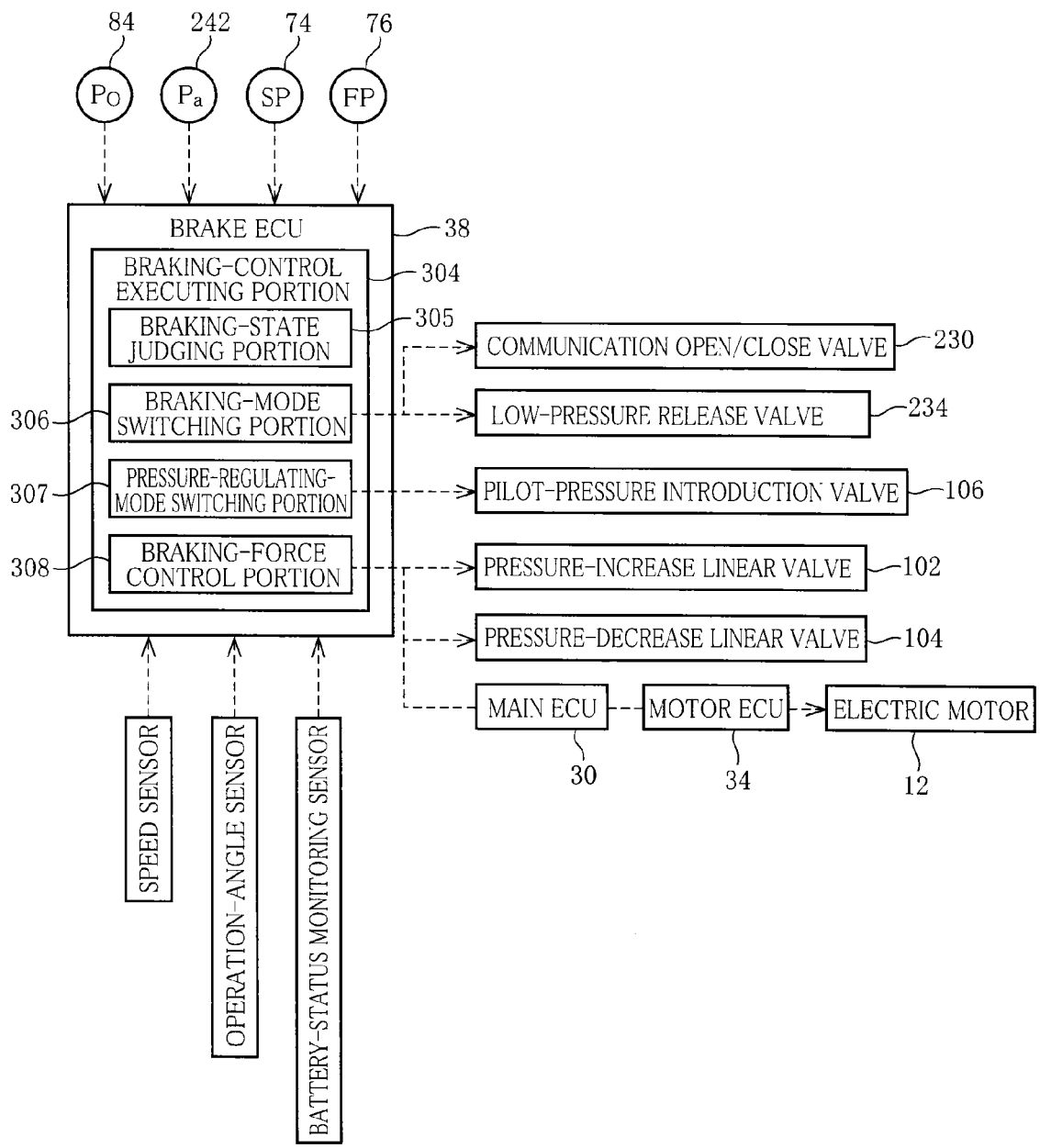
FIG. 12 is a block diagram showing functional portions of a controller mounted on the vehicle brake system of the first embodiment.

As shown in FIG. 12, the brake ECU 38 may be regarded to have a braking-control executing portion 304 configured to execute the brake control program. Further, the braking-control executing portion 304 may be regarded to have some functional portions. More specifically, the braking-control executing portion 304 may be regarded to have: a braking-state judging portion 305 for switching the braking state of the vehicle brake system; a braking-mode switching portion 306 for switching the braking mode of the hydraulic brake system; a pressure-regulating-mode switching portion 307 for switching the operation mode of the pressure regulator device 60; and a braking-force control portion 308 for controlling the regulated-pressure-dependent braking force $F_A$ and the regenerative braking force $F_R$. These functional portions will be explained in relation to the control processing executed according to the programs described above. In the brake control program, the processing in the braking-state judging sub routine corresponds to the braking-state judging portion 305, the processing in the braking-mode switching sub routine corresponds to the braking-mode switching portion 306, the processing in the pressure-regulating-mode switching sub routine corresponds to the pressure-regulating-mode switching portion 307, and the processing in the braking-force control sub routine corresponds to the braking-force control portion 308. As explained above, the regenerative braking force $F_R$ is determined based on the vehicle speed, the charge status of the battery 26, the vehicle stability and maneuverability, and so on. Accordingly, there are connected, to the brake ECU 38, a speed sensor for detecting the vehicle speed, an operation-angle sensor for detecting an operation angle of a steering wheel, a battery-status monitoring sensor for monitoring the charge status of the battery 26, and so on.

2. Second Embodiment

Figure 13:
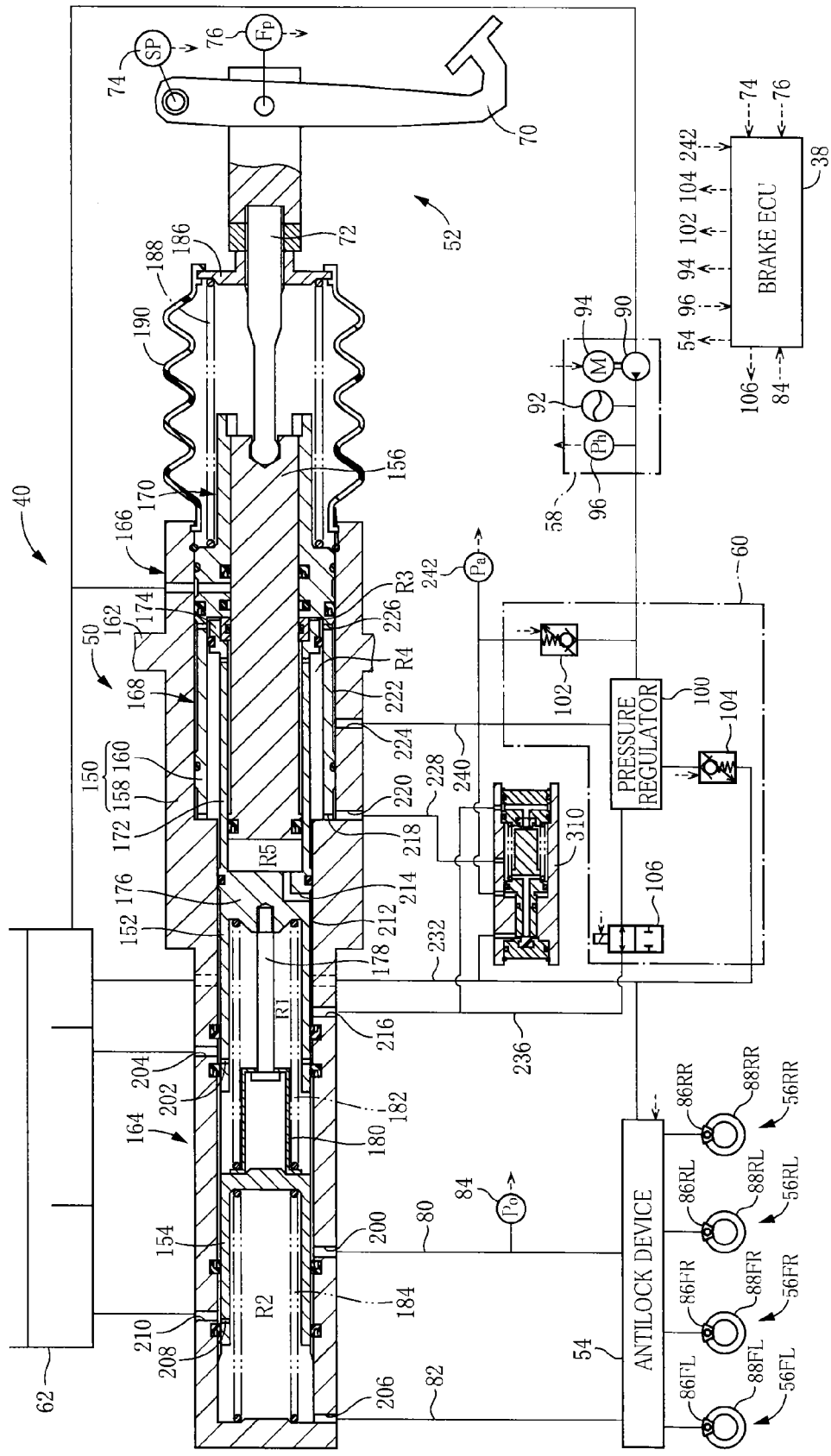
FIG. 13 is a view showing a hydraulic brake system for a vehicle brake system according to a second embodiment.

In the hydraulic brake system 40 of the vehicle brake system according to a second embodiment, a mechanical valve device 310 is provided in place of the communication open/close valve 230 and the low-pressure release valve 234 of the hydraulic brake system 40 of the first embodiment, as shown in FIG. 13. The vehicle brake system according to the second embodiment will be explained mainly in terms of a structure and an operation of the valve device 310 in the interest of brevity.

Figure 14:
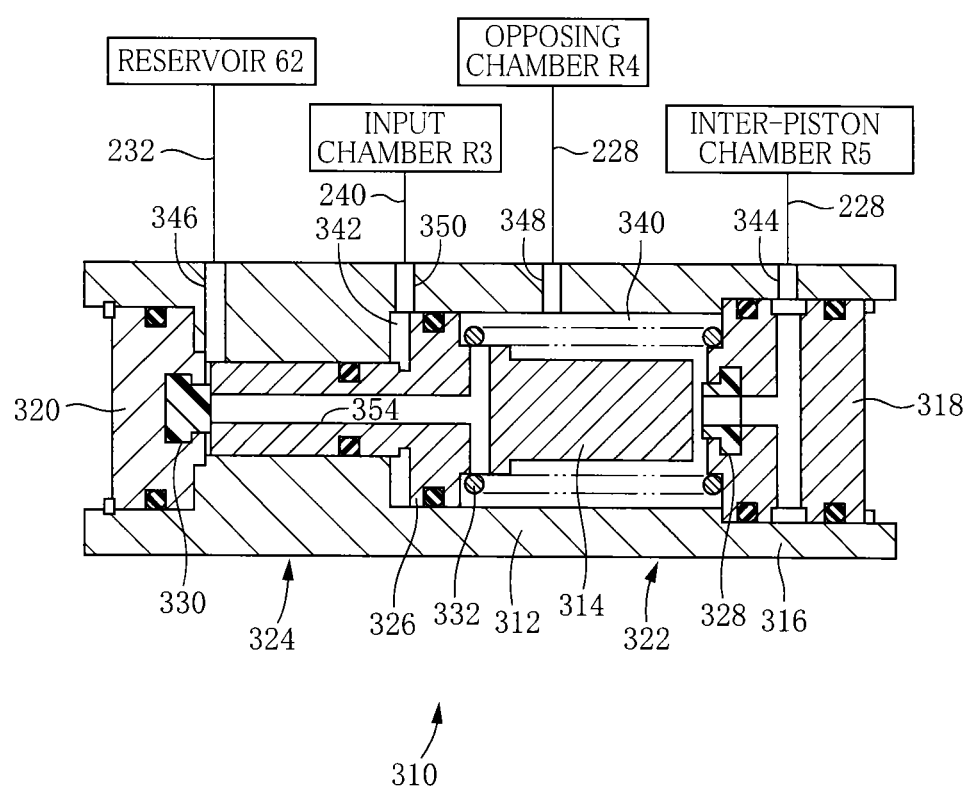
FIG. 14 is a schematic view showing a braking-mode switching mechanism in the second embodiment.

FIG. 14 shows the valve device 310 disposed in the vehicle brake system according to the second embodiment. The valve device 310 is constituted roughly by a housing 312 and a valve piston 314 disposed in the housing 312. The housing 312 includes a tubular member 316, a one-end-side member 318 fitted in the tubular member 316 so as to close one of opposite ends of the tubular member 316, and an other-end-side member 320 fitted in the tubular member 316 so as to close the other of the opposite ends of the tubular member 316. The tubular member 316 has a large-diameter portion 322 having a large inner diameter on one-end side (i.e., the right side in FIG. 14) and a small-diameter portion 324 having a small inner diameter on the other-end side (i.e., the left side in FIG. 14). The valve piston 314 has a generally cylindrical shape having a flange 326 formed at its middle portion on its outer circumference. The valve piston 314 is movable in the axial direction of the housing 312 and is disposed such that the flange 326 is slidable on the large-diameter portion 322 of the tubular member 316 while a portion of the valve piston 314 located on the other-end side of the flange 326 is slidable on the small-diameter portion 324. A cushioning member 328 is embedded in the one-end-side member 318 on which the valve piston abuts for lessening an impact of abutting contact of the valve piston 314. Similarly, a cushioning member 330 is embedded in the other-end-side member 320 for lessening an impact of abutting contact of the valve piston 314. In the housing 312, a compression coil spring 332 is disposed. The compression coil spring 332 is supported by the one-end-side member 318 on the one-end side and is supported by the flange 326 of the valve piston 314 on the other-end side. Accordingly, the valve piston 314 is biased toward the other-end side by the coil spring 332. The coil spring 332 has a relatively small spring constant.

In the thus constructed valve device 310, fluid chambers and communication passages are formed. There is formed, between an inner circumferential surface of the large-diameter portion 322 of the housing 312 and an outer circumferential surface of the valve piston 314, a first fluid chamber 340 in which the coil spring 332 is disposed. On the other-end side of the flange 326 of the valve piston 314, a second fluid chamber 342 is defined by the outer circumferential surface of the valve piston 314 and the inner circumferential surface of the housing 312. The housing 312 is provided with: a communication hole 344 whose one end is open to a surface of the first-end-side member 318 with which the valve piston 314 comes into contact while the other end is open to the exterior; and a communication hole 346 whose one end is open to a space between the other-end-side member 320 and the valve piston 314 while the other end is open to the exterior. The tubular member 316 is provided with: a communication hole 348 whose one end is open to the first fluid chamber 340 while the other end is open to the exterior; and a communication hole 350 whose one end is open to the second fluid chamber 342 while the other end is open to the exterior. The valve piston 314 is provided with a communication hole 354 whose one end is open to the first fluid chamber 340 while the other end is open to en end face of the valve piston 314 on the other-end side.

To the communication hole 344 and the communication hole 348, an inter-chamber communication passage 228 is connected. That is, the communication hole 344, the communication hole 348, and the first fluid chamber 340 provide a part of an inter-chamber communication passage that permits communication between the inter-piston chamber R5 and the opposing chamber R4 of the master cylinder device 50. To the communication hole 346, the low-pressure release passage 232 is connected, and the space between the other-end-side member 320 and the valve piston 314 communicates with the reservoir 62. Accordingly, when the end face of the valve piston 314 on the other-end side is spaced apart from the other-end-side member 320, the opposing chamber R4 communicates with the reservoir 62 via the communication hole 348, the first fluid chamber 340, the communication hole 354, and the communication hole 346. That is, the communication hole 348, the first fluid chamber 340, the communication hole 354, and the communication hole 346 provide a part of the low-pressure release passage 232 that permits communication between the opposing chamber R4 and the reservoir 62. To the communication hole 350, a communication passage that branches off from the regulated-pressure supply passage 240 is connected, whereby the working fluid having the regulated pressure is supplied to the second fluid chamber 342.

The thus constructed valve device 310 can operate utilizing the regulated pressure as the pilot pressure. In the valve device 310, when the brake operation is not being performed, namely, where the regulated pressure is equal to 0, the valve piston 314 is biased toward the other-end side by the coil spring 332. In this case, an end face of the valve piston 314 on the one-end side is spaced apart from the one-end-side member 318 while the end face of the valve piston 314 on the other-end side is in contact with the other-end-side member 320. Accordingly, the inter-piston chamber R5 and the opposing chamber R4 are in communication with each other while the communication of the opposing chamber R4 with the reservoir 62 is shut off. When the brake operation is initiated in this condition, the hydraulic brake system 40 operates in the regulated-pressure-dependent braking mode in which the hydraulic brake system 40 generates the regulated-pressure-dependent braking force whose magnitude depends on the regulated pressure. Thus, the braking state of the present vehicle brake system becomes the regenerative-braking-force-dependent braking state in the hydraulic-braking impossible situation after operation initiation, i.e., the situation before the hydraulic brake system 40 becomes capable of generating the braking force after initiation of the brake operation.

When the working fluid is supplied by the brake operation from the pressure regulator device 60 to the input chamber R3 in this condition, the pressure equal to the regulated pressure acts on the flange 326, whereby the valve piston 314 is moved toward the one-end side. As a result, the end face of the valve piston 314 on the one-end side comes into contact with the one-end-side member 318 while the end face of the valve piston 314 on the other-end side is separated away from the second-end-side member 320. That is, the communication between the inter-piston chamber R5 and the opposing chamber R4 is shut off while the opposing chamber R4 is brought into communication with the reservoir 62. Accordingly, the hydraulic brake system 40 operates in the braking mode depending on the operation force and the regulated pressure in which the hydraulic brake system 40 generates both of the operation-force-dependent braking force and the regulated-pressure-dependent braking force. Thus, the braking state of the present vehicle brake system becomes the braking state depending on the operation force and the regulated pressure in the hydraulic-braking possible situation after operation initiation, i.e., the situation in which the hydraulic brake system 40 is capable of generating the braking force after initiation of the brake operation.

Accordingly, the valve device 310 may be regarded as having an inter-chamber-communication switching mechanism that switches between: the communication between the inter-piston chamber R5 and the opposing chamber R4; and the shutting off of the communication therebetween, and a low-pressure-source-communication switching mechanism that switches between: the communication between the opposing chamber R4 and the reservoir 62; and the shutting off of the communication therebetween. The valve device 310 functions as a braking-mode switching mechanism that selectively effectuates one of the regulated-pressure-dependent braking mode and the braking mode depending on the operation force and the regulated pressure. In the vehicle brake system according to the present embodiment, therefore, the braking mode of the hydraulic brake system 40 can be switched by a relatively inexpensive mechanical valve mechanism.

Accordingly, the present vehicle brake system is configured such that the brake pedal 70 cannot be moved forward by the operation force in the regulated-pressure-dependent braking mode. Therefore, the hydraulic brake system 40 avoids a useless increase in the operation amount of the brake pedal 70, namely, avoids a phenomenon that the operation amount of the brake pedal 70 is increased even though the braking force is not generated in the brake devices 56, so as to eliminate the above-indicated "play". Thus, the operation feeling in the brake operation is improved in the present brake system.

Figure 15:
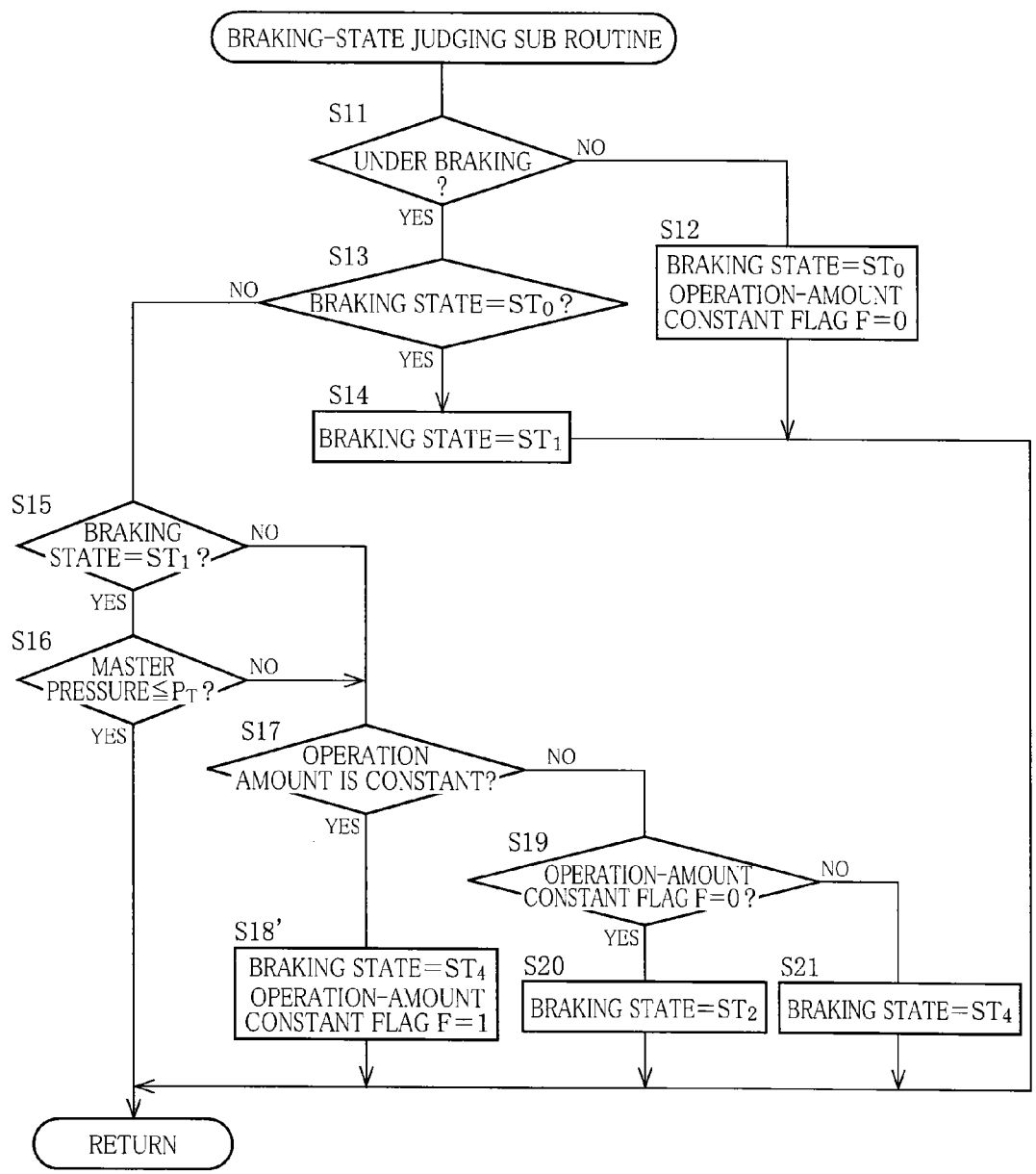
FIG. 15 is a flow chart showing a program for judging a braking state executed in the vehicle brake system of the second embodiment.

In the vehicle brake system having the valve device 310, even in the operation-amount constant situation, the braking mode depending on the operation force and the regulated pressure of the hydraulic brake system 40 is maintained. Accordingly, even in the operation-amount constant situation, the vehicle brake system is placed in the braking state depending on the operation force, the regulated pressure, and the regenerative braking force. Therefore, the braking-state judging sub routine in the brake control program of this second embodiment shown in FIG. 15 differs from the braking-state judging sub routine of the first embodiment shown in FIG. 8 in the processing corresponding to S18. To be more specific, as shown in FIG. 15, where it is judged at S17 that the operation amount is constant, the braking state is determined as the braking state $ST_4$ depending on the operation force, the regulated pressure, and the regenerative braking force at S18' of the braking-state judging sub routine of the second embodiment.

MODIFIED EXAMPLE 1

A vehicle brake system according to this modified example 1 is roughly identical in construction with the vehicle brake system according to the second embodiment. The vehicle brake system of this modified example 1 will be explained mainly in terms of a structure and an operation different from those of the vehicle brake system of the second embodiment in the interest of brevity.

Figure 16:
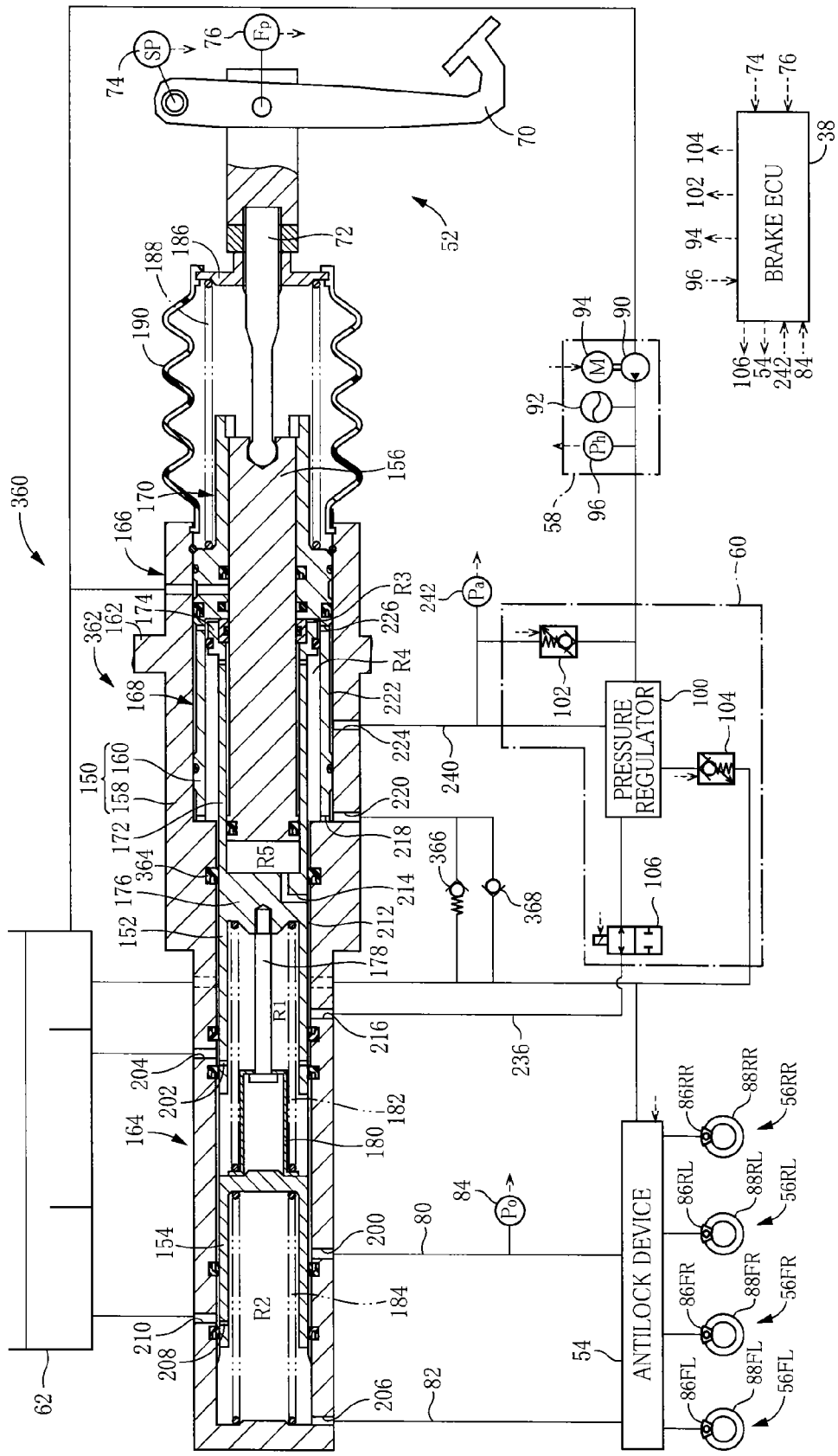
FIG. 16 is a schematic view showing a master cylinder device in a modified example of the second embodiment.

FIG. 16 shows a hydraulic brake system 360 of the vehicle brake system according to the modified example 1. The hydraulic brake system 360 includes a master cylinder device 362. The master cylinder device 362 is roughly identical in construction with the master cylinder device 50 of the first embodiment. In the master cylinder device 362, a primary cup 364 is embedded in the inner circumferential surface of the front small-diameter portion 164 of the first housing member 158 so as to be located at the rear-side portion of the front small-diameter portion 164. The first pressurizing piston 152 is disposed so as to be slidable relative to the first housing member 158 via the primary cup 364. The primary cup 364 is a seal member that permits a flow of the working fluid in one of opposite directions while prohibits a flow of the working fluid in the other of the opposite directions. More specifically, the primary cup 364 permits a flow of the working fluid from the opposing chamber R4 to the inter-piston chamber R5 while prohibits a flow of the working fluid from the inter-piston chamber R5 to the opposing chamber R4, via: the fluid passage 212, as a first fluid passage, that communicates with the opposing chamber; and the communication hole 214, as a second fluid passage, whose one end is open to the inter-piston chamber R5 while the other end is open to the fluid passage 212. That is, in the hydraulic brake system 360, the primary cup 364 functions as an inter-chamber-communication switching valve that switches between: the communication between the inter-piston chamber R5 and the opposing chamber R4; and the shutting off of the communication therebetween.

A relief valve 366 and a check valve 368 are provided outside the master cylinder device 362 such that the valves 366, 368 are disposed in the low-pressure release passage 232 so as to be in parallel with the low-pressure release valve 234. The relief valve 366 functions as a pressure relief mechanism that brings the opposing chamber R4 into communication with the reservoir 62 where the pressure of the opposing chamber R4 is equal to or higher than a predetermined pressure. The check valve 368 prevents the opposing chamber R4 from being placed in a negative pressure state.

When the brake operation is initiated in the thus constructed hydraulic brake system 360, the low-pressure release valve 234 is energized so as to be closed, whereby the opposing chamber R4 is hermetically closed. Further, the working fluid is permitted to flow from the opposing chamber R4 to the inter-piston chamber R5, namely, the opposing chamber R4 and the inter-piston chamber R5 are brought into communication with each other, via the primary cup 364. As a result, when the working fluid is supplied from the pressure regulator device 60 to the input chamber R3 and the first pressurizing piston 152 is accordingly moved forward, the working fluid in the opposing chamber R4 flows into the inter-piston chamber R5 via the primary cup 364, the fluid passage 212, and the communication hole 214. Accordingly, the hydraulic brake system 360 operates in the regulated-pressure-dependent braking mode in which the hydraulic brake system 360 generates the regulated-pressure-dependent braking force whose magnitude depends on the regulated pressure. Thus, the braking state of the present vehicle brake system becomes the regenerative-braking-force-dependent braking state, in the hydraulic-braking impossible situation after operation initiation, i.e., the situation before the hydraulic brake system 360 becomes capable of generating the braking force after initiation of the brake operation.

When the working fluid in the pressurizing chambers R1, R2 is pressurized and the brake devices 56 accordingly become capable of generating the braking force as described above, namely, when the regulated pressure exceeds the set pressure that is equal to a pressure increased by the initial pressure increase amount $\Delta P_{AJ}$, the relief valve 366 is opened by the pressure of the opposing chamber R4 at that time. As a result, the pressure of the opposing chamber R4 becomes lower than the pressure of the inter-piston chamber R5, so that the working fluid in the opposing chamber R4 cannot flow into the inter-piston chamber R5. Further, the working fluid in the inter-piston chamber R5 cannot flow into the opposing chamber R4 by the primary cup 364. That is, the communication between the inter-piston chamber R5 and the opposing chamber R4 is shut off while the opposing chamber R4 is brought into communication with the reservoir 62 via the relief valve 366. Accordingly, the hydraulic brake system 360 operates in the braking mode depending on the operation force and the regulated pressure in which the hydraulic brake system 360 generates both of the operation-force-dependent braking force and the regulated-pressure-dependent braking force. Thus, the braking state of the present vehicle brake system becomes the braking state depending on the operation force and the regulated pressure in the hydraulic-braking possible situation after operation initiation, i.e., the situation in which the hydraulic brake system 360 is capable of generating the braking force after initiation of the brake operation.

Thus, the primary cup 364 functions as an inter-chamber-communication shutoff valve that shuts off the communication between the inter-piston chamber R5 and the opposing chamber R4 after the brake operation is initiated and the hydraulic brake system 40 becomes capable of generating the braking force. Further, the primary cup 364 permits a flow of the working fluid from the opposing chamber R4 to the inter-piston chamber R5 while prohibits a flow of the working fluid from the inter-piston chamber R5 to the opposing chamber R4. Accordingly, it may be regarded that the primary cup 364 functions as a check mechanism. The relief valve 366 may be regarded as a low-pressure-source communication valve configured to shut off the communication between the opposing chamber R4 and the reservoir 62 when the brake operation is not being performed and to establish the communication therebetween after the brake operation is initiated and the hydraulic brake system 360 becomes capable of generating the braking force. Further, the relief valve 366 functions as a pressure relief mechanism that brings the opposing chamber R4 into communication with the reservoir 62 when the pressure of the opposing chamber R4 is higher than a predetermined pressure. Therefore, the primary cup 364 and the relief valve 366 function as a braking-mode switching mechanism that selectively effectuates one of the regulated-pressure-dependent braking mode and the braking mode depending on the operation force and the regulated pressure. Thus, according to the vehicle brake system, the seal member necessary for sliding of the body portion 172 of the first pressurizing piston 152 relative to the housing 150 functions also as a check valve, whereby the hydraulic brake system 360 can be made relatively simple and compact.

According to the present vehicle brake system, the brake pedal 70 cannot be moved forward by the operation force in the regulated-pressure-dependent braking mode. Therefore, the hydraulic brake system 360 avoids a useless increase in the operation amount of the brake pedal 70, namely, avoids a phenomenon that the operation amount of the brake pedal 70 is increased even though the braking force is not generated in the brake devices 56, so as to eliminate the above-indicated "play". Thus, the operation feeling in the brake operation is improved in the present brake system. In the present vehicle brake system that is provided with the primary cup 364 and the relief valve 366, the braking mode depending on the operation force and the regulated pressure of the hydraulic brake system 360 is maintained even in the operation-amount constant situation and the operation-amount re-changed situation.

3. Third Embodiment

Figure 17:
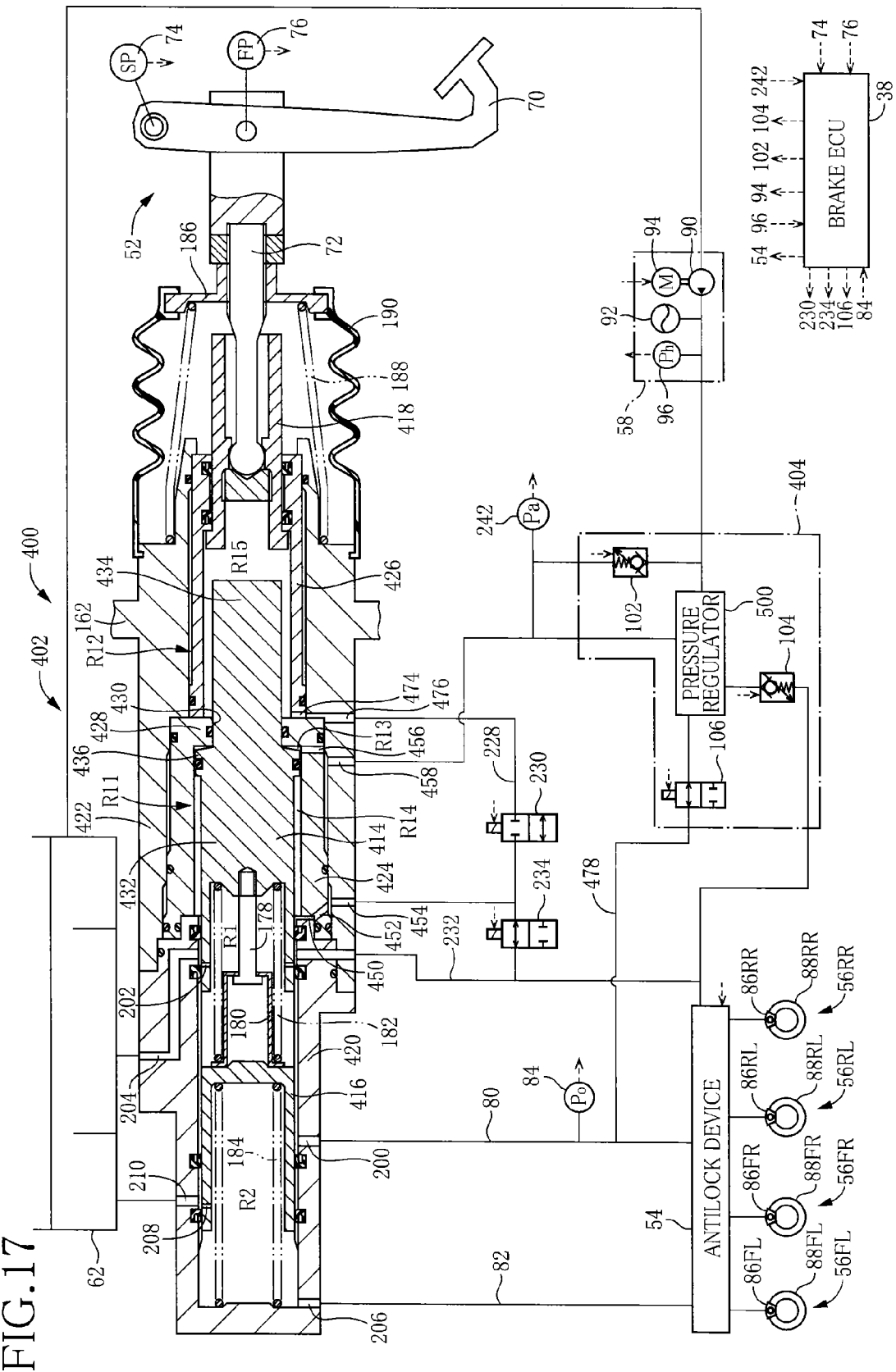
FIG. 17 is a view showing a hydraulic brake system for a vehicle brake system according to a third embodiment.

FIG. 17 shows a hydraulic brake system 400 provided in a vehicle brake system according to a third embodiment of the invention. The hydraulic brake system 400 has a master cylinder device 402 and a pressure regulator device 404. The hydraulic brake system 400 is roughly identical in construction with the hydraulic brake system 40 of the first embodiment. The hydraulic brake system 400 of the third embodiment will be explained in terms of a structure and an operation different from those of the hydraulic brake system 40 of the first embodiment, and explanation of the same structure and operation as the hydraulic brake system 40 of the first embodiment are omitted, in the interest of brevity.

<Structure of Master Cylinder Device>

The master cylinder device 402 includes: a housing 412 that is a casing of the master cylinder device 402; a first pressurizing piston 414 and a second pressurizing piston 416 that pressurize the working fluid to be supplied to the brake devices 56; and an input piston 418 to which an operation of the driver is input through the operating device 52. FIG. 17 shows a state in which the master cylinder device 402 is not operated, namely, a state in which a brake operation is not performed.

The housing 412 is constituted mainly by four members, i.e., a first housing member 420, a second housing member 422, a third housing member 424, and a fourth housing member 426. The first housing member 420 has a generally hollow cylindrical shape whose front end is closed. The second housing member 422 has a generally hollow cylindrical shape. A rear portion of the first housing member 420 is fitted into a front end portion of the second housing member 422, whereby the first housing member 420 and the second housing member 422 are made integral with each other.

In the second housing member 422, the third housing member 424 having a cylindrical shape is disposed such that a front end portion of the third housing member 424 fits on a rear end portion of the first housing member 420. The third housing member 424 has a cylindrical shape having an inward flange 428 formed at its rear end. The inward flange 428 defines a through-hole 430 at the rear end of the third housing member 424. The third housing member 424 has an inner diameter larger than an inner diameter of the first housing member 420.

In the second housing member 422, the fourth housing member 426 having a cylindrical shape is further disposed between a rear end face of the third housing member 424 and a rear end portion of the second housing member 422. An interior of the thus constructed housing 412 is partitioned by the inward flange 428 of the second housing member 422 into a front-side chamber R11 located on the front side and a rear-side chamber R12 located on the rear side. In other words, the inward flange 428 functions as a partition portion that partitions the interior of the housing 412, and the through-hole 430 is an opening of the partition portion.

The second pressurizing piston 416 is slidably fitted with seals into the first housing member 420 in the front-side chamber R11. The first pressurizing piston 414 is disposed rearward of the second pressurizing piston 416 in the front-side chamber R11 and includes: a cylindrical body portion 432 whose rear end is closed; and an extension portion 434 that extends from the body portion 432 into the rear-side chamber R12 through the through-hole 430. A flange portion 436 is formed on an outer circumference of a rear end portion of the body portion 432. The first pressurizing piston 414 is fitted with seals into the housing 412 such that a front portion of the body portion 432 is slidable with respect to the first housing member 420, the flange portion 436 is slidable with respect to the inner circumferential surface of the third housing member 424, and the extension portion 434 is slidable with respect to the through-hole 430 of the third housing member 424. The first pressurizing piston 414 is restricted from moving rearward by contact of the rear end portion of the body portion 432 with a front end face of the inward flange 428 of the third housing member 424.

The input piston 418 has a generally cylindrical shape. The input piston 418 is disposed in the rear-side chamber R12 and is fitted with seals into the fourth housing member 426 on the rear side of the extension portion 434 of the first pressurizing piston 414. The input piston 418 is restricted from moving rearward by contact of a stepped portion thereof formed on its outer circumferential surface on the front side with a stepped portion of the fourth housing member 426 formed on its inner circumferential surface on the rear side.

In the thus constructed master cylinder device 402, an input chamber R13 to which the working fluid supplied from the pressure regulator device 404 is input is defined between the flange portion 436 of the body portion 432 of the first pressurizing piston 414 and the inward flange 428 of the third housing member 424. On the front side of the flange portion 436, an annular opposing chamber R14 is defined between the inner circumferential surface of the third housing member 424 and the outer circumferential surface of the first pressurizing piston 414. The opposing chamber R14 is opposed to the input chamber R13 with the flange portion 436 interposed therebetween. In a state in which no brake operation is performed, a space is provided between: a rear end face of the extension portion 434 of the first pressurizing piston 414 that extends into the rear-side chamber R12 utilizing the through-hole 430; and a front end face of the input piston 418. In other words, the first pressurizing piston 414 and the input piston 418 are opposed to each other with the space interposed therebetween. An inter-piston chamber R15 is defined around the extension portion 434 so as to include the space. In the first pressurizing piston 414, a pressure receiving area of the first pressurizing piston 414 on which a pressure of the working fluid in the inter-piston chamber R15 acts forward, namely, an area of the rear end face of the extension portion 434, is made slightly larger than a pressure receiving area of the first pressurizing piston 414 on which a pressure of the working fluid in the opposing chamber R14 acts rearward, namely, an area of the front end face of the flange portion 436.

In the first housing member 420, there is provided a communication hole 450 whose one end is open to the opposing chamber R14. In the third housing member 424, there is provided a communication hole 452 whose one end is open so as to be opposed to the other end of the communication hole 450. In the second housing member 422, there is provided a communication hole 454 whose one end is open so as to be opposed to the other end of the communication hole 452 and whose other end functions as a connection port so as to be open to the exterior. That is, the opposing chamber R14 communicates with the exterior via the communication holes 450, 452, 454. In the third housing member 424, there is provided a communication hole 456 whose one end is open to the input chamber R13. In the second housing member 422, there is provided a communication hole 458 whose one end is open so as to be opposed to the other end of the communication hole 456 and whose other end functions as a connection port so as to be open to the exterior. That is, the input chamber R13 communicates with the exterior via the communication holes 456, 458.

At a front end portion of the fourth housing member 426, there is provided a communication hole 474 whose one end is open to the inter-piston chamber R15. In the second housing member 422, there is provided a communication hole 476 whose one end is open so as to be opposed to the other end of the communication hole 474 and whose other end is open to the exterior. That is, the inter-piston chamber R15 can communicate with the exterior also via the communication holes 474, 476.

Outside the housing 412, one end of the inter-chamber communication passage 228 is connected to the connection port of the communication hole 476 while the other end of the inter-chamber communication passage 228 is connected to the connection port of the communication hole 454. Accordingly, the inter-piston chamber R5 and the opposing chamber R4 can communicate with each other via the inter-chamber communication passage 228. The low-pressure release passage 232 branches off from the inter-chamber communication passage 228 between the communication hole 454 and the communication open/close valve 230. Further, in the hydraulic brake system 400, a communication passage 478 branches off from the fluid passage 80 and is connected to a pressure regulator 500 of the pressure regulator device 404.

The regulated-pressure supply passage 240 to which the working fluid having the regulated pressure is supplied is connected at its one end to the pressure regulator device 404 and at the other end to the connection port of the communication hole 458. Thus, the working fluid whose pressure is regulated by the pressure regulator device 404 can be supplied to the input chamber R13.

<Structure of Pressure Regulator>

Figure 18:
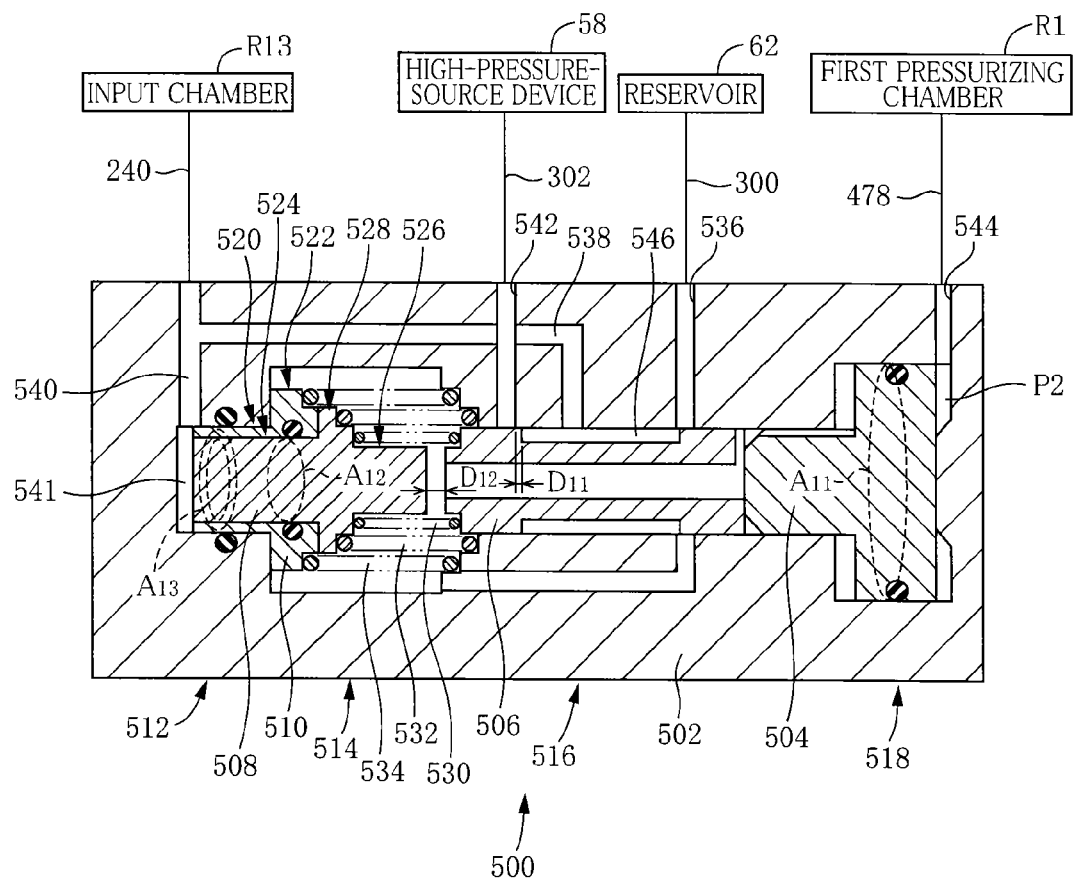
FIG. 18 is a view showing a pressure regulator of the hydraulic brake system shown in FIG. 17.

There will be explained below in detail a structure of the pressure regulator 500 with reference to FIG. 18. In the following explanation, terms such as "frontward (forward)" and "rearward" are used to indicate the leftward direction and the rightward direction, respectively, in FIG. 18.

The pressure regulator 500 includes: a cylindrical housing 502 whose opposite ends are closed; a movable rod 504 disposed in the housing 502; a spool 506 disposed forward of the movable rod 504; a reaction-force plunger 508 disposed forward of the spool 506; and a reaction-force-plunger support member 510 fitted on the reaction-force plunger 508.

One of opposite end sides of the housing 502 that is on the rear side is defined as a first-end side while the other of the opposite end sides that is on the front side is defined as a second-end side. The housing 502 is sectioned roughly into four portions having mutually different inner diameters, namely, a front small-diameter portion 512 located on the front side and having a small inner diameter, a front large-diameter portion 514 located rearward of the front small-diameter portion 512 and having a large inner diameter, a rear small-diameter portion 516 located rearward of the front large-diameter portion 514 and having a small inner diameter; and, a rear large-diameter portion 518 located rearward of the rear small-diameter portion 516 and having a large inner diameter.

The movable rod 504 is disposed such that its front-side portion is in sliding contact with an inner circumferential surface of the rear small-diameter portion 516 and its rear-side portion is in sliding contact with an inner circumferential surface of the rear large-diameter portion 518. As explained later, there is defined, between the rear end face of the movable rod 504 and the housing 502, a fluid chamber P2 that stores the working fluid having the pilot pressure for activating the pressure regulator 500. (The fluid chamber P2 will be hereinafter referred to as "pilot chamber" where appropriate.)

The spool 506 has a cylindrical shape and is disposed so as to be in sliding contact with an inner circumferential surface of the rear small-diameter portion 516 of the housing 502. The reaction-force-plunger support member 510 has a cylindrical shape and has, on the front side, a small-diameter portion 520 having a small outer diameter and, on the rear side, a large-diameter portion 522 having a large outer diameter. The reaction-force-plunger support member 510 is configured such that the small-diameter portion 520 is slidably supported by the front small-diameter portion 512 of the housing 502 and a stepped surface between the small-diameter portion 520 and the large-diameter portion 522 is capable of coming into contact with a stepped surface between the front small-diameter portion 512 and the front large-diameter portion 514 of the housing 502. The reaction-force plunger 508 has a columnar shape and has a front portion 524 located on the front side, a rear portion 526 located on the rear side, and a flange 528 formed between the front portion 524 and the rear portion 526. The reaction-force plunger 508 is fitted in the reaction-force-plunger support member 510 from the rear side, such that the reaction-force-plunger support member 510 contacts, from the front side, a stepped surface of the reaction-force plunger 508 defined by the flange 528.

In the front large-diameter portion 514 of the housing 502, a plurality of compression coil springs are disposed. More specifically, a first compression coil spring 530 is disposed between the spool 506 and the reaction-force plunger 508 for biasing the spool 506 and the reaction-force plunger 508 so as to be separated away from each other. A second compression coil spring 532 is disposed between the housing 502 and the reaction-force plunger 508 for biasing the housing 502 and the reaction-force plunger 508 so as to be separated away from each other. A third compression coil spring 534 is disposed between the housing 502 and the reaction-force-plunger support member 510 for biasing the housing 502 and the reaction-force-plunger support member 510 so as to be separated away from each other. Thus, the movable rod 504 and the spool 506 are biased rearward by an elastic force of the first compression coil spring 530. The first compression coil spring 530 has a relatively small spring constant. The reaction-force plunger 508 is biased forward by an elastic force of the second compression coil spring 532, and the reaction-force-plunger support member 510 is biased forward by elastic forces of the second compression coil spring 532 and the third compression coil spring 534. The second compression coil spring 532 has the same spring constant as the third compression coil spring 534. The reaction-force plunger 508 and the reaction-force-plunger support member 510 are biased forward also by the elastic force of the first compression coil spring 530. However, because the elastic force of the first compression coil spring 530 is considerably smaller than those of the second compression coil spring 532 and the third compression coil spring 534, the elastic force of the first compression coil spring 530 is ignored here. In a state shown in FIG. 18, the second compression coil spring 532 is compressed, and the reaction-force plunger 508 is biased in advance by a forward force $F_{SET1}$ (hereinafter referred to as "first initial biasing force $F_{SET1}$" where appropriate). Further, the third compression coil spring 534 is also compressed in the state of FIG. 18, and the reaction-force-plunger support member 510 is biased in advance by a forward force $F_{SET2}$ (hereinafter referred to as "second initial biasing force $F_{SET2}$" where appropriate).

In the housing 502, a plurality of communication holes are formed. More specifically, a communication hole 536 is formed whose one end is open to the inner circumferential surface of the rear small-diameter portion 516 while the other end functions as a connection port so as to be open to the exterior. On the front side of the communication hole 536, a communication hole 538 is formed whose one end is open to the inner circumferential surface of the rear small-diameter portion 516 while the other end functions as a connection port so as to be open to the exterior. A communication hole 540 branches off from the communication hole 538 in the housing 502 and is open to a space 541 defined by a front end face of the front small-diameter portion 512, a front end face of the reaction-force plunger 508, and a front end face of the reaction-force-plunger support member 510. Further, in the rear small-diameter portion 516, a communication hole 542 is formed whose one end is open to the inner circumferential surface of the small-diameter portion 516 at a position forward of the opening of the communication hole 538 and whose other end functions as a connection port so as to be open to the exterior. That is, the opening of the communication hole 536, the opening of the communication hole 538, and the opening of the communication hole 542 are formed in the inner circumferential surface of the rear small-diameter portion 516 of the housing 502 so as to be arranged in this order from the rear side toward the front side. In the housing 502, a communication hole 544 is formed whose one end is open to the pilot chamber P2 while the other end functions as a connection port so as to be open to the exterior. Further, the outer diameter of the spool 506 is partly reduced, whereby there is formed, on an outer circumference of the spool portion 506, a communication portion 546 through which the working fluid is permitted to flow. The length of the communication portion 546 in the front-rear direction is made slightly smaller than a distance between the opening of the communication hole 536 and the opening of the communication hole 542. That is, the communication portion 546 is formed such that communication between the communication hole 536 and the communication hole 542 by the communication portion 546 is prohibited.

In the thus constructed pressure regulator 500, the low-pressure communication passage 300 that communicates with the reservoir 62 is connected to the connection port of the communication hole 536, and the high-pressure communication passage 302 that communicates with the high-pressure-source device 58 is connected to the connection port of the communication hole 542. Accordingly, in the pressure regulator 500, the communication hole 536 functions as a low-pressure passage through which the working fluid is discharged from the inside of the housing 502 to the reservoir 62, and the communication hole 542 functions as a high-pressure passage through which the working fluid supplied from the high-pressure-source device 58 is introduced into the inside of the housing 502. The regulated-pressure supply passage 240 is connected to the connection port of the communication hole 538, and the working fluid whose pressure has been regulated by the pressure regulator 500 is supplied to the master cylinder device 402 via the regulated-pressure supply passage 240, as later explained. The communication passage 478 is connected to the connection port of the communication hole 544. Therefore, the pressure of the pilot chamber P2 is equal to the pressure of the working fluid to be supplied to the brake device 56, namely, the master pressure.

In the pressure regulator 500, an area of the rear end face of the movable rod 504 is $A_{11}$. The front end face of the reaction-force plunger 508 has a cross-sectional area $A_{12}$, and the front end face of the reaction-force-plunger support member 510 has a cross-sectional area $A_{13}$. Here, the cross-sectional area $A_{12}$ of the front end face of the reaction-force plunger 508 is larger than the cross-sectional area $A_{13}$ of the front end face of the reaction-force-plunger support member 510. In the state shown in FIG. 18, a distance between a front end of the communication portion 546 and the opening of the communication hole 542 is $D_{11}$, and a distance between the front end face of the spool 506 and the rear end face of the reaction-force plunger 508 is $D_{12}$. Here, the distance $D_{12}$ is somewhat larger than the distance $D_{11}$.

<Operation of Pressure Regulator>

In the thus constructed pressure regulator 500, when the movable rod 504 moves forward by the pressure of the pilot chamber P2 that acts thereon, the movable rod 504 pushes the spool 506 forward. That is, in the pressure regulator 500, the pressure of the working fluid introduced into the pilot chamber P2 functions as the pilot pressure by which the pressure regulator 500 is activated or operated. When the pilot pressure is equal to the atmospheric pressure, the spool 506 is located at a moving end position on the rear side by the elastic force of the first compression coil spring 530 that biases the spool 506 rearward. When the spool 506 is located at the moving end position, the communication hole 536 and the communication hole 538 communicate with each other via the communication portion 546 of the spool 506. That is, the communication hole 538 communicates with the reservoir 62, and the pressure of the communication hole 538 is equal to the atmospheric pressure. When the pilot pressure is increased from this condition, the spool 506 is moved forward and the communication between the communication hole 538 and the reservoir 62 is shut off when the rear end of the communication portion 546 is located forward of the opening of the communication hole 536. When the spool 506 is further moved forward by a slight distance, the front end of the communication portion 546 reaches the opening of the communication hole 542, so that the communication hole 542 and the communication hole 538 are brought into communication with each other via the communication portion 546. That is, the communication hole 538 is brought into communication with the high-pressure-source device 58, so that the pressure of the communication hole 538 is increased.

When the communication hole 542 and the communication hole 538 are brought into communication with each other, the pressure of the working fluid in the space 541 is increased via the communication hole 540 that branches off from the communication hole 538. As a result, the reaction-force plunger 508 and the reaction-force-plunger support member 510 are pushed rearward. When the force by the pressure of the space 541 exceeds the first initial biasing force $F_{SET1}$, the reaction-force plunger 508 moves rearward while compressing the first compression coil spring 530 and the second compression coil spring 532. Further, when the force by the pressure of the space 541 exceeds the second initial biasing force $F_{SET2}$, the reaction-force-plunger support member 510 moves rearward while compressing the third compression coil spring 534. Accordingly, when the reaction-force-plunger support member 510 further moves rearward, the rear end face of the reaction-force plunger 508 comes into contact with the front end face of the spool 506 and the spool 506 is pushed rearward in a state in which the reaction-force plunger 508 is held in contact with the spool 506. In consequence, the communication between the communication hole 542 and the communication hole 538 is shut off, so that the pressure of the regulated pressure stops increasing. When the pilot pressure is decreased from this condition, the movable rod 504 further moves rearward, whereby the communication hole 538 is brought into communication with the communication hole 536. That is, the communication hole 538 communicates with the reservoir 62, so that the pressure of the space 541 is decreased. Therefore, the force of the reaction-force plunger 508 and the reaction-force-plunger support member 510 for pushing the spool 506 rearward is reduced, so that the spool 506 moves forward and the pressure of the communication hole 538 stops decreasing. In view of a series of operations described above, the space 541 may be regarded as a regulated-pressure chamber in the pressure regulator 500 to which is supplied the working fluid having a pressure regulated in accordance with the pilot pressure, namely, the working fluid having the regulated pressure. The working fluid whose pressure is regulated to the regulated pressure is supplied to the master cylinder device 402.

A described above, the cross-sectional area $A_{12}$ of the front end face of the reaction-force plunger 508 is larger than the cross-sectional area $A_{13}$ of the front end face the reaction-force-plunger support member 510. Accordingly, a force $F_{R1}=P_A \times A_{12}$ that acts on the reaction-force plunger 508 by the regulated pressure $P_A$ that is a pressure of the working fluid in the communication hole 540 is larger than a force $F_{R2}=P_A \times A_{13}$ that acts on the reaction-force-plunger support member 510 by the regulated pressure $P_A$. Therefore, in relation to an increase in the regulated pressure $P_A$, the force that acts on the reaction-force plunger 508 by the regulated pressure $P_A$ becomes larger than the first initial biasing force $F_{SET1}$ before the force that acts on the reaction-force-plunger support member 510 by the regulated pressure $P_A$ becomes larger than the second initial biasing force $F_{SET2}$. Accordingly, the reaction-force plunger 508 moves rearward at timing earlier than timing at which the reaction-force-plunger support member 510 moves rearward. In other words, the reaction-force plunger 508 moves rearward in a situation in which the regulated pressure $P_A$ is lower.

Figure 19:
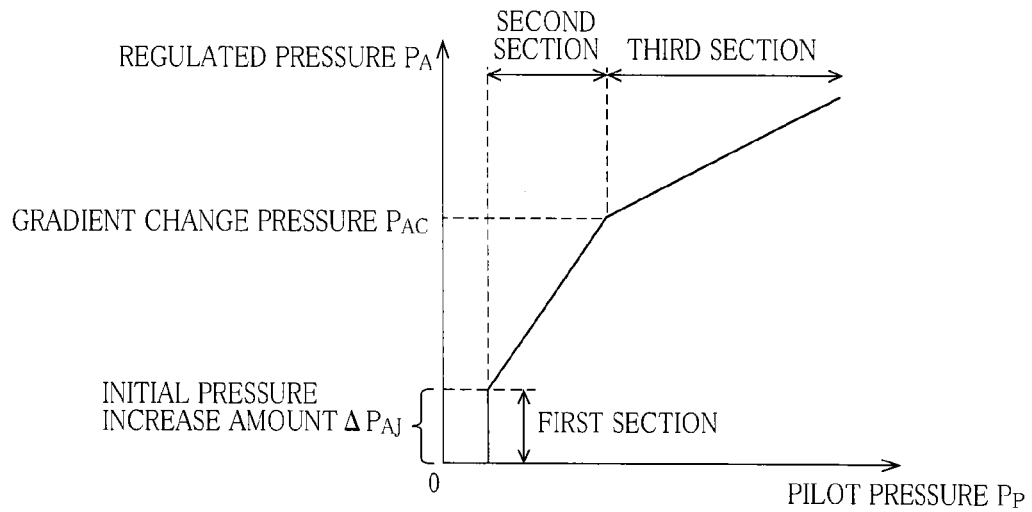
FIG. 19 is a graph showing a relationship between a pressure of a pilot chamber and a pressure of a working fluid regulated in accordance with the pressure of the pilot chamber, in the pressure regulator shown in FIG. 18.

Owing to the thus constructed pressure regulator 500, the regulated pressure $P_A$ changes, as shown in the graph of FIG. 19, with respect to a change of the pilot pressure $P_P$ that is caused by a change of the brake operation force. When the pilot pressure $P_P$ increases to a certain level by the brake operation, the movable rod 504 moves forward against friction or the like due to a sliding contact with the housing 250, so that the regulated pressure $P_A$ is increased as described above in the pressure regulator 500. Owing to the increase in the regulated pressure $P_A$, the reaction-force plunger 508 moves rearward such that the flange 528 thereof is separated away from the front end face of the second plunger 510. The reaction-force plunger 508 moves rearward by a distance corresponding to $D_{12}-D_{11}$ against the forward force $F_{SET1}$ by which the reaction-force plunger 508 is biased forward before the reaction-force plunger 508 comes into contact with and then pushes the spool 506, namely, before the regulated pressure $P_A$ stops increasing. Accordingly, at the regulated pressure $P_A$ in this situation, a relationship represented by the following equation (1) is established between the force by the regulated pressure $P_A$ that acts on the reaction-force plunger 50 and a force generated by the second compression coil spring 532:

$$P_A \times A_{12}=k \times (D_{12}-D_{11})+F_{SET1} \quad (1)$$

wherein k is a spring constant of the second compression coil spring 532. Accordingly, an initial pressure increase amount $\Delta P_{AJ}$ that is an amount of increase of the regulated pressure $P_A$ before the regulated pressure $P_A$ stops increasing is calculated according to the following equation (2):

$$\Delta P_{AJ}=\{k \times (D_{12}-D_{11})+F_{SET1}\}/A_{12} \quad (2)$$

Therefore, the magnitude of the initial pressure increase amount $\Delta P_{AJ}$ is set in dependence on the structure of the pressure regulator 500 such as the spring constant k of the second compression coil spring 532, the distance $D_{12}$ and the distance $D_{11}$, the first initial biasing force $F_{SET1}$, and the area $A_{12}$. In the pressure regulator 501, the initial pressure increase amount $\Delta P_{AJ}$ is set to be relatively large. Hence, as indicated in a first section in the graph of FIG. 19, the regulated pressure $P_A$ rapidly increases by the initial pressure increase amount $\Delta P_{AJ}$ at a certain level of the pilot pressure $P_P$.

When the pilot pressure $P_P$ is further increased, the regulated pressure $P_A$ is increased such that a relationship represented by the following expression (3) is established:

$$P_A \times A_{12}=k \times (D_{12}-D_{11})+F_{SET1}+P_P \times A_{11} \quad (3)$$

During the increase of the pilot pressure $P_P$, the spool 506 is substantially kept located at a position at which the above-indicated forward force and the force by which the spool 506 is pushed rearward, i.e., a rearward force, are balanced with each other. Accordingly, the force $k \times (D_{12}-D_{11})$ generated by the second compression coil spring 532 does not substantially change. Hence, the regulated pressure $P_A$ is increased, as shown in a second section in the graph of FIG. 19, such that the forward force that acts on the spool 506 by the pilot pressure $P_P$ and the force that acts on the spool 506 by the regulated pressure $P_A$ are balanced with each other.

As the pilot pressure $P_P$ is increased, the reaction-force-plunger support member 510 that moves rearward some time after the reaction-force plunger 508 has moved rearward comes into contact with the flange 528 of the reaction-force plunger 508. Accordingly, the spool 506 receives the force $F_{R2}$ that acts on the reaction-force-plunger support member 510 by the regulated pressure $P_A$, in addition to the force $F_{R1}$ that acts on the reaction-force plunger 508 by the regulated pressure $P_A$. Hence, as shown in FIG. 19, in a third section after the contact of reaction-force-plunger support member 510 with the flange 528 of the reaction-force plunger 508, in other words, at the regulated pressure $P_A$ equal to or higher than a gradient change pressure $P_{AC}$ that is a level of the regulated pressure $P_A$ at the time of the contact, the increase gradient of the regulated pressure is smaller than that in the second section.

The change in the increase gradient of the regulated pressure will be explained in detail. In the third section, a relationship represented by the following expression (4) is established between the force that acts on the reaction-force plunger 508 and the reaction-force-plunger support member 510 by the regulated pressure $P_A$, the force generated by the second compression coil spring 532 and the third compression coil spring 534, and the force by the pilot pressure $P_P$.

Here, the spring constant of the third compression coil spring 534 is k that is the same as the spring constant of the second compression coil spring 532.

$$P_A \times (A_{12}+A_{13}) = 2k \times (D_{12}-D_{11}) + F_{SET1} + F_{SET2} + P_P \times A_{11} \qquad (4)$$

In the third section, the area on which the regulated pressure $P_A$ acts is larger than the area $A_{12}$ in the second section by an amount corresponding to the area $A_{13}$. Further, the force $2k \times (D_{12}-D_{11})$ generated by the second compression coil spring 532 and the third compression coil spring 534 does not change because the position of the spool 506 is maintained as described above. Therefore, a ratio of an increase of the regulated pressure $P_A$ to an increase of the pilot pressure $P_P$ may be smaller in the third section than in the second section for permitting the forward force and the rearward force that act on the spool 506 to be balanced with each other. That is, the increase gradient of the regulated pressure in the second section and the increase gradient of the regulated pressure in the third section differ from each other by an amount corresponding to a difference between the area $A_{12}$ of the reaction-force plunger 508 and the area $A_{13}$ of the reaction-force-plunger support member 510.

The pressure regulator 500 that operates as described above may be considered as a pressure regulator configured to regulate the high-pressure working fluid supplied from the high-pressure-source device 58 to a pressure in accordance with the pilot pressure and to supply the pressure-regulated working fluid. Further, in the pressure regulator, the spool 506 functions as a movable member that moves in the axial direction of the housing 502. In the pressure regulator 500, the working fluid is regulated by a simple structure in which the spool 506 directly supported by the housing 502 moves in the axial direction of the housing 502, so that the frictional force caused by the movement of the spool 506 is relatively small and the operation of the pressure regulator 500 is less likely to be influenced by the frictional force. Accordingly, the pressure regulator 500 can operate in response to a slight change in the pilot pressure and can adequately follow the change in the pilot pressure.

The movable rod 504 functions as a first plunger disposed rearward of the spool 506 so as to be movable in the axial direction of the housing 502 while the reaction-force plunger 508 functions as a second plunger disposed forward of the spool 506 so as to be movable in the axial direction of the housing 502. The second compression coil spring 532 functions as a second-plunger biasing member that biases the reaction-force plunger 508 toward the front side. The reaction-force-plunger support member 510 is fitted in the reaction-force plunger 508 and functions as a second-plunger support member that movably supports the reaction-force plunger 508. The third compression coil spring 534 functions as a support-member biasing member that biases the reaction-force-plunger support member 510 toward the front side. In the pressure regulator 500, a mechanism including the spool 506 functions as a valve mechanism in which, by the movement of the spool 506, the communication between the communication hole 542 and the space 541 is shut off while the communication between the communication hole 536 and the space 541 is established and in which, by the forward movement of the movable rod 504 from the moving end position, the communication between the communication hole 542 and the space 541 is established while the communication between the communication hole 536 and the space 541 is shut off.

Further, in the pressure regulator 500, a mechanism including the first compression coil spring 530 functions as a first biasing mechanism that biases the spool 506 rearward by the elastic reaction force of the first compression coil spring 530. A mechanism including the pilot chamber P2 functions as a second biasing mechanism that biases the spool 506 forward via the movable rod 504 by the pressure of the pilot chamber P2. A mechanism including the reaction-force plunger 508 and the second compression coil spring 532 functions as a third biasing mechanism that biases the spool 506 rearward via the reaction-force plunger 508 by the pressure of the space 541 in a state in which the reaction-force plunger 508 is in contact with the spool 506, where the pressure of the space 541 exceeds a set pressure, namely, a pressure increased by the initial pressure increase amount $\Delta P_{AJ}$ calculated according to the expression (2).

The force generated toward the front side by the second compression coil spring 532 when the reaction-force plunger 508 comes into contact with the spool 506, namely, the force having a magnitude that is calculated according to the above expression (1), may be considered as a set load for setting initiation of biasing the spool 506 rearward by the reaction-force plunger 508. That is, when the magnitude of the force by the pressure of the space 541 for biasing the reaction-force plunger 508 rearward exceeds the set load, the reaction-force plunger 508 starts to bias the spool 506 rearward. Accordingly, the second compression coil spring 532 may be regarded as a set load applying member that applies the set load to the reaction-force plunger 508.

The third biasing mechanism further includes the reaction-force-plunger support member 510 and the third compression coil spring 534. The third biasing mechanism is configured such that, when the pressure of the space 541 exceeds the gradient change pressure $P_{AC}$ that is the second set pressure higher than the set pressure, the reaction-force-plunger support member 510 comes into contact with the reaction-force plunger 508 against the elastic reaction force of the third compression coil spring 534 and such that the spool 506 is biased rearward with the reaction-force-plunger support member 510 held in contact with the reaction-force plunger 508.

Further, the force generated by the second compression coil spring 532 and the third compression coil spring 534 when the pressure of the space 541 exceeds the gradient change pressure $P_{AC}$, namely, the force having a magnitude calculated by $2k \times (D_{12}-D_{11}) + F_{SET1} + F_{SET2}$ in the expression (4), may be regarded as the second set load that acts rearward on the reaction-force plunger 508. Accordingly, when the pressure of the space 541 exceeds the gradient change pressure $P_{AC}$, the reaction-force-plunger support member 510 starts to bias the spool 506 rearward. Thus, the second compression coil spring 532 and the third compression coil spring 534 may be regarded as a second set load applying member that applies the second set load to the reaction-force plunger 508.

<Operation of Vehicle Brake System>

In the present vehicle brake system, when a driver applies an operation force to the brake pedal 70 in a condition in which the brake pedal 70 is not depressed, the inter-piston chamber R15 and the opposing chamber R14 are brought into communication with each other while communication of the opposing chamber R14 with the reservoir 62 is shut off. Accordingly, the operation force by the brake operation is transmitted to the working fluid in the inter-piston chamber R15, so that the pressure of working fluid in the inter-piston chamber R15 and the opposing chamber R14 is increased. As described above, in the master cylinder device 402 of the third embodiment, the area of the rear end face of the extension portion 434 is slightly larger than the area of the front end face of the flange portion 436. Therefore, a force that moves the first pressurizing piston 414 forward by the pressure of the working fluid in the inter-piston chamber R15 is slightly larger than a force that moves the first pressurizing piston 414 rearward by the pressure of the working fluid in the opposing chamber R14. Accordingly, when the pressure of the working fluid in the inter-piston chamber R15 and the opposing chamber R14 is increased by the operation force, the first pressurizing piston 414 is slightly moved forward by the increased pressure.

In this condition, the working fluid is supplied from the pressure regulator device 404 to the input chamber R3, so that the first pressurizing piston 414 pressurizes the working fluid in the first pressurizing chamber R1 and the second pressurizing piston 416 pressurizes the working fluid in the second pressurizing chamber R2. Accordingly, the working fluid to be supplied to the brake devices 56 is pressurized in dependence on the regulated pressure, and the hydraulic brake system 400 operates in the regulated-pressure-dependent braking mode in which the hydraulic brake system 400 generates the regulated-pressure-dependent braking force having a magnitude that depends on the regulated pressure. While the first pressurizing piston 414 is slightly moved forward by the operation force as described above, the degree of pressurization of the working fluid in the first pressurizing chamber R1 by the slight forward movement of the first pressurizing piston 414 is considerably low. Therefore, the working fluid is pressurized without substantially depending on the operation force, and the regulated-pressure-dependent braking mode is effectuated without substantially generating the operation-force-dependent braking force in the hydraulic brake system 400.

The braking state of the present vehicle brake system is the regenerative-braking-force-dependent braking state before the brake devices 56 generate the braking force, namely, in the hydraulic-braking impossible situation after operation initiation, i.e., the situation before the master pressure exceeds the start pressure $P_T$ of hydraulic braking force generation. Hence, the braking force can be quickly generated utilizing the regenerative brake system at the time of initiation of the brake operation. Further, even if individual hydraulic brake systems suffer from a difference in the degree of the "play" due to variations in the "play" or due to changes of the "play" over time, the braking force can be generated at the same timing with respect to the brake operation without being influenced by the degree of the "play" in each hydraulic system, according to the present vehicle brake system.

Further, when the hydraulic brake system 400 operates in the regulated-pressure-dependent braking mode, an amount of decrease in the volume of the opposing chamber R14 by the forward movement of the first pressurizing piston 414 is substantially equal to an amount of increase in the volume of the inter-piston chamber R15 by the forward movement. Accordingly, the operation position of the brake pedal 70 does not substantially change. Further, because the opposing chamber R14 and the inter-piston chamber R15 are hermetically closed while communicating with each other, the brake pedal 70 does not move even if the brake pedal 70 is operated. Therefore, the hydraulic brake system 400 avoids a useless increase in the operation amount of the brake pedal 70, namely, avoids a phenomenon that the operation amount of the brake pedal 70 is increased even though the braking force is not generated in the hydraulic brake system 400, so as to eliminate the above-indicated "play". Thus, the operation feeling in the brake operation is improved in the present brake system.

When the master pressure exceeds the start pressure $P_T$ of hydraulic braking force generation, the communication between the inter-piston chamber R15 and the opposing chamber R14 is shut off while the opposing chamber R14 is brought into communication with the reservoir 62. Accordingly, the operation force is transmitted to the first pressurizing piston 414 via the working fluid in the inter-piston chamber R15, whereby the working fluid in the first pressurizing chamber R1 is pressurized. The first pressurizing piston 414 moves forward also in dependence on the regulated pressure, whereby the working fluid in the first pressurizing chamber R1 is pressurized. Accordingly, the working fluid to be supplied to the brake devices 56 is pressurized in dependence on the operation force and the regulated pressure. Thus, in the hydraulic-braking possible situation after operation initiation, the hydraulic brake system 400 operates in the braking mode depending on the operation force and the regulated pressure in which both of the operation-force-dependent braking force and the regulated-pressure-dependent braking force are generated. In this instance, the braking state of the present vehicle brake system becomes the braking state depending on the operation force and the regulated pressure, i.e., the state in which the vehicle is braked or stopped by the operation-force-dependent braking force and the regulated-pressure-dependent braking force.

In the hydraulic-braking possible situation after operation initiation, the regenerative braking force that has been generated immediately after initiation of the brake operation is not generated. According to the present vehicle brake system, therefore, the braking force can be generated only by the hydraulic brake system 400 in all of the wheels 18 in a situation in which the posture of the vehicle body changes due to a change in deceleration of the vehicle after initiation of the brake operation and it is accordingly estimated that the vehicle stability and maneuverability are relatively poor. Accordingly, the balance between the braking force of the drive wheels and the braking force of the non-drive wheels does not break down, thereby making it possible to prevent the vehicle stability and maneuverability from being further deteriorated.

When the situation changes from the hydraulic-braking possible situation after operation initiation to the operation-amount constant situation, the hydraulic brake system 400 operates in the regulated-pressure-dependent braking mode in which the hydraulic brake system 400 generates the regulated-pressure-dependent braking force. Further, the regenerative brake system generates the regenerative braking force. Accordingly, the braking state of the vehicle brake system becomes the braking state depending on the regulated pressure and the regenerative braking force. To be more specific, the regulated-pressure-dependent braking force and the regenerative braking force are generated in the wheels 18RL, 18RR that are drive wheels while the regulated-pressure-dependent braking force is generated in the wheels 18FL, 18FR that are non-drive wheels. As a result, the balance between the braking force of the drive wheels and the braking force of the non-drive wheels breaks down. However, the balance breaks down in a situation in which the brake operation amount is constant, namely, in a situation in which the posture of the vehicle body is relatively stable and the vehicle stability and maneuverability are relatively good. Hence, the vehicle stability and maneuverability are kept relatively good without being deteriorated.

When the situation changes from the operation-amount constant situation to the operation-amount re-changed situation, the communication between the inter-piston chamber R15 and the opposing chamber R14 is shut off while the opposing chamber R14 is brought into communication with the reservoir 62. Accordingly, the hydraulic brake system 400 operates in the braking mode depending on the operation force and the regulated pressure. Further, the regenerative brake system continues to generate the regenerative braking force. Accordingly, the braking state of the vehicle brake system becomes the braking state depending on the operation force, the regulated pressure, and the regenerative braking force. Thus, in the present vehicle brake system, it is possible to brake or stop the vehicle making the most of the hydraulic brake system 400 and the regenerative brake system, so that a relatively large braking force can be generated.

Thus, in the present vehicle brake system, the hydraulic brake system and the regenerative brake system are appropriately utilized by switching the braking state in accordance with the brake operation, whereby the vehicle can be braked or stopped while sufficiently regenerating electricity. In either of the situations described above, the regenerative braking force stops being generated when the speed of the vehicle becomes equal to or lower than a set speed by the brake operation.

The pressure regulator device 404 operates depending upon the situations described above so as to switch between: a state in which the pressure regulator 500 regulates the pressure of the working fluid supplied from the high-pressure-source device 58; and a state in which the pressure-increase linear valve 102 and the pressure-decrease linear valve 104 regulate the pressure of the working fluid supplied from the high-pressure-source device 58. To be more specific, in the hydraulic-braking impossible situation after operation initiation and the hydraulic-braking possible situation after operation initiation, the pressure regulator device 404 regulates the pressure of the working fluid supplied from the high-pressure-source device 58 by the pressure regulator 500 and supplies the pressure-regulated working fluid to the master cylinder device 402. On the other hand, in the operation-amount constant situation and the operation-amount re-changed situation, the pressure regulator device 404 regulates the pressure of the working fluid from the high-pressure-source device 58 by the pressure-increase linear valve 102 and the pressure-decrease linear valve 104 and supplies the pressure-regulated working fluid to the master cylinder device 402. In a case where electricity supplied to the vehicle brake system is cut off due to some failures, the pressure regulator 500 regulates the pressure of the working fluid and supplies the pressure-regulated working fluid to the master cylinder device 402. Thus, the hydraulic brake system 400 can operate in the braking mode depending on the operation force and the regulated pressure. Accordingly, the present vehicle brake system is excellent in terms of failsafe.

<Control for Vehicle Brake System>

As in the brake system of the first embodiment, the brake control program represented by the flow chart of FIG. 7 is repeatedly executed in the brake system of the third embodiment. In other words, there are executed the braking-state judging sub routine represented by the flow chart of FIG. 8, the braking-mode switching sub routine represented by the flow chart of FIG. 9, the pressure-regulating-mode switching sub routine represented by the flow chart of FIG. 10, and the braking-force control sub routine represented by the flow chart of FIG. 11. Accordingly, the brake ECU 38 may be regarded to have the braking-control executing portion 304 shown in FIG. 12 and some functional portions.

4. Fourth Embodiment

Figure 20:
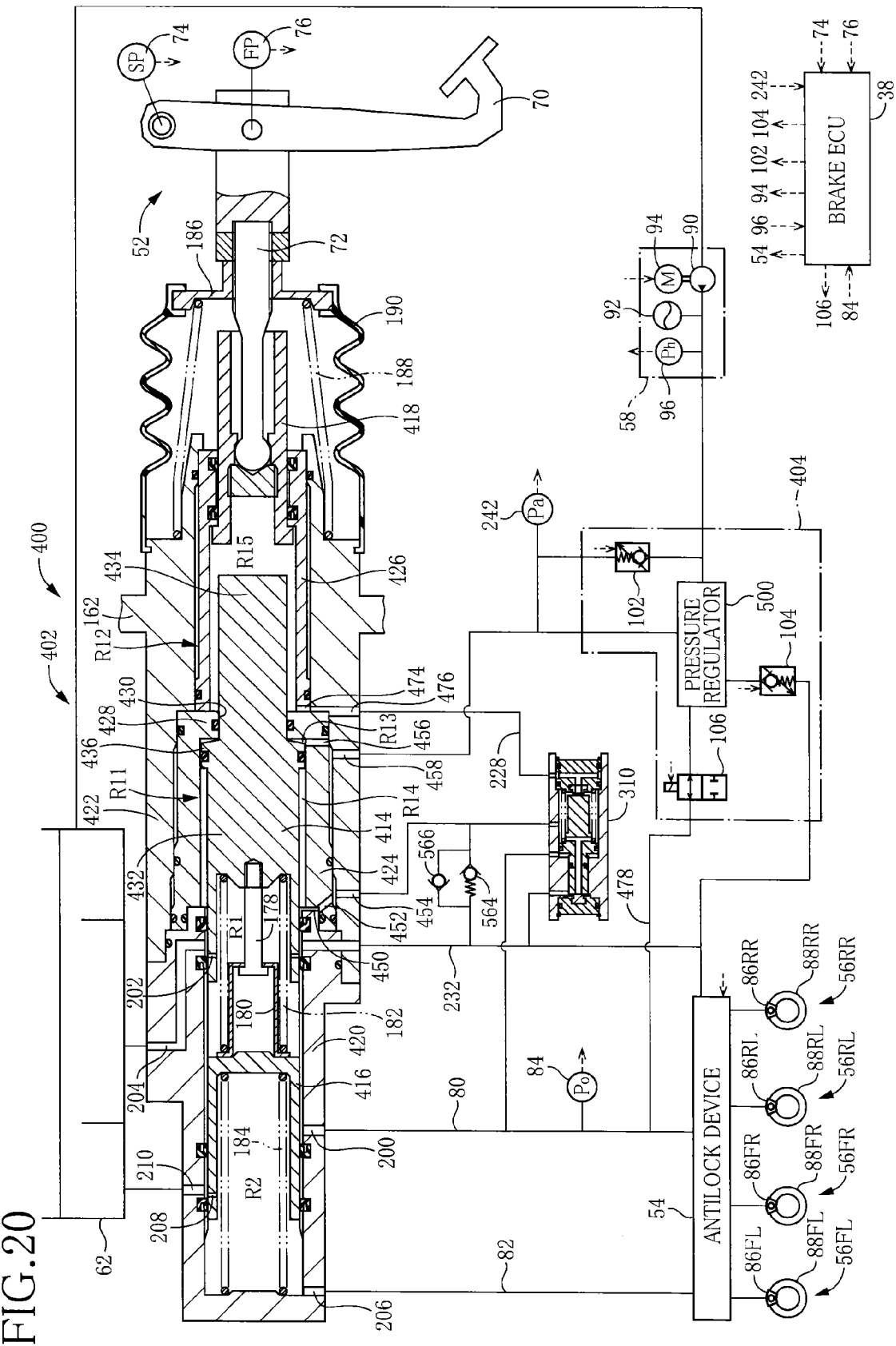
FIG. 20 is a view showing a hydraulic brake system for a vehicle brake system according to a fourth embodiment.
Figure 21:
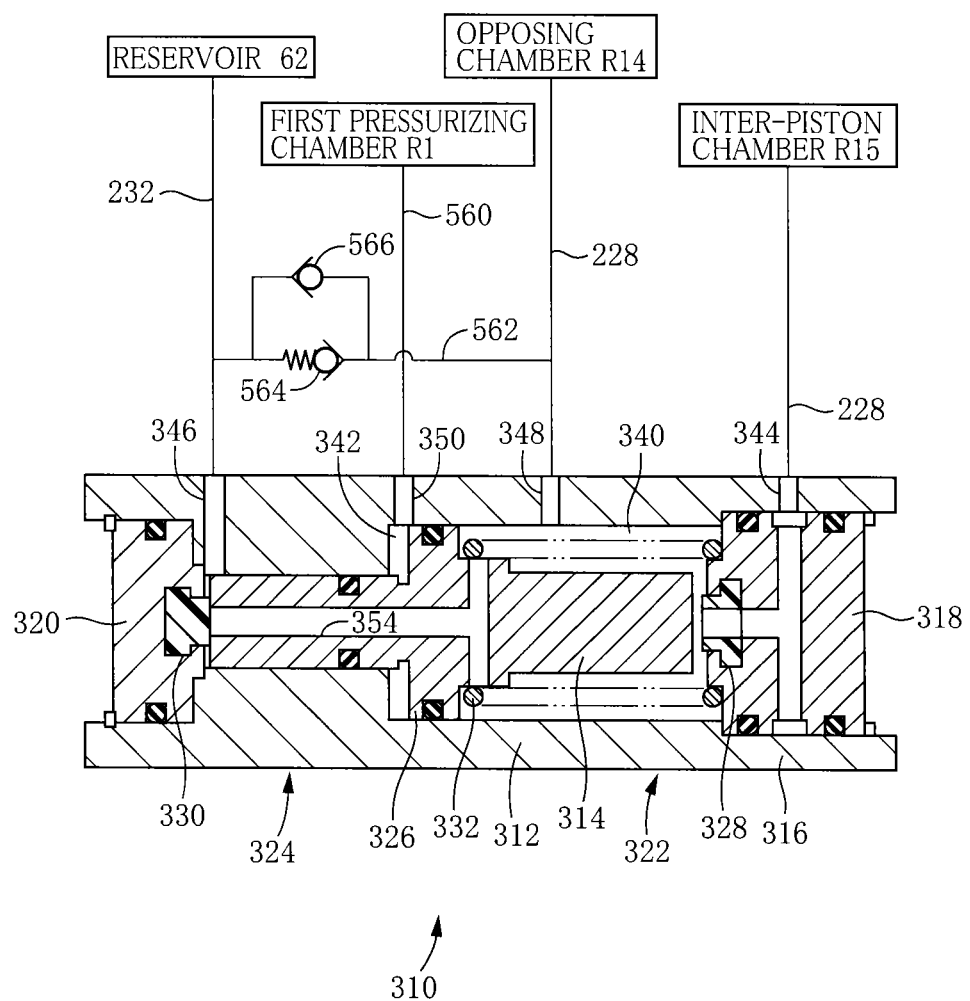
FIG. 21 is a schematic view showing a braking-mode switching mechanism in the fourth embodiment.

In the hydraulic brake system 400 of the vehicle brake system according to a fourth embodiment, a mechanical valve device 310 is provided in place of the communication open/close valve 230 and the low-pressure release valve 234 of the hydraulic brake system 400 of the third embodiment, as shown in FIG. 20. In the valve device 310 of this fourth embodiment, there is connected, to the communication hole 350, a communication passage 560 that branches off from the fluid passage 80 that communicates with the first pressurizing chamber R1, as shown in FIG. 21. Accordingly, the working fluid having the master pressure is supplied to the second fluid chamber 342. In the present vehicle brake system, a communication passage 562 is provided between: a position in the inter-chamber communication passage 228 that is between the communication hole 348 and the opposing chamber R14; and the low-pressure release passage 232. In the communication passage 562, there are provided a relief valve 564 that permits an outflow of the working fluid from the opposing chamber R14 to the reservoir 62 when a certain pressure difference occurs; and a check valve 566 that prevents the opposing chamber R14 from being placed in a negative-pressure state.

The valve device 310 operates utilizing the master pressure as the pilot pressure. Accordingly, when the brake operation is not being performed, namely, when the master pressure is equal to 0, the inter-piston chamber R15 and the opposing chamber R14 communicate with each other while communication of the opposing chamber R14 with the reservoir 62 is shut off. When the brake operation is initiated in this condition, the hydraulic brake system 400 operates in the regulated-pressure-dependent braking mode in which the hydraulic brake system 400 generates the regulated-pressure-dependent braking force whose magnitude depends on the regulated pressure. When the brake operation is initiated and the pressure of the opposing chamber R4 and the inter-piston chamber R5 is accordingly increased by the operation force, the relief valve 564 is opened so as to permit a forward movement of the first pressurizing piston 414 and the working fluid is supplied from the pressure regulator device 404 to the input chamber R3, so that the first pressurizing piston 414 moves forward. When the working fluid in the first pressurizing chamber R1 is pressurized by the forward movement of the first pressurizing piston 414, the pressure equal to the master pressure acts on the flange 326, whereby the valve piston 314 is moved rearward. As a result, the communication between the inter-piston chamber R15 and the opposing chamber R14 is shut off, and the hydraulic brake system 400 operates in the braking mode depending on the operation force and the regulated pressure in which the hydraulic brake system 400 generates both of the operation-force-dependent braking force and the regulated-pressure-dependent braking force. Thus, the valve device 310 functions as a braking-mode switching mechanism that selectively effectuates one of the regulated-pressure-dependent braking mode and the braking mode depending on the operation force and the regulated pressure. In the vehicle brake system according to the present embodiment, therefore, the braking mode of the hydraulic brake system 400 can be switched by a relatively inexpensive mechanical valve mechanism.

In the master cylinder device 402, the force for moving the first pressurizing piston 414 forward by the pressure of the working fluid in the inter-piston chamber R15 is slightly larger than the force for moving the first pressurizing piston 414 rearward by the pressure of the working fluid in the opposing chamber R14. Therefore, even in the regulated-pressure-dependent braking mode, the first pressurizing piston 414 is slightly moved forward by the operation force, and the working fluid in the first pressurizing chamber R1 is slightly pressurized by the slight forward movement of the first pressurizing piston 414. Accordingly, the first pressurizing piston 414 can be moved forward by the operation force, and the valve piston 314 can be moved toward the one-end side utilizing an increase in the master pressure caused by the forward movement of the first pressurizing piston 414. Thus, the hydraulic brake system 400 is capable of switching the braking mode without utilizing pressure regulation by the pressure regulator device 404. When the braking mode is thus switched, the hydraulic brake system 400 is relatively simple in construction.

Accordingly, the present vehicle brake system is configured such that the brake pedal 70 cannot be moved forward by the operation force in the regulated-pressure-dependent braking mode. Therefore, the hydraulic brake system 400 avoids a useless increase in the operation amount of the brake pedal 70, namely, avoids a phenomenon that the operation amount of the brake pedal 70 is increased even though the braking force is not generated in the brake devices 56, so as to eliminate the above-indicated "play". Thus, the operation feeling in the brake operation is improved in the present brake system. In the vehicle brake system having the valve device 310, the hydraulic brake system 400 keeps operating in the braking mode depending on the operation force and the regulated pressure even in the operation-amount constant situation and the operation-amount re-changed situation. Accordingly, the vehicle brake system is placed in the braking state depending on the operation force, the regulated pressure, and the regenerative braking force, in the operation-amount constant situation and the operation-amount re-changed situation. Hence, the braking-state judging sub routine in the brake control program is executed according to the flow chart shown in FIG. 15.

MODIFIED EXAMPLE 2

A vehicle brake system according to this modified example 2 is roughly identical in construction with the vehicle brake system of the fourth embodiment. The vehicle brake system of this modified example 2 will be explained mainly in terms of a structure and an operation different from those of the vehicle brake system of the fourth embodiment in the interest of brevity.

Figure 22:
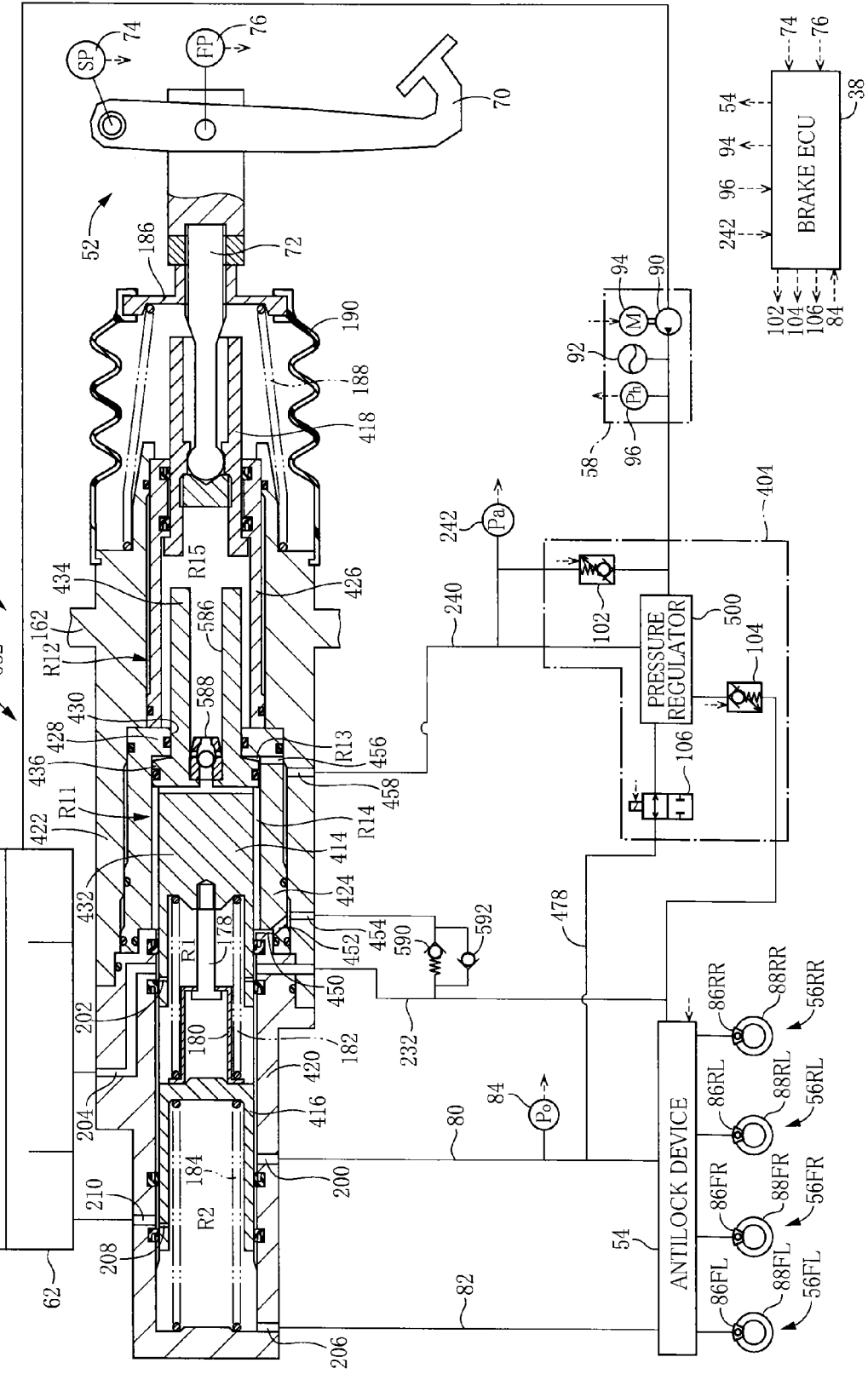
FIG. 22 is a schematic view showing a master cylinder device in a modified example of the fourth embodiment.

FIG. 22 shows a hydraulic brake system 580 of the vehicle brake system according to this modified example 2. The hydraulic brake system 580 includes a master cylinder device 582. The master cylinder device 582 is roughly identical in construction with the master cylinder device 402 of the fourth embodiment. The master cylinder device 582 has a first pressurizing piston 584, and an internal communication passage 586 through which the opposing chamber R14 and the inter-piston chamber R15 communicate with each other is formed in the first pressurizing piston 584. A check valve 588 is provided at a certain position in the internal communication passage 586. The check valve 588 is an ordinary one provided with a valve ball. The check valve 588 permits a flow of the working fluid from the opposing chamber R14 to the inter-piston chamber R15 while prohibits a flow of the working fluid from the inter-piston chamber R15 to the opposing chamber R14. That is, in the hydraulic brake system 580, the check valve 588 functions as an inter-chamber-communication switching mechanism that switches between: communication of the inter-piston chamber R15 and the opposing chamber R14; and shutting off of the communication therebetween.

Outside the master cylinder device 582, a relief valve 590 and a check valve 592 are provided in the low-pressure release passage 232. The relief valve 590 brings the opposing chamber R14 into communication with the reservoir 62 where the pressure of the opposing chamber R14 is equal to or higher than a predetermined pressure. The check valve 592 prevents the opposing chamber R14 from being placed in a negative-pressure state.

When the brake operation is initiated in the thus constructed hydraulic brake system 580, the working fluid is supplied from the pressure regulator device 404 to the input chamber R13 and the first pressurizing piston 584 moves forward, whereby the working fluid in the opposing chamber R14 flows into the inter-piston chamber R15 via the internal communication passage 586. Accordingly, the hydraulic brake system 580 operates in the regulated-pressure-dependent braking mode in which the hydraulic brake system 580 generates the regulated-pressure-dependent braking force whose magnitude depends on the regulated pressure. Thus, the braking state of the present vehicle brake system becomes the regenerative-braking-force-dependent braking state, in the hydraulic-braking impossible situation after operation initiation, i.e., the situation before the hydraulic brake system 580 becomes capable of generating the braking force after initiation of the brake operation.

When the working fluid in the pressurizing chambers R1, R2 is pressurized and the brake devices 56 accordingly become capable of generating the braking force, namely, when the regulated pressure exceeds the set pressure that is equal to a pressure increased by the initial pressure increase amount $\Delta P_{AJ}$, the relief valve 590 is opened by the pressure of the opposing chamber R14 at that time. As a result, the pressure of the opposing chamber R14 becomes lower than the pressure of the inter-piston chamber R15, so that the check valve 588 is closed and the working fluid in the opposing chamber R14 cannot flow into the inter-piston chamber R15. That is, the communication between the inter-piston chamber R15 and the opposing chamber R14 is shut off while the opposing chamber R14 is brought into communication with the reservoir 62 via the relief valve 590. Accordingly, the hydraulic brake system 580 operates in the braking mode depending on the operation force and the regulated pressure in which the hydraulic brake system 580 generates both of the operation-force-dependent braking force and the regulated-pressure-dependent braking force. Thus, the braking state of the present vehicle brake system becomes the braking state depending on the operation force and the regulated pressure, in the hydraulic-braking possible situation after operation initiation, i.e., the situation in which the hydraulic brake system 40 is capable of generating the braking force after initiation of the brake operation.

Thus, the check valve 588 functions as an inter-chamber-communication shutoff valve that shuts off the communication between the inter-piston chamber R15 and the opposing chamber R14 after the brake operation is initiated and the hydraulic brake system 580 becomes capable of generating the braking force. The relief valve 590 functions as a low-pressure-source communication valve configured to shut off the communication between the opposing chamber R14 and the reservoir 62 when the brake operation is not being performed and to establish the communication therebetween after the brake operation is initiated and the hydraulic brake system 580 becomes capable of generating the braking force. Further, the check valve 588 and the relief valve 590 function as a braking-mode switching mechanism that selectively effectuates one of the regulated-pressure-dependent braking mode; and the braking mode depending on the operation force and the regulated pressure. As described above, the check valve 588 is disposed in the first pressurizing piston 584, so that the present vehicle brake system is made relatively compact.

According to the present vehicle brake system, the brake pedal 70 cannot be moved forward by the operation force in the regulated-pressure-dependent braking mode. Therefore, the hydraulic brake system 580 avoids a useless increase in the operation amount of the brake pedal 70, namely, avoids a phenomenon that the operation amount of the brake pedal 70 is increased even though the braking force is not generated in the brake devices 56, so as to eliminate the above-indicated "play". Thus, the operation feeling in the brake operation is improved in the present brake system. The hydraulic brake system 580 provided with the check valve 588 and the relief valve 590 keeps operating in the braking mode depending on the operation force and the regulated pressure even in the operation-amount constant situation and the operation-amount re-changed situation. Accordingly, the braking state of the present vehicle brake system becomes the braking state depending on the operation force, the regulated pressure, and the regenerative braking force, in the operation-amount constant situation and the operation-amount re-changed situation.

5. Fifth Embodiment

Figure 23:
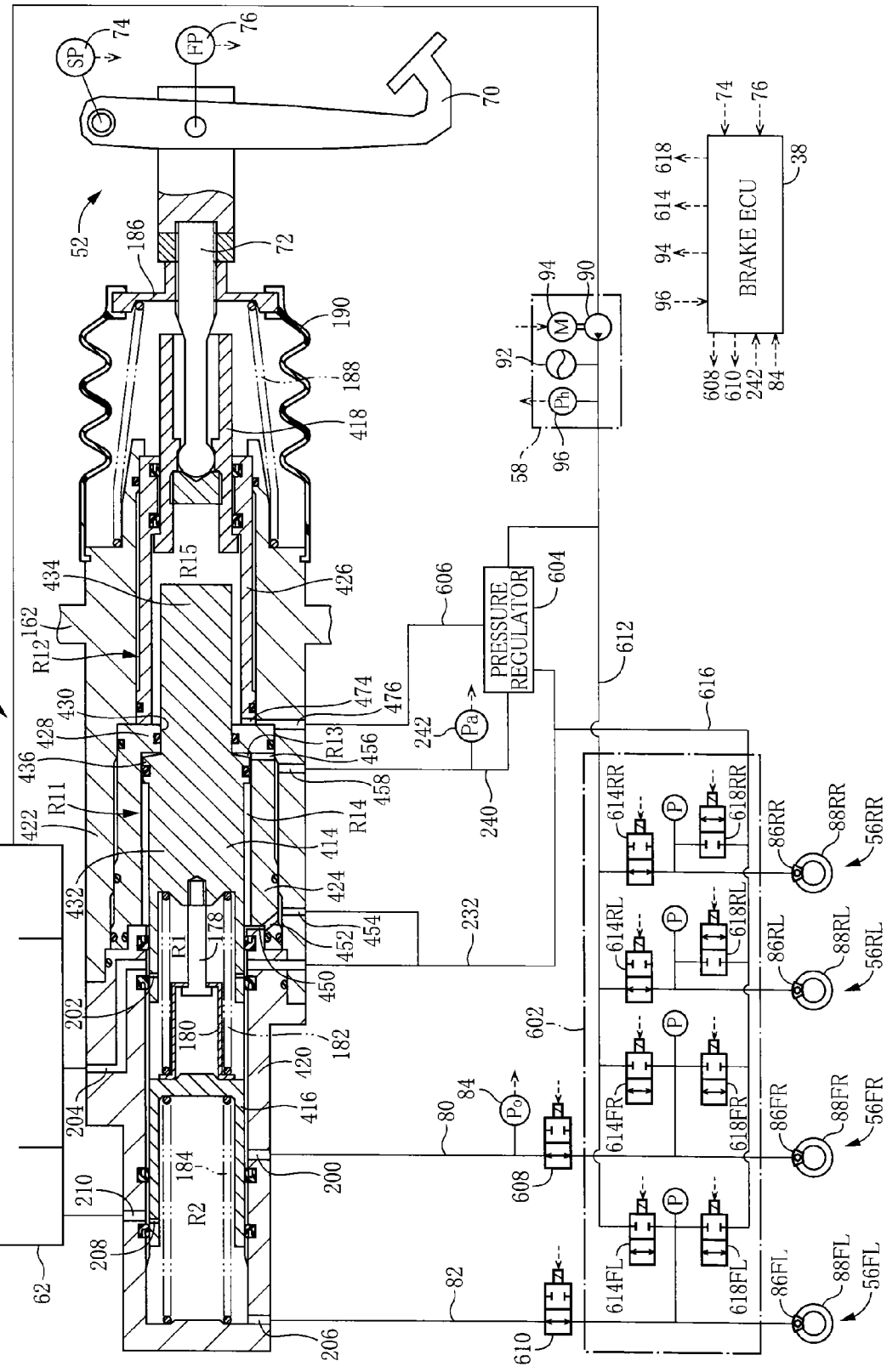
FIG. 23 is a view showing a hydraulic brake system for a vehicle brake system according to a fifth embodiment.

FIG. 23 shows a hydraulic brake system 600 provided in a vehicle brake system according to a fifth embodiment. The hydraulic brake system 600 has the master cylinder device 402 of the third embodiment, an antilock device 602, and a pressure regulator 604 and is roughly identical in construction with the hydraulic brake system 400 of the third embodiment. The hydraulic brake system 600 of this fifth embodiment will be explained in terms of a structure and an operation different from those of the hydraulic brake system 400 of the third embodiment, and explanation of the same structure and operation as the hydraulic brake system 400 of the third embodiment are omitted, in the interest of brevity.

<Structure of Hydraulic Brake System>

In the hydraulic brake system 600, the inter-chamber communication passage 228 and the communication open/close valve 230 are not provided, and the inter-piston chamber R15 is kept hermetically closed after the brake operation is initiated. Accordingly, the working fluid in the pressurizing chambers R1, R2 is always pressurized in dependence on both of the operation force and the regulated pressure. The opposing chamber R14 communicates with the reservoir 62 via the low-pressure release passage 232. The low-pressure release valve 234 is not provided in the low-pressure release passage 232, and the opposing chamber R14 is always subjected to the atmospheric pressure. To the connection port of the communication hole 476, there is connected the other end of a pilot-pressure supply passage 606 whose one end is connected to the pressure regulator 604, and the working fluid whose pressure is equal to the pressure of the inter-piston chamber R15 is supplied to the pressure regulator 604. As later explained in detail, the pressure regulator 604 functions as a pressure regulator device configured to operate utilizing the pressure of the working fluid in the inter-piston chamber R15 as the pilot pressure and configured to regulate the working fluid whose pressure is highly pressurized by the high-pressure-source device 58 and to supply the pressure-regulated working fluid.

In the hydraulic brake system 600, the fluid passages 80, 82 connected to the master cylinder device 402 are connected to the brake device 56FL for the front left wheel and the brake device 56FR for the front right wheel, respectively, via the antilock device 602. At a certain position in the fluid passage 80, a master-cut valve 608 is provided to supply the working fluid from the master cylinder device 402 to the brake device 56FL and to cut off the supply of the working fluid. Similarly, at a certain position in the fluid passage 82, a master-cut valve 610 is provided to supply the working fluid form the master cylinder device 402 to the brake device 56FR and to cut off the supply of the working fluid. The master-cut valves 608, 610 are normally open electromagnetic open-close valves and are connected to the brake ECU 38.

A pressure-increase communication passage 612 branches off from the high-pressure communication passage 302 that permits communication between the high-pressure-source device 58 and the pressure regulator 604. The pressure-increase communication passage 612 is connected to the brake devices 56 via the antilock device 602. The pressure-increase communication passage 612 branches into four passages in the antilock device 602. Each of the four passages that branch off from the pressure-increase communication passage 612 is connected to a corresponding one of the brake devices 56 provided for the respective four wheels via a corresponding one of four pressure-increase open/close valves 614. There is also connected, to the antilock device 602, a pressure-decrease communication passage 616 that communicates with the reservoir 62 via the low-pressure release passage 232. The pressure-decrease communication passage 616 also branches into four passages in the antilock device 602. Each of the four passages that branch off from the pressure-decrease communication passage 616 is connected to a corresponding one of the four brake devices 56 via a corresponding one of four pressure-decrease open/close valves 618. Two of the four pressure-increase open/close valves 614 for the rear wheels, i.e., pressure-increase open/close valves 614RL, 614RR, are electromagnetic open-close valves configured to be opened in a non-energized state and to be closed in an energized state. Other two of the four pressure-increase open/close valves 614 for the front wheels, i.e., pressure-increase open/close valves 614FL, 614FR, and the four pressure-decrease open/close valves 618 are electromagnetic open-close valves configured to be closed in a non-energized state and to be opened in an energized state. The four pressure-increase open/close valves 614 and the four pressure-decrease open/close valves 618 are connected to the brake ECU 38.

In the thus constructed antilock device 602, when the four pressure-increase open/close valves 614 are opened and the four pressure-decrease open/close valves 618 are closed, the working fluid is supplied from the high-pressure-source device 58 to the brake devices 56 and the pressure of the working fluid supplied to the brake devices 56 is increased. On the other hand, when the four pressure-increase open/close valves 614 are closed and the four pressure-decrease open/close valves 618 are opened, the brake devices 56 are brought into communication with the reservoir 62 and the pressure of the working fluid supplied to the brake devices 56 is decreased. That is, the antilock device 602 may be regarded as a pressure regulator device provided separately from the pressure regulator 604 and configured to regulate the pressure of the working fluid that is highly pressurized by the high-pressure-source device 58 and to supply the pressure-regulated working fluid to the brake devices 56.

<Structure of Pressure Regulator>

Figure 24:
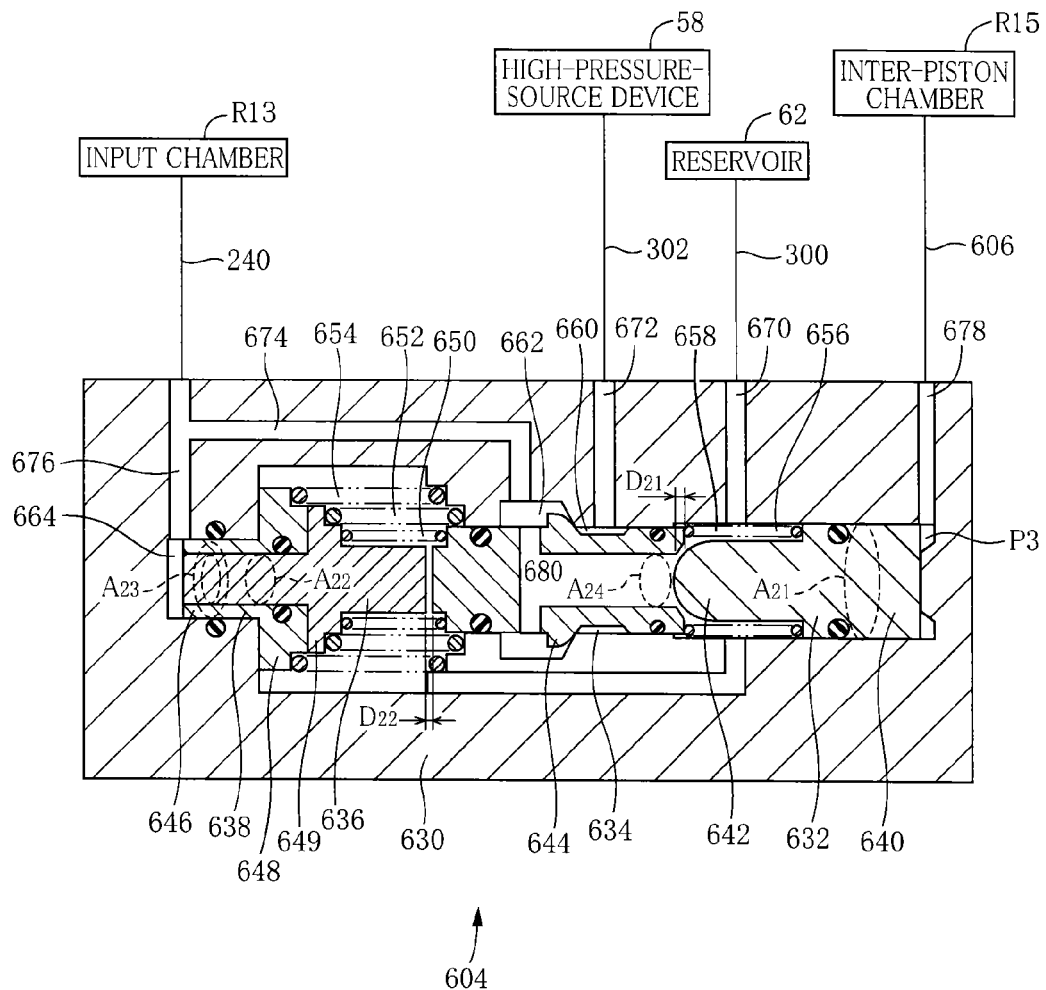
FIG. 24 is a view showing a pressure regulator of the hydraulic brake system shown in FIG. 23.

There will be explained below in detail a structure the pressure regulator 604 with reference to FIG. 24. In the following explanation, terms such as "frontward" (forward)" and "rearward" are used to indicate the leftward direction and the rightward direction, respectively, in FIG. 24.

The pressure regulator 604 includes: a cylindrical housing 630 whose opposite ends are closed; a movable rod 632 disposed in the housing 630; a valve piston 634 disposed forward of the movable rod 632; a reaction-force plunger 636 disposed forward of the valve piston 634; and a reaction-force-plunger support member 638 fitted on the reaction-force plunger 636.

One of opposite end sides of the housing 630 that is on the rear side is defined as a first-end side while the other of the opposite end sides that is on the front side is defined as a second-end side. The housing 630 is sectioned roughly into a plurality of inner-diameter portions having mutually different inner diameters. The movable rod 632 is disposed so as to be in sliding contact with an inner circumferential surface of one of the inner-diameter portions located on the rear side. The movable rod 632 has a proximal portion 640 located on the rear side and a valve body portion 642 that extends forward from the proximal portion 640. The distal end of the valve body portion 642 has a hemispherical shape.

The valve piston 634 has a cylindrical shape having a flange 644 formed on its outer circumference at its middle portion in the front-rear direction. The valve piston 634 is restricted from moving rearward by contact of a rear-side surface of the flange 644 with a stepped surface formed on the inner circumferential surface of the housing 630. The reaction-force-plunger support member 638 has a cylindrical shape and has, on the front side, a small-diameter portion 646 having a small outer diameter and, on the rear side, a large-diameter portion 648 having a large outer diameter. The reaction-force-plunger support member 638 is configured such that the small-diameter portion 646 is fitted in the inner-diameter portion of the housing 630 located at its front portion and such that a stepped surface formed between the small-diameter portion 646 and the large-diameter portion 648 can contact a stepped surface of the housing 630 located on the front side. The reaction-force plunger 636 has a columnar shape having a flange 649 formed on its outer circumference. The reaction-force plunger 636 is fitted in the reaction-force-plunger support member 638 from the rear side, such that the reaction-force-plunger support member 638 contacts, from the front side, a stepped surface defined by the flange 649.

In the housing 630, a plurality of compression coil springs are disposed. More specifically, a first compression coil spring 650 is disposed between the valve piston 634 and the reaction-force plunger 636 for biasing the valve piston 634 and the reaction-force plunger 636 so as to be separated away from each other. A second compression coil spring 652 is dispose between the housing 630 and the reaction-force plunger 636 for biasing the housing 630 and the reaction-force plunger 636 so as to be separated away from each other. A third compression coil spring 654 is disposed between the housing 630 and the reaction-force-plunger support member 638 for biasing the housing 630 and the reaction-force-plunger support member 638 so as to be separated away from each other. A fourth compression coil spring 656 is disposed between the movable rod 632 and the valve piston 634 for biasing the movable rod 632 and the valve piston 634 so as to be separated away from each other. Thus, the valve piston 634 is biased rearward by an elastic force of the first compression coil spring 650, and the movable rod 632 is biased rearward by an elastic force of the fourth compression coil spring 656, in addition to the elastic force of the first compression coil spring 650. Further, the reaction-force plunger 636 is biased forward by an elastic force of the second compression coil spring 652, and the reaction-force-plunger support member 638 is biased forward by elastic forces of the second compression coil spring 652 and the third compression coil spring 654.

The first compression coil spring 650 and the fourth compression coil spring 656 have respective spring constants that are relatively small. The second compression coil spring 652 has the same spring constant as the third compression coil spring 654. The reaction-force plunger 636 and the reaction-force-plunger support member 638 are biased forward also by the elastic force of the first compression coil spring 650. However, because the elastic force of the first compression coil spring 650 is considerably smaller than those of the second compression coil spring 652 and the third compression coil spring 654, the elastic force of the first compression coil spring 650 is ignored here. In a state shown in FIG. 24, the second compression coil spring 652 is compressed, and the reaction-force plunger 636 is biased in advance by a forward force $F_{SET11}$ (hereinafter referred to as "first initial biasing force $F_{SET11}$ where appropriate). Further, the third compression coil spring 654 is also compressed in the state of FIG. 24, and the reaction-force-plunger support member 638 is biased in advance by a forward force $F_{SET12}$ (hereinafter referred to as "second initial biasing force $F_{SET12}$ where appropriate).

In the thus constructed pressure regulator 604, a plurality of fluid chambers are formed. There is defined, between a rear end face of the movable rod 632 and the housing 630, a pilot chamber P3 that stores the working fluid having the pilot pressure for activating the pressure regulator 604, as explained later. An atmospheric-pressure chamber 658 is defined between: an outer circumferential surface of the valve body portion 642 of the movable rod 632; and the inner circumferential surface of the housing 630. A high-pressure chamber 660 is defined between: the outer circumferential surface of the valve piston 634 at a position located rearward of the flange 644 of the valve piston 634; and the inner circumferential surface of the housing 630. A regulated-pressure chamber 662 is defined between: the outer circumferential surface of the valve piston 634 at a position located forward of the flange 644; and the inner circumferential surface of the housing 630. Further, a space 664 is defined between: the front end faces of the reaction-force plunger 636 and the reaction-force-plunger support member 638; and the housing 630.

In the housing 630, a plurality of communication holes are formed. More specifically, a communication hole 670 is formed whose one end is open to the atmospheric-pressure chamber 658 while the other end functions as a connection port so as to be open to the exterior. A communication hole 672 is formed whose one end is open to the high-pressure chamber 660 while the other end functions as a connection port so as to be open to the exterior. A communication hole 674 is formed whose one end is open to the regulated-pressure chamber 662 while the other end functions as a connection port so as to be open to the exterior. A communication hole 676 branches off from the communication hole 674 in the housing 630 and is open to the space 664. In the housing 630, a communication hole 678 is formed whose one end is open to the pilot chamber P3 while the other end functions as a connection port so as to be open to the exterior. In the valve piston 634, a regulated-pressure passage 680 is formed whose one end is open to the atmospheric-pressure chamber 658 while the other end is open to the regulated-pressure chamber 662, for allowing the atmospheric-pressure chamber 658 and the regulated-pressure chamber 662 to communicate with each other. The distal end of the valve body portion 642 of the movable rod 632 can be seated on the one end of the regulated-pressure passage 680 that is open to the atmospheric-pressure chamber 658. When the distal end of the valve body portion 642 of the movable rod 632 is seated on the one end of the regulated-pressure passage 680, the communication between the atmospheric-pressure chamber 658 and the regulated-pressure chamber 662 by the regulated-pressure passage 680 is shut off.

In the thus constructed pressure regulator 604, the low-pressure communication passage 300 that communicates with the reservoir 62 is connected to the connection port of the communication hole 670, and the high-pressure communication passage 302 that communicates with the high-pressure-source device 58 is connected to the connection port of the communication hole 672. Accordingly, in the pressure regulator 604, the communication hole 670 functions as a low-pressure passage through which the working fluid is discharged to the reservoir 62, and the communication hole 672 functions as a high-pressure passage through which the working fluid supplied from the high-pressure-source device 58 is introduced. The regulated-pressure supply passage 240 is connected to the connection port of the communication hole 674, and the working fluid whose pressure has been regulated by the pressure regulator 604 is supplied to the input chamber R13 of the master cylinder device 402 via the regulated-pressure supply passage 240, as later explained. There is connected, to the connection port of the communication hole 678, the other end of the pilot-pressure supply passage 606 that communicates with the inter-piston chamber R15. Accordingly, the pressure of the pilot chamber P3 is equal to the pressure of the inter-piston chamber R15.

In the pressure regulator 604, an area of the rear end face of the movable rod 632 is $A_{21}$. The front end face of the reaction-force plunger 636 has a cross-sectional area $A_{22}$, and the front end face of the reaction-force-plunger support member 638 has a cross-sectional area $A_{23}$. Here, the cross-sectional area $A_{22}$ of the front end face of the reaction-force plunger 636 is larger than the cross-sectional area $A_{23}$ of the front end face of the reaction-force-plunger support member 638. An area of a distal end of the movable rod 632 on which the pressure of the working fluid in the regulated-pressure passage 680 acts is $A_{24}$. In the state shown in FIG. 24, a distance between the movable rod 632 and the opening of the regulated-pressure passage 680 is $D_{21}$, and a distance between the front end face of the movable rod 632 and the rear end face of the reaction-force plunger 636 is $D_{22}$.

<Operation of Pressure Regulator>

In the thus constructed pressure regulator 604, the movable rod 632 moves forward by the pressure of the pilot chamber P3 that acts thereon, and the movable rod 632 comes into contact with the valve piston 634, whereby the valve piston 634 is moved forward. That is, in the pressure regulator 604, the pressure of the working fluid introduced into the pilot chamber P3 functions as the pilot pressure by which the pressure regulator 604 is activated or operated. When the pilot pressure is equal to the atmospheric pressure, the valve piston 634 is located at a moving end position on the rear side by the elastic force of the first compression coil spring 650 that biases the valve piston 634 rearward. The movable rod 632 is also located on the rear side by the elastic force of the fourth compression coil spring 656. Accordingly, the distal end of the valve body portion 642 of the movable rod 632 is spaced apart from an end of the regulated-pressure passage 680 in the valve piston 634, the end being open to the atmospheric-pressure chamber 658, whereby the atmospheric-pressure chamber 658 and the regulated-pressure chamber 662 are in communication with each other. That is, the regulated-pressure chamber 662 communicates with the reservoir 62, so that the pressure of the regulated-pressure chamber 662 is equal to the atmospheric pressure. When the pilot pressure is increased from this condition, the movable rod 632 moves forward by a distance $D_{21}$, so that the distal end of the valve body portion 642 is seated on the end of the regulated-pressure passage 680 that is open to the atmospheric-pressure chamber 658, and the communication between the atmospheric-pressure chamber 658 and the regulated-pressure chamber 662 is shut off. When the movable rod 632 is further moved forward by a slight distance, the valve piston 634 is moved forward, so that the flange 644 is separated away from the stepped surface of the housing 630. As a result, the high-pressure chamber 660 is brought into communication with the regulated-pressure chamber 662, and the pressure of the regulated-pressure chamber 662 is increased.

When the pressure of the regulated-pressure chamber 662 is increased as a result of the communication between the high-pressure chamber 660 and the regulated-pressure chamber 662, the pressure of the space 664 is also increased via the communication holes 674, 676. Accordingly, the reaction-force plunger 636 and the reaction-force-plunger support member 638 are pushed rearward. When the force by the pressure of the space 664 exceeds the first initial biasing force $F_{SET11}$, the reaction-force plunger 636 moves rearward while compressing the first compression coil spring 650 and the second compression coil spring 652. Further, when the force by the pressure of the space 664 exceeds the second initial biasing force $F_{SET12}$, the reaction-force-plunger support member 638 moves rearward while compressing the third compression coil spring 654. Accordingly, when the reaction-force-plunger support member 638 further moves rearward and the reaction-force plunger 636 accordingly moves rearward by a distance $D_{22}$, the rear end face of the reaction-force plunger 636 comes into contact with the front end face of the valve piston 634, and the valve piston 634 is pushed in a state in which the reaction-force plunger 636 is held in contact with the valve piston 634. In consequence, the flange 644 of the valve piston 634 is seated on the stepped surface of the housing 630, so that the communication between the communication hole 672 and the communication hole 674 is shut off and the pressure of the regulated-pressure chamber 662 stops increasing.

When the pilot pressure is decreased from this condition, the movable rod 632 moves rearward and the distal end of the movable rod 632 is separated away from the valve piston 634. As a result, the communication hole 670 and the communication hole 674 are brought into communication with each other via the regulated-pressure passage 680, and the pressure of the regulated-pressure chamber 662 is decreased. Accordingly, the force that pushes the movable rod 632 rearward by the pressure of the working fluid in the regulated-pressure passage 680 is decreased, and the movable rod 632 moves forward, so that the distal end of the movable rod 632 is seated on the valve piston 634 and the pressure of the regulated-pressure chamber 662 stops decreasing. As a result of a series operations described above, the working fluid having a pressure regulated in accordance with the pilot pressure, namely, the working fluid having the regulated pressure, is supplied to the regulated-pressure chamber 662. To the master cylinder device 402, the working fluid having the regulated pressure is supplied.

As described above, the cross-sectional area $A_{22}$ of the front end face of the reaction-force plunger 636 is larger than the cross-sectional area $A_{23}$ of the front end face of the reaction-force-plunger support member 638. Accordingly, a force $F_{R11}=P_A \times A_{22}$ that acts on the reaction-force plunger 636 by the regulated pressure $P_A$ that is a pressure of the working fluid in the communication hole 676 is larger than a force $F_{R12}=P_A \times A_{23}$ that acts on the reaction-force-plunger support member 638 by the regulated pressure $P_A$. Therefore, in relation to an increase in the regulated pressure $P_A$, the force that acts on the reaction-force plunger 636 by the regulated pressure $P_A$ becomes larger than the first initial biasing force $F_{SET11}$ before the force that acts on the reaction-force-plunger support member 638 by the regulated pressure $P_A$ becomes larger than the second initial biasing force $F_{SET12}$. Accordingly, the reaction-force plunger 636 moves rearward at timing earlier than timing at which the reaction-force-plunger support member 638 moves rearward. In other words, the reaction-force plunger 636 moves rearward in a situation in which the regulated pressure $P_A$ is lower.

Figure 25:
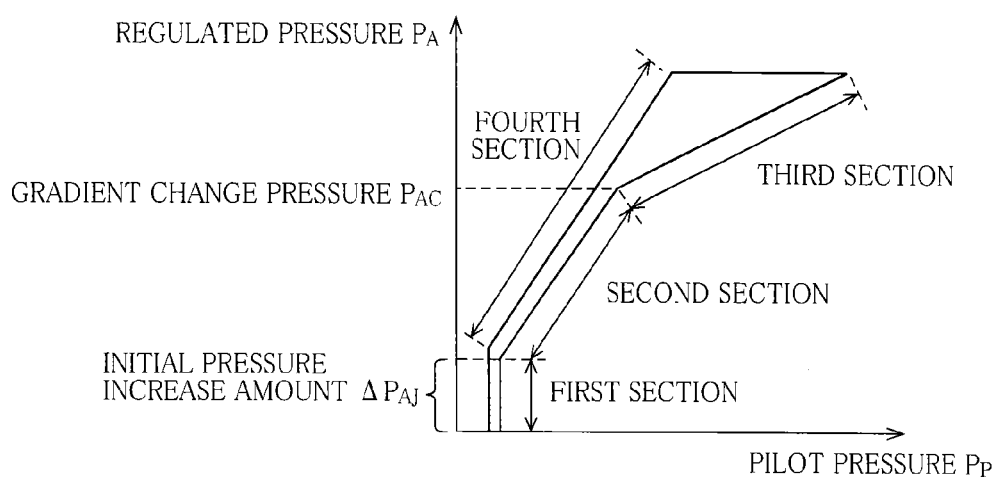
FIG. 25 is a graph showing a relationship between a pressure of a pilot chamber and a pressure of a working fluid regulated in accordance with the pressure of the pilot chamber, in the pressure regulator shown in FIG. 24.

Owing to the thus constructed pressure regulator 604, the regulated pressure $P_A$ changes, as shown in the graph of FIG. 25, with respect to an increase in the pilot pressure $P_P$ that is caused by an increase in the brake operation force, as in the pressure regulator 500 of the third embodiment. When the pilot pressure $P_P$ increases to a certain level by the brake operation, the regulated pressure $P_A$ is increased. As a result, the reaction-force plunger 636 moves rearward by the distance $D_{22}$ against the forward force $F_{SET11}$ by which the reaction-force plunger 636 is biased, and the rear end face of the reaction-force plunger 636 comes into contact with the front end face of the valve piston 634. In the meantime, the regulated pressure $P_A$ is rapidly increased by the initial pressure increase amount $\Delta P_{AJ}$, as indicated in a first section in the graph of FIG. 25.

When the pilot pressure $P_P$ is further increased, the regulated pressure $P_A$ is increased such that a force that biases the valve piston 634 forward by the pilot pressure $P_P$ and a force that biases the valve piston 634 rearward by the regulated pressure $P_A$ are balanced with each other, as indicated in a second section in the graph of FIG. 25. Here, a rearward force that acts on the movable rod 632 by the working fluid in the regulated-pressure passage 680 having the regulated pressure $P_A$ and a forward force that acts on the valve piston 634 by the working fluid in the regulated-pressure passage 680 having the regulated pressure $P_A$ cancel each other. Accordingly, the forward force and the rearward force need not be taken into account in the balance of the force that biases the valve piston 634 forward by the pilot pressure $P_P$ and the force that biases the valve piston 634 rearward by the regulated pressure $P_A$. As the pilot pressure $P_P$ is increased, the reaction-force-plunger support member 638 that moves rearward some time after the reaction-force plunger 636 has moved rearward comes into contact with the flange 649 of the reaction-force plunger 636. Accordingly, the valve piston 634 receives the force $F_{R12}$ that acts on the reaction-force-plunger support member 638 by the regulated pressure $P_A$, in addition to the force $F_{R11}$ that acts on the reaction-force plunger 636 by the regulated pressure $P_A$. That is, the increase gradient of the regulated pressure is smaller in a third section than that in the second section as shown in FIG. 25, at the regulated pressure $P_A$ equal to or higher than a gradient change pressure $P_{AC}$ that is a level of the regulated pressure $P_A$ at the time of the contact of the reaction-force-plunger support member 638 and the flange 649 of the reaction-force plunger 636.

With respect to a decrease in the pilot pressure $P_P$ by a decrease in the brake operation force, the regulated pressure $P_A$ is decreased such that the force that biases the movable rod 632 forward by the pilot pressure $P_P$ and the force that biases the movable rod 632 rearward by the regulated pressure $P_A$ are balanced with each other, namely, such that a relationship represented by $P_P \times A_{21} = P_A \times A_{24}$ is established. In other words, the valve body portion 642 of the movable rod 632 is seated on or is separated away from the end of the regulated-pressure passage 680 so as to establish the above relationship, whereby the regulated pressure $P_A$ is decreased, with respect to a decrease in the pilot pressure $P_P$, as indicated in a fourth section in the graph of FIG. 25.

The pressure regulator 604 that operates as described above may be regarded as a pressure regulator configured to regulate the high-pressure working fluid supplied from the high-pressure-source device 58 to a pressure in accordance with the pilot pressure. Further, in the pressure regulator, the valve piston 634 functions as a movable member that moves in the axial direction of the housing 630. In the pressure regulator 604, the working fluid is regulated by a simple structure in which the valve piston 634 directly supported by the housing 630 moves in the axial direction of the housing 630, so that the frictional force caused by the movement of the valve piston 634 is relatively small and the operation of the pressure regulator 604 is less likely to be influenced by the frictional force. Accordingly, the pressure regulator 604 can operate in response to a slight change in the pilot pressure and can adequately follow the change in the pilot pressure.

The movable rod 632 functions as a first plunger disposed rearward of the valve piston 634 so as to be movable in the axial direction of the housing 630 while the reaction-force plunger 636 functions as a second plunger disposed forward of the valve piston 634 so as to be movable in the axial direction of the housing 630. The second compression coil spring 652 functions as a second-plunger biasing member that biases the reaction-force plunger 636 toward the front side. The reaction-force-plunger support member 638 is fitted in the reaction-force plunger 636 and functions as a second-plunger support member that movably supports the reaction-force plunger 636. The third compression coil spring 654 functions as a support-member biasing member that biases the reaction-force-plunger support member 638 toward the front side. In the pressure regulator 604, a mechanism including the housing 630 and the valve piston 634 functions as a first valve device configured to shut off the communication between the communication hole 672 and the communication hole 674 when the valve piston 634 is located at the moving end position on the rear side and is in contact with the housing 630 and configured to establish the communication between the communication hole 672 and the communication hole 674 by the forward movement of the valve piston 634 from the moving end position. Further, a mechanism including the movable rod 632 and the valve piston 634 functions as a second valve device configured to shut off the communication between the communication hole 670 and the communication hole 674 when the movable rod 632 is in contact with the valve piston 634 and configured to establish the communication between the communication hole 670 and the communication hole 674 when the movable rod 632 is separated away from the valve piston 634.

In the pressure regulator 604, a mechanism including the first compression coil spring 650 functions as a first biasing mechanism that biases the valve piston 634 rearward by the elastic reaction force of the first compression coil spring 650. A mechanism including the pilot chamber P3 functions as a second biasing mechanism that biases, by the pressure of the pilot chamber P3, the movable rod 632 toward the valve piston 634 and biases, by the pressure of the pilot chamber P3, the valve piston 634 forward via the movable rod 632 when the movable rod 632 contacts the valve piston 634. A mechanism including the second compression coil spring 652 and the regulated-pressure chamber 662 functions as a third biasing mechanism that biases the valve piston 634 rearward via the reaction-force plunger 636 by the pressure of the regulated-pressure chamber 662 in a state in which the reaction-force plunger 636 is in contact with the valve piston 634, where the pressure of the regulated-pressure chamber 662 exceeds the set pressure, namely, a pressure increased by the initial pressure increase amount $\Delta P_{AJ}$.

The force generated toward the front side by the second compression coil spring 652 when the reaction-force plunger 636 comes into contact with the valve piston 634 may be regarded as a set load for setting initiation of biasing the valve piston 634 rearward by the reaction-force plunger 636. That is, when the magnitude of the force by the pressure of the space 664 for biasing the reaction-force plunger 636 rearward exceeds the set load, the reaction-force plunger 636 starts to bias the valve piston 634 rearward. Accordingly, the second compression coil spring 652 may be regarded as a set load applying member that applies the set load to the reaction-force plunger 636.

The third biasing mechanism further includes the reaction-force-plunger support member 638 and the third compression coil spring 654. The third biasing mechanism is configured such that, when the pressure of the regulated-pressure chamber 662 exceeds the gradient change pressure $P_{AC}$ that is the second set pressure higher than the set pressure, the reaction-force-plunger support member 638 comes into contact with the reaction-force plunger 636 and such that the valve piston 634 is biased rearward with the reaction-force-plunger support member 638 held in contact with the reaction-force plunger 636.

Further, the force generated by the second compression coil spring 652 and the third compression coil spring 654 when the pressure of the space 664 exceeds the gradient change pressure $P_{AC}$ may be regarded as the second set load that acts forward on the reaction-force plunger 636. Accordingly, when the regulated pressure $P_A$ exceeds the gradient change pressure $P_{AC}$, the reaction-force-plunger support member 638 starts to bias the movable rod 632 rearward. Thus, the second compression coil spring 652 and the third compression coil spring 654 may be regarded as a second set load applying member that applies the second set load to the reaction-force plunger 636.

<Operation of Vehicle Brake System>

In the present vehicle brake system, when a driver applies an operation force to the brake pedal 70 in a condition in which the brake pedal 70 is not depressed, the master-cut valves 608, 610 are closed, and the pressure-increase open/close valve 614FL, 614FR and the pressure-decrease open/close valves 618FL, FR are opened or closed. That is, the working fluid is supplied from the antilock device 602 to the brake devices 56FL, FR for the front wheels, and the hydraulic brake system 600 operates in the regulated-pressure-dependent braking mode in which the hydraulic brake system 600 generates the regulated-pressure-dependent braking force.

The braking state of the present vehicle brake system is the regenerative-braking-force-dependent braking state before the brake devices 56FL, FR generate the braking force, namely, in the hydraulic-braking impossible situation after operation initiation, i.e., the situation before the master pressure exceeds the start pressure $P_T$ of hydraulic braking force generation. Hence, the braking force can be quickly generated utilizing the regenerative brake system at the time of initiation of the brake operation. Further, even if individual hydraulic brake systems suffer from a difference in the degree of the "play" due to variations in the "play" or due to changes of the "play" over time, the braking force can be generated at the same timing with respect to the brake operation without being influenced by the degree of the "play" in each hydraulic brake system, according to the present vehicle brake system.

Further, when the hydraulic brake system 600 operates in the regulated-pressure-dependent braking mode, the brake pedal 70 does not move even if the brake pedal 70 is operated because the pressurizing chambers R1, R2 are hermetically closed and the inter-piston chamber R15 is also hermetically closed. Therefore, the hydraulic brake system 600 avoids a useless increase in the operation amount of the brake pedal 70, namely, avoids a phenomenon that the operation amount of the brake pedal 70 is increased even though the braking force is not generated in the hydraulic brake system 600, so as to eliminate the above-indicated "play". Thus, the operation feeling in the brake operation is improved in the present brake system.

When the master pressure exceeds the start pressure $P_T$ of hydraulic braking force generation, the master-cut valves 608, 610 are opened while the pressure-increase open/close valves 614FL, 614FR and the pressure-decrease open/close valves 618FL, FR are closed. Accordingly, the pressurized working fluid is supplied from the master cylinder device 402 to the brake devices 56FL, FR for the front wheels. As a result, the working fluid pressurized by the master cylinder device 402 in dependence on the operation force and the regulated pressure is supplied to the brake devices 56FL, FR. Thus, in the hydraulic-braking possible situation after operation initiation, the hydraulic brake system 600 operates in the braking mode depending on the operation force and the regulated pressure in which the hydraulic brake system 600 generates both of the operation-force-dependent braking force and the regulated-pressure-dependent braking force. In this instance, the braking state of the present vehicle brake system becomes the braking state depending on the operation force and the regulated pressure, i.e., the state in which the vehicle is braked or stopped by the operation-force-dependent braking force and the regulated-pressure-dependent braking force.

In the hydraulic-braking possible situation after operation initiation, the regenerative braking force that has been generated immediately after initiation of the brake operation is not generated. According to the present vehicle brake system, therefore, the braking force can be generated only by the hydraulic brake system 600 in all of the wheels 18 in a situation in which the posture of the vehicle body changes due to a change in deceleration of the vehicle after initiation of the brake operation and it is accordingly estimated that the vehicle stability and maneuverability are relatively poor. Accordingly, the balance between the braking force of the drive wheels and the braking force of the non-drive wheels does not break down, thereby making it possible to prevent the vehicle stability and maneuverability from being further deteriorated.

When the situation changes from the hydraulic-braking possible situation after operation initiation to the operation-amount constant situation, the master-cut valves 608, 610 are closed while the pressure-increase open/close valves 614FL, 614FR and the pressure-decrease open/close valves 618FL, FR are opened or closed, in the hydraulic brake system 600. That is, the hydraulic brake system 600 operates in the regulated-pressure-dependent braking mode in which the hydraulic brake system 600 generates the regulated-pressure-dependent braking force. Further, the regenerative brake system generates the regenerative braking force. Accordingly, the braking state of the vehicle brake system becomes the braking state depending on the regulated pressure and the regenerative braking force. To be more specific, the regulated-pressure-dependent braking force and the regenerative braking force are generated in the wheels 18RL, 18RR that are drive wheels while the regulated-pressure-dependent braking force is generated in the wheels 18FL, 18FR that are non-drive wheels. As a result, the balance between the braking force of the drive wheels and the braking force of the non-drive wheels breaks down. However, the balance breaks down in a situation in which the brake operation amount is constant, namely, in a situation in which the posture of the vehicle body is relatively stable and the vehicle stability and maneuverability are relatively good. Hence, the vehicle stability and maneuverability are kept relatively good without being deteriorated.

When the situation changes from the operation-amount constant situation to the operation-amount re-changed situation, the master-cut valves 608, 610 are opened while the pressure-increase open/close valves 614FL, 614FR and the pressure-decrease open/close valves 618FL, FR are closed. That is, the hydraulic brake system 600 operates in the braking mode depending on the operation force and the regulated pressure. Further, the regenerative brake system continues to generate the regenerative braking force. Accordingly, the braking state of the present vehicle brake system becomes the braking state depending on the operation force, the regulated pressure, and the regenerative braking force. Thus, in the present vehicle brake system, it is possible to brake or stop the vehicle making the most of the hydraulic brake system 600 and the regenerative brake system, so that a relatively large braking force can be generated.

Thus, in the hydraulic brake system 600, the master-cut valves 608, 610, the pressure-increase open/close valves 614FL, 614FR, and the pressure-decrease open/close valves 618FL, FR function as a braking-mode switching mechanism that selectively effectuates one of the regulated-pressure-dependent braking mode and the braking mode depending on the operation force and the regulated pressure. In the braking-mode switching mechanism, the pressure-increase open/close valves 614FL, 614FR function as a regulated-pressure-fluid supply switching mechanism configured to switch between supply of the working fluid from the pressure regulator 604 to the brake device 56 and shutting off of the supply. Further, the master-cut valves 608, 610 function as a master-pressure-fluid supply switching mechanism configured to switch between supply of the working fluid from the master cylinder device 402 to the brake devices 56 and shutting off of the supply. In the present vehicle brake system, the hydraulic brake system and the regenerative brake system are appropriately utilized by switching the braking state in accordance with the brake operation, whereby the vehicle can be braked or stopped while sufficiently regenerating electricity. In either of the situations described above, the regenerative braking force stops being generated when the speed of the vehicle becomes equal to or lower than a set speed by the brake operation.

In a case where electricity supplied to the vehicle brake system is cut off due to some failures, the master-cut valves 608, 610 are opened while the pressure-increase open/close valves 614FL, 614FR and the pressure-decrease open/close valves 618FL, FR are closed, so that the pressurized working fluid is supplied from the master cylinder device 402 to the brake devices 56FL, FR for the front wheels. Thus, the hydraulic brake system 600 can operate in the braking mode depending on the operation force and the regulated pressure. Accordingly, the present vehicle brake system is excellent in terms of failsafe.

<Control for Vehicle Brake System>

Figure 26:
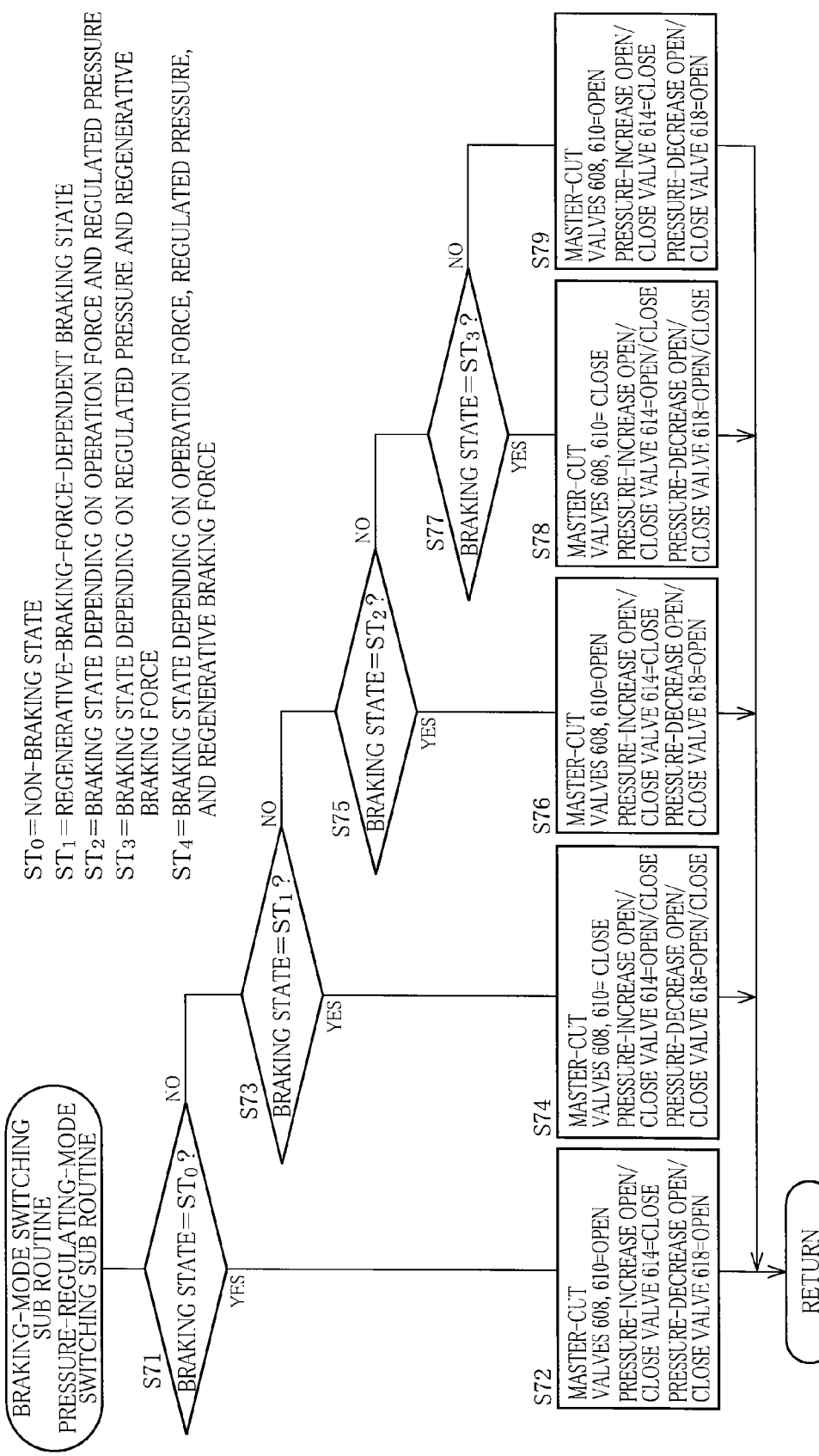
FIG. 26 is a flow chart showing a program for controlling a braking-mode switching mechanism executed in the vehicle brake system of the fifth embodiment.

As in the vehicle brake system of the first embodiment, the brake control program represented by the flow chart of FIG. 7 is repeatedly executed in the vehicle brake system of the fifth embodiment. It is noted, however, that the braking-mode switching sub routine of S2 and the pressure-regulating-mode switching sub routine of S3 are executed according to a program represented by a flow chart of FIG. 26. In processing according to this program, where it is judged at S71 that the braking state of the vehicle brake system is the non-braking state $ST_0$, the master-cut valves 608, 610 are opened at S72. Where it is judged that the braking state is not the non-braking state $ST_0$, it is judged at S73 whether or not the braking state is the regenerative-braking-force-dependent braking state $ST_1$. Where it is judged that the braking state is the regenerative-braking-force-dependent braking state $ST_1$, the master-cut valves 608, 610 are closed at S74. Where it is judged that the braking state is not the regenerative-braking-force-dependent braking state $ST_1$, it is judged at S75 whether or not the braking state is the braking state $ST_2$ depending on the operation force and the regulated pressure. Where it is judged that the braking state is the braking state $ST_2$ depending on the operation force and the regulated pressure, the master-cut valves 608, 610 are opened at S76. Where it is judged that the braking state is not the braking state $ST_2$ depending on the operation force and the regulated pressure, it is judged at S77 whether or not the braking state is the braking state $ST_3$ depending on the regulated pressure and the regenerative braking force. Where it is judged that the braking state is the braking state $ST_3$ depending on the regulated pressure and the regenerative braking force, the master-cut valves 608, 610 are closed at S78. Where it is judged that the braking state is not the braking state $ST_3$ depending on the regulated pressure and the regenerative braking force, the braking state is the braking state $ST_4$ depending on the operation force, the regulated pressure, and the regenerative braking force. In this case, the master-cut valves 608, 610 are opened at S79. Accordingly, in the present vehicle brake system, both of switching of the braking mode and switching of the pressure regulating mode can be simultaneously executed by opening or closing the master-cut valves 608, 610.

Figure 27:
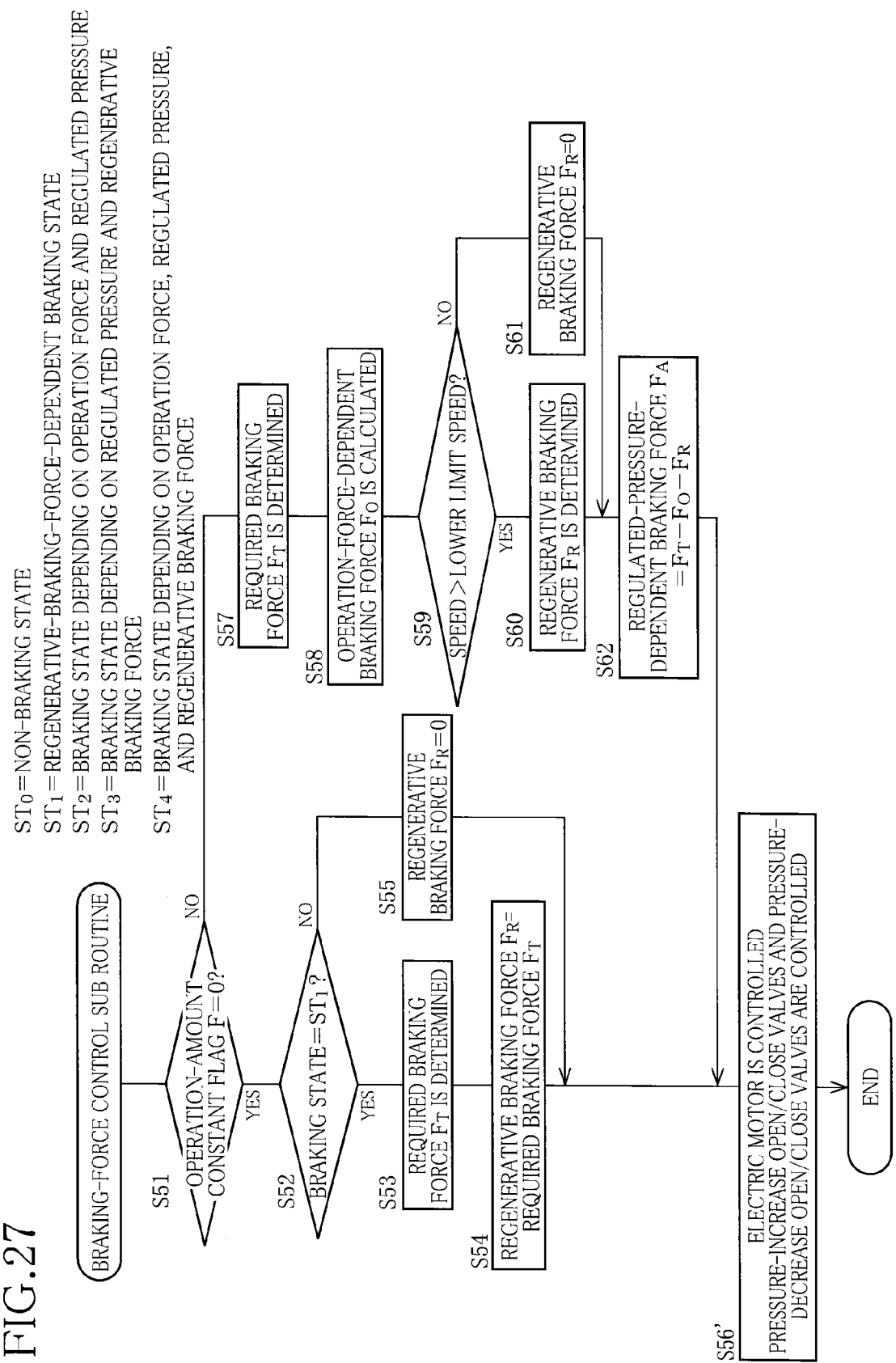
FIG. 27 is a flow chart showing a program for determining a braking force executed in the vehicle brake system of the fifth embodiment.

The braking-force control sub routine of S4 in the brake control program is executed according to a program represented by a flow chart of FIG. 27. The braking-force control sub routine of the fifth embodiment differs from the braking-force control sub routine of the first embodiment shown in FIG. 11 in the processing corresponding to S56. At S56' of the braking-force control sub routine of the fifth embodiment, the pressure-increase open/close valves 614FL, FR for the front wheels and the pressure-decrease open/close valves 618FL, FR for the front wheels are opened or closed, for generating the calculated regulated-pressure-dependent braking force $F_A$. Further, where the operation-amount constant flag F is 0, the pressure regulator device operates in the valve mechanism operating mode in which the pressure of the working fluid is regulated by the pressure regulator 604. Therefore, at S56', the pressure-increase open/close valves 614FL, FR for the front wheels are non-energized so as to be closed while the pressure-decrease open/close valves 618 FL,FR for the front wheels are non-energized so as to be closed. Where the operation-amount constant flag F is 1, the pressure regulator device operates in the linear valve operating mode in which the pressure of the working fluid is regulated utilizing the pressure-increase open/close valves 614FL, FR for the front wheels and the pressure-decrease open/close valves 618FL, FR for the front wheels. Accordingly, the pressure-increase open/close valves 614FL, FR for the front wheels and the pressure-decrease open/close valves 618FL, FR for the front wheels are opened or closed.

6. Sixth Embodiment

Figure 28:
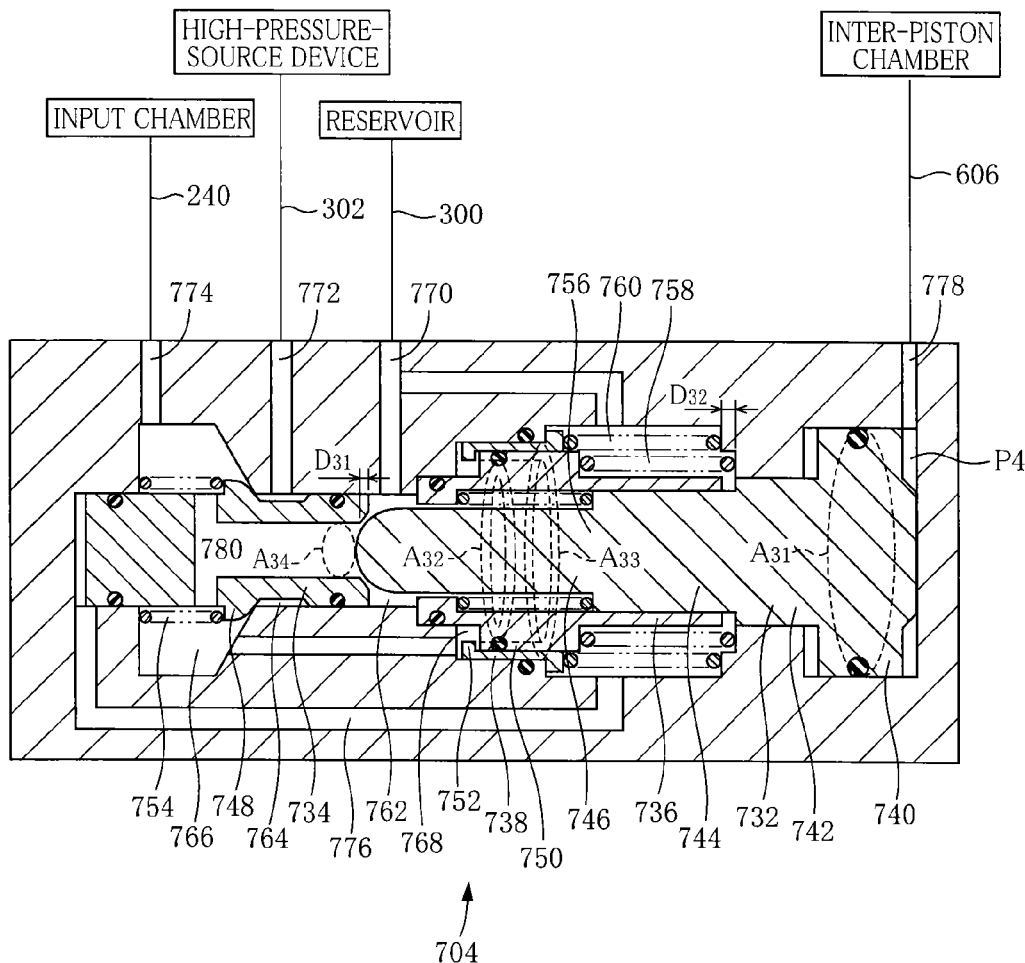
FIG. 28 is a view showing a pressure regulator according to a sixth embodiment.

FIG. 28 shows a pressure regulator 704 provided in a vehicle brake system according to a sixth embodiment. The vehicle brake system of this sixth embodiment is identical in construction with the vehicle brake system according to the fifth embodiment except for a pressure regulator 704. Accordingly, the pressure regulator 704 will be explained in terms of a structure and an operation, in the interest of brevity.

<Structure of Pressure Regulator>

The pressure regulator 704 includes: a housing 730 whose opposite ends are closed; a movable rod 732 disposed in the housing 730; a valve piston 734 disposed forward of the movable rod 732; a reaction-force plunger 736 fitted on the movable rod 732; and a reaction-force-plunger support member 738 fitted on the reaction-force plunger 736.

One of opposite end sides of the housing 730 that is on the rear side is defined as a first-end side while the other of the opposite end sides is defined as a second-end side. The housing 730 is sectioned roughly into a plurality of inner-diameter portions having mutually different inner diameters. The movable rod 732 has different outer diameters so that the outer circumference of the movable rod 732 has a stepped shape having stepped surfaces, such that the outer diameters reduce in a direction from the rear side toward the front side. More specifically, the movable rod 732 has a proximal portion 740 located at its rearmost position, a first intermediate portion 742 located forward of the proximal portion 740, a second intermediate portion 744 located forward of the first intermediate portion 742, and a valve body portion 746 located forward of the second intermediate portion 744. The distal end of the valve body portion 746 has a hemispherical shape.

The valve piston 734 has a cylindrical shape having a flange 748 formed on its outer circumference at its middle portion in the front-rear direction. The valve piston 734 is restricted from moving rearward by contact of a rear-side end face of the flange 748 with a stepped surface formed on the inner circumferential surface of the housing 730. The reaction-force plunger 736 has a cylindrical shape having a flange 750 formed on its outer circumference. The movable rod 732 is fitted in the reaction-force plunger 736 from the rear side, such that the rear end face of the reaction-force plunger 736 can contact the stepped surface of the movable rod 732 that is formed between the first intermediate portion 742 and the second intermediate portion 744. The reaction-force-plunger support member 738 has a cylindrical shape having an inward flange 752 at its front end. The reaction-force plunger 736 is fitted in the reaction-force-plunger support member 738 from the rear side, such that the inward flange 752 can contact a stepped surface of the reaction-force plunger 736 defined by the flange 750.

In the housing 730, a plurality of compression coil springs are disposed. More specifically, a first compression coil spring 754 is disposed between the flange 748 of the valve piston 734 and the housing 730 for biasing the valve piston 734 and the housing 730 so as to be separated away from each other. A second compression coil spring 756 is disposed between the movable rod 732 and the reaction-force plunger 736 for biasing the movable rod 732 and the reaction-force plunger 736 so as to be separated away from each other. A third compression coil spring 758 is disposed between the reaction-force plunger 736 and the housing 730 for biasing the reaction-force plunger 736 and the housing 730 so as to be separated away from each other. A fourth compression coil spring 760 is disposed between the reaction-force-plunger support member 738 and the housing 730 for biasing the reaction-force-plunger support member 738 and the housing 730 so as to be separated away from each other. Thus, the valve piston 734 is biased rearward by an elastic force of the first compression coil spring 754. The movable rod 732 is biased rearward and the reaction-force plunger 736 is biased forward, by an elastic force of the second compression coil spring 756. The reaction-force plunger 736 is biased forward also by an elastic force of the third compression coil spring 758. The reaction-force-plunger support member 738 is biased forward by an elastic force of the fourth compression coil spring 760.

The first compression coil spring 754 and the second compression coil spring 756 have respective spring constants that are relatively small. The third compression coil spring 758 has the same spring constant as the fourth compression coil spring 760. The reaction-force plunger 736 is biased forward also by the elastic force of the second compression coil spring 756. However, because the elastic force of the second compression coil spring 756 is considerably smaller than that of the third compression coil spring 758, the elastic force of the second compression coil spring 756 can be ignored here. In a state shown in FIG. 28, the second compression coil spring 758 is compressed, and the reaction-force plunger 736 is biased in advance by a forward force $F_{SET21}$. Further, the fourth compression coil spring 760 is also compressed in the state of FIG. 28, and the reaction-force-plunger support member 738 is biased in advance by a forward force $F_{SET22}$.

In the thus constructed pressure regulator 704, a plurality of fluid chambers are formed. There is defined, between the rear end face of the movable rod 732 and the housing 730, a pilot chamber P4 that stores the working fluid having the pilot pressure for activating the pressure regulator 704, as explained later. An atmospheric-pressure chamber 762 is defined between: the outer circumferential surface of the valve body portion 746 of the movable rod 732; and the inner circumferential surface of the housing 730. A high-pressure chamber 764 is defined between: the outer circumferential surface of the valve piston 734 at a position located rearward of the flange 748 of the valve piston 734; and the inner circumferential surface of the housing 730. A first regulated-pressure chamber 766 is defined between: the outer circumferential surface of the valve piston 734 at a position located forward of the flange 748; and the inner circumferential surface of the housing 730. Further, a second regulated-pressure chamber 768 is defined between: the front end face of the flange 750 of the reaction-force plunger 736 and the front end face of the inward flange 752 of the reaction-force-plunger support member 738; and the housing 730.

In the housing 730, a plurality communication holes are formed. More specifically, a communication hole 770 is formed whose one end is open to the atmospheric-pressure chamber 762 while the other end functions as a connection port so as to be open to the exterior. A communication hole 772 is formed whose one end is open to the high-pressure chamber 764 while the other end functions as a connection port so as to be open to the exterior. A communication hole 774 is formed whose one end is open to the first regulated-pressure chamber 766 while the other end functions as a connection port so as to be open to the exterior. The first regulated-pressure chamber 766 communicates with the second regulated-pressure chamber 768 via a communication hole 776. Further, in the housing 730, a connection hole 778 is formed whose one end is open to the pilot chamber P4 while the other end functions as a connection port so as to be open to the exterior. In the valve piston 734, a regulated-pressure passage 780 is formed whose one end is open to the atmospheric-pressure chamber 762 while the other end is open to the first regulated-pressure chamber 766, for allowing the atmospheric-pressure chamber 762 and the first regulated-pressure chamber 766 to communicate with each other. The distal end of the valve body portion 746 of the movable rod 732 can be seated on the one end of the regulated-pressure passage 780 that is open to the atmospheric-pressure chamber 762. When the distal end of the valve body portion 746 of the movable rod 732 is seated on the one end of the regulated-pressure passage 780, the communication between the atmospheric-pressure chamber 762 and the first regulated-pressure chamber 766 by the regulated-pressure passage 780 is shut off.

In the thus constructed pressure regulator 704, the low-pressure communication passage 300 that communicates with the reservoir 62 is connected to the connection port of a communication hole 770, and the high-pressure communication passage 302 that communicates with the high-pressure-source device 58 is connected to the connection port of the communication hole 772. Accordingly, in the pressure regulator 704, the communication hole 770 functions as a low-pressure passage through which the working fluid is discharged to the reservoir 62, and the communication hole 772 functions as a high-pressure passage through which the working fluid supplied from the high-pressure-source device 58 is introduced. There is connected, to the connection port of the connection hole 778, the other end of the pilot-pressure supply passage 606 that communicates with the inter-piston chamber R15. Accordingly, the pressure of the pilot chamber P4 is equal to the pressure of the inter-piston chamber R15.

In the pressure regulator 704, an area of the rear end face of the movable rod 732 is $A_{31}$. The front end face of the flange 750 of the reaction-force plunger 736 has a cross-sectional area $A_{32}$, and the front end face of the reaction-force-plunger support member 738 has a cross-sectional area $A_{33}$. Here, the cross-sectional area $A_{32}$ of the front end face of the flange 750 of the reaction-force plunger 736 is larger than the cross-sectional area $A_{33}$ of the front end face of the reaction-force-plunger support member 738. An area of a distal end of the valve body portion 746 of the movable rod 732 on which the pressure of the working fluid in the regulated-pressure passage 780 acts is $A_{34}$. In the state shown in FIG. 28, a distance between the valve body portion 746 of the movable rod 732 and the opening of the regulated-pressure passage 780 is $D_{31}$, and a distance between: the stepped surface formed between the first intermediate portion 742 and the second intermediate portion 744 of the movable rod 732; and the rear end face of the reaction-force plunger 736 is $D_{32}$.

<Operation of Pressure Regulator>

In the thus constructed pressure regulator 704, the movable rod 732 moves forward by the pressure of the pilot chamber P4 that acts thereon, and the movable rod 732 comes into contact with the valve piston 734, whereby the valve piston 734 is moved forward. That is, in the pressure regulator 704, the pressure of the working fluid introduced into the pilot chamber P4 functions as the pilot pressure by which the pressure regulator 704 is activated or operated. Where the pilot pressure is equal to the atmospheric pressure, the valve piston 734 is located at a moving end position on the rear side by the elastic force of the first compression coil spring 754 that biases the valve piston 734 rearward. The movable rod 732 is also located on the rear side by the elastic force of the second compression coil spring 756. Accordingly, the valve body portion 746 of the movable rod 732 is spaced apart from an end of the regulated-pressure passage 780 that is open to the atmospheric-pressure chamber 762, whereby the atmospheric-pressure chamber 762 and the first regulated-pressure chamber 766 are in communication with each other. That is, the first regulated-pressure chamber 766 communicates with the reservoir 62, so that the pressure of the first regulated-pressure chamber 766 and the pressure of the second regulated-pressure chamber 768 that communicates with the first regulated-pressure chamber 766 via the communication hole 776 are equal to the atmospheric pressure. When the pilot pressure is increased in this condition, the movable rod 732 moves forward by a distance $D_{31}$, so that the distal end of the valve body portion 746 is seated on the end of the regulated-pressure passage 780 that is open and the communication between: the atmospheric-pressure chamber 762; and the first regulated-pressure chamber 766 and the second regulated-pressure chamber 768 is shut off. When the movable rod 732 is further moved by a slight distance, the valve piston 734 is moved forward, so that the flange 748 is separated away from the stepped surface of the housing 730. As a result, the high-pressure chamber 764 is brought into communication with the first regulated-pressure chamber 766 and the second regulated-pressure chamber 768, and the pressure of the first regulated-pressure chamber 766 and the second regulated-pressure chamber 768 is increased.

When the pressure of the second regulated-pressure chamber 768 is increased, the reaction-force plunger 736 and the reaction-force-plunger support member 738 are pushed rearward. When the force by the pressure of the second regulated-pressure chamber 768 exceeds the first initial biasing force $F_{SET21}$, the reaction-force plunger 736 moves rearward while compressing the second compression coil spring 756 and the third compression coil spring 758. Further, when the force by the pressure of the second regulated-pressure chamber 768 exceeds the second initial biasing force $F_{SET22}$, the reaction-force-plunger support member 738 moves rearward while compressing the fourth compression coil spring 760. Accordingly, when the reaction-force-plunger support member 738 further moves rearward, the reaction-force plunger 736 moves rearward by a distance $D_{32}-D_{31}$, so that the rear end face of the reaction-force plunger 736 comes into contact with the stepped surface formed between the first intermediate portion 742 and the second intermediate portion 744 of the movable rod 732 and the movable rod 732 is pushed in a state in which the reaction-force plunger 736 is held in contact with the movable rod 732. In consequence, the flange 748 of the valve piston 734 is seated on the stepped surface of the housing 730, so that the communication between the communication hole 772 and the communication hole 774 is shut off and the pressure of the first regulated-pressure chamber 766 and the second regulated-pressure chamber 768 stops increasing.

When the pilot pressure is decreased in this condition, the movable rod 732 moves rearward and the valve body portion 746 of the movable rod 732 is separated away from the valve piston 734. As a result, the communication hole 770 and the communication hole 774 are brought into communication with each other via the regulated-pressure passage 780, and the pressure of the first regulated-pressure chamber 766 and the second regulated-pressure chamber 768 is decreased. Accordingly, the force that pushes the movable rod 732 rearward by the pressure of the working fluid in the regulated-pressure passage 780 is decreased, and the movable rod 732 moves forward. In consequence, the distal end of the movable rod 732 is seated on the valve piston 734 and the regulated pressure stops decreasing. As a result of a series of operations described above, the working fluid having a pressure regulated in accordance with the pilot pressure, namely, the working fluid having the regulated pressure, is supplied to the first regulated-pressure chamber 766 and the second regulated-pressure chamber 768. To the master cylinder device 402, the working fluid having the regulated pressure is supplied.

As described above, the cross-sectional area $A_3$ of the front end face of the flange 750 of the reaction-force plunger 736 is larger than the cross-sectional area $A_{33}$ of the front end face of the reaction-force-plunger support member 738. Accordingly, a force $F_{R21}=P_A \times A_{32}$ that acts on the reaction-force plunger 736 by the regulated pressure $P_A$ that is a pressure of the working fluid in the second regulated-pressure chamber 768 is larger than a force $F_{R22}=P_A \times A_{33}$ that acts on the reaction-force-plunger support member 738 by the regulated pressure $P_A$. Therefore, in relation to an increase in the regulated pressure $P_A$, the force that acts on the reaction-force plunger 736 by the regulated pressure $P_A$ becomes larger than the first initial biasing force $F_{SET21}$ before the force that acts on the reaction-force-plunger support member 738 by the regulated pressure $P_A$ becomes larger than the second initial biasing force $F_{SET22}$. Accordingly, the reaction-force plunger 736 moves rearward at timing earlier than timing at which the reaction-force-plunger support member 738 moves rearward. In other words, the reaction-force plunger 736 moves rearward in a situation in which the regulated pressure $P_A$ is lower.

Figure 29:
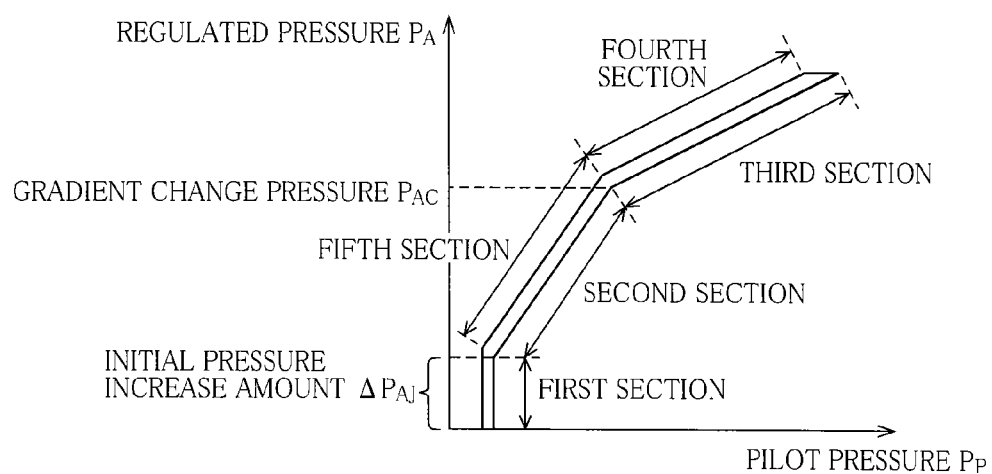
FIG. 29 is a graph showing a relationship between a pressure of a pilot chamber and a pressure of a working fluid regulated in accordance with the pressure of the pilot chamber, in the pressure regulator shown in FIG. 28.

Owing to the thus constructed pressure regulator 704, the regulated pressure $P_A$ changes, as shown in the graph of FIG. 29, with respect to an increase in the pilot pressure $P_P$ that is caused by an increase in the brake operation force, as in the pressure regulator 500 of the third embodiment. When the pilot pressure $P_P$ increases to a certain level by the brake operation, the regulated pressure $P_A$ is increased. As a result, the reaction-force plunger 736 moves rearward by the distance $D_{32}-D_{31}$ against the forward force $F_{SET21}$ by which the reaction-force plunger 736 is biased, and the rear end face of the reaction-force plunger 736 comes into contact with the stepped surface formed between the first intermediate portion 742 and the second intermediate portion 744 of the movable rod 732. In the meantime, the regulated pressure $P_A$ is rapidly increased by the initial pressure increase amount $\Delta P_{AJ}$, as indicated in a first section in the graph of FIG. 29.

When the pilot pressure $P_P$ is further increased, the regulated pressure $P_A$ is increased such that a force that biases the movable rod 732 forward by the pilot pressure $P_P$ and a force that biases the reaction-force plunger 736 rearward by the regulated pressure $P_A$ are balanced with each other, as indicated in a second section in the graph of FIG. 29. Here, a rearward force that acts on the movable rod 732 by the working fluid in the regulated-pressure passage 780 having the regulated pressure $P_A$ and a forward force that acts on the valve piston 734 by the working fluid in the regulated-pressure passage 780 having the regulated pressure $P_A$ cancel each other. Accordingly, the forward force and the rearward force need not be taken into account in the balance of the force that biases the movable rod 732 forward by the pilot pressure $P_P$ and the force that biases the reaction-force plunger 736 rearward by the regulated pressure $P_A$. As the pilot pressure $P_P$ is increased, the reaction-force-plunger support member 738 that moves rearward some time after the reaction-force plunger 736 has moved rearward comes into contact with the flange 750 of the reaction-force plunger 736. Accordingly, the movable rod 732 receives the force $F_{R22}$ that acts on the reaction-force-plunger support member 738 by the regulated pressure $P_A$, in addition to the force $F_{R21}$ that acts on the reaction-force plunger 736 by the regulated pressure $P_A$. That is, the increase gradient of the regulated pressure is smaller in a third section than in the second section as shown in FIG. 29, at the regulated pressure $P_A$ equal to or higher than the gradient change pressure $P_{AC}$ that is a level of the regulated pressure $P_A$ at the time of contact of the reaction-force-plunger support member 738 and the flange 750 of the reaction-force plunger 736.

With respect to a decrease in the pilot pressure $P_P$ by a decrease in the brake operation force, the regulated pressure $P_A$ is decreased such that the force that biases the movable rod 732 forward by the pilot pressure $P_P$ and the force that biases the movable rod 732 rearward by the regulated pressure $P_A$ are balanced with each other. In a state in which the reaction-force-plunger support member 738 comes into contact with the flange 750 of the reaction-force plunger 736 so that the reaction-force-plunger support member 738 and the reaction-force plunger 736 are integral with each other, an area of the reaction-force plunger 736 and the reaction-force-plunger support member 738 on which the regulated pressure $P_A$ acts is defined as $A_{35}$. In this case, the movable rod 732 moves forward or rearward such that the following expression is established:

$$P_P \times A_{31} = P_A \times A_{35} - F_{R21} - F_{R22} + P_A \times A_{24}$$

Accordingly, the regulated pressure $P_A$ decreases with respect to a decrease in the pilot pressure $P_P$, as indicated in a fourth section in the graph of FIG. 29. After the reaction-force-plunger support member 738 has been separated away from the reaction-force plunger 736, the movable rod 732 moves forward or rearward such that the following expression is established:

$$P_P \times A_{31} = P_A \times A_{32} - F_{R21} + P_A \times A_{24}$$

Accordingly, the regulated pressure $P_A$ decreases with respect to a decrease in the pilot pressure $P_P$, as indicated in a fifth section in the graph of FIG. 29. In other words, the regulated pressure $P_A$ decreases such that an amount of decrease of the regulated pressure $P_A$ with respect to an amount of decrease of the pilot pressure $P_P$ is larger in the fifth section than in the fourth section.

The pressure regulator 704 that operates as described above may be regarded as a pressure regulator configured to regulate the high-pressure working fluid supplied from the high-pressure-source device 58 to a pressure in accordance with the pilot pressure. Further, in the pressure regulator, the valve piston 734 functions as a movable member that moves in the axial direction of the housing 730. In the pressure regulator 704, the working fluid is regulated by a simple structure in which the valve piston 734 directly supported by the housing 730 moves in the axial direction of the housing 730, so that the frictional force caused by the movement of the valve piston 734 is relatively small and the operation of the pressure regulator 704 is less likely to be influenced by the frictional force. Accordingly, the pressure regulator 704 can operate in response to a slight change in the pilot pressure and can adequately follow the change in the pilot pressure.

The movable rod 732 functions as a first plunger disposed on the first-end side of the valve piston 734 so as to be movable in the axial direction of the housing 730 while the reaction-force plunger 736 functions as a second plunger disposed on the first-end side of the valve piston 734 so as to be movable in the axial direction of the housing 730. The third compression coil spring 758 functions as a second-plunger biasing member that biases the reaction-force plunger 736 forward. The reaction-force-plunger support member 738 is fitted on the reaction-force plunger 736 and functions as a second-plunger support member that movably supports the reaction-force plunger 736. The fourth compression coil spring 760 functions as a support-member biasing member that biases the reaction-force-plunger support member 738 forward. In the pressure regulator 704, a mechanism including the housing 730 and the valve piston 734 functions as a first valve device configured to shut off the communication between the communication passage 772 and the communication passage 774 when the valve piston 734 is located at the moving end position on the rear side and is in contact with the housing 730 and configured to establish the communication passage 772 and the communication passage 774 by the forward movement of the valve piston 734 from the moving end position. Further, a mechanism including the movable rod 732 and the valve piston 734 functions as a second valve device configured to shut off the communication between the communication hole 770 and the communication hole 774 when the movable rod 732 is in contact with the valve piston 734 and configured to establish the communication between the communication hole 770 and the communication hole 774 when the movable rod 732 is separated away from the valve piston 734.

In the pressure regulator 704, a mechanism including the first compression coil spring 754 functions as a first biasing mechanism that biases the valve piston 734 rearward by the elastic reaction force of the first compression coil spring 754. A mechanism including the pilot chamber P4 functions as a second biasing mechanism that biases, by the pressure of the pilot chamber P4, the movable rod 732 toward the valve piston 734 and biases, by the pressure of the pilot chamber P4, the valve piston 734 forward via the movable rod 732 when the movable rod 732 contacts the valve piston 734. A mechanism including the third compression coil spring 758 and the second regulated-pressure chamber 768 functions as a third biasing mechanism that biases the movable rod 732 rearward via the reaction-force plunger 736 by the pressure of the second regulated-pressure chamber 768 in a state in which the reaction-force plunger 736 is in contact with the movable rod 732, where the pressure of the second regulated-pressure chamber 768 exceeds the set pressure, namely, a pressure increased by the initial pressure increase amount $\Delta P_{AJ}$.

The force generated toward the front side by the third compression coil spring 758 when the reaction-force plunger 736 comes into contact with the movable rod 732 may be regarded as a set load for setting initiation of biasing the movable rod 732 rearward by the reaction-force plunger 736. That is, when the magnitude of the force by the pressure of the second regulated-pressure chamber 768 for biasing the reaction-force plunger 736 rearward exceeds the set load, the reaction-force plunger 736 starts to bias the movable rod 732 rearward. Accordingly, the third compression coil spring 758 may be regarded as a set load applying member that applies the set load to the reaction-force plunger 736.

The third biasing mechanism further includes the reaction-force-plunger support member 738 and the fourth compression coil spring 760. The third biasing mechanism is configured such that, when the pressure of the second regulated-pressure chamber 768 exceeds the gradient change pressure $P_{AC}$ that is the second set pressure higher than the set pressure, the reaction-force-plunger support member 738 comes into contact with the reaction-force plunger 736 and such that the movable rod 732 is biased rearward with the reaction-force-plunger support member 738 held in contact with the reaction-force plunger 736.

Further, the force generated by the third compression coil spring 758 and the fourth compression coil spring 760 when the pressure of the second regulated-pressure chamber 768 exceeds the gradient change pressure $P_{AC}$ may be regarded as the second set load corresponding to the force that acts rearward on the reaction-force plunger 736. Accordingly, when the regulated pressure $P_A$ exceeds the gradient change pressure $P_{AC}$, the reaction-force-plunger support member 738 starts to bias the movable rod 732 rearward. Thus, the third compression coil spring 758 and the fourth compression coil spring 760 may be regarded as a second set load applying member that applies the second set load to the reaction-force plunger 736.

<Operation of Vehicle Brake System>

The hydraulic brake system 600 is configured such that, in the hydraulic-braking impossible situation after operation initiation and the operation-amount constant situation, the pressure of the working fluid supplied from the high-pressure-source device 58 is regulated by the antilock device 602 and the pressure-regulated working fluid is supplied to the brake devices 56FL,FR and such that, in the hydraulic-braking possible situation after operation initiation and the opera- tion-amount re-changed situation, the pressure of the working fluid supplied from the high-pressure-source device 58 is regulated by the pressure regulator 704 and the pressure-regulated working fluid is supplied to the master cylinder device 402. In a case where electricity supplied to the vehicle brake system is cut off due to some failures, the pressure of the working fluid is regulated by the pressure regulator 704 and the pressure-regulated working fluid is supplied to the master cylinder device 402. Thus, the hydraulic brake system 600 can operate in the braking mode depending on the operation force and the regulated pressure. Accordingly, the present vehicle brake system is excellent in terms of failsafe.

Each of the pressure regulators illustrated above, namely, each of the pressure regulators 100, 500 and the pressure regulators 604, 704, may be replaced with other pressure regulator. In other words, any one of the pressure regulators 100, 500 and the pressure regulators 604, 704 may be employed as the pressure regulator in each of the hydraulic brake systems 40, 400, 600. Thus, in each hydraulic brake system, a suitable pressure regulator may be used by taking account of a difference, among the pressure regulators, in the relationship between the pilot pressure and the regulated pressure established by each pressure regulator.

DESCRIPTION OF REFERENCE SIGNS

38: brake ECU (brake controller) 40: hydraulic brake system 50: master cylinder device 56: brake device 58: high-pressure-source device 60: pressure regulator device 70: brake pedal (brake operation member) 86: brake cylinder (pressing mechanism) 88: brake disc (rotation member) 100: pressure regulator (pressure regulator device) 102: pressure-increase linear valve (pressure regulator device) 104: pressure-decrease linear valve (pressure regulator device) 150: housing 152: first pressurizing piston (pressurizing piston) 156: input piston 172: body portion 174: flange 230: communication open/close valve (braking-mode switching mechanism, inter-chamber-communication switching mechanism) 234: low-pressure release valve (braking-mode switching mechanism, low-pressure-source-communication switching mechanism) 212: fluid passage (first fluid passage) 214: communication hole (second fluid passage) 250: housing 252: movable rod (valve mechanism) 256: reaction-force plunger (second plunger, third biasing mechanism) 258: balance piston (hollow piston) 260: reaction disc (rubber member, first biasing mechanism) 268: proximal portion (first plunger) 270: spool portion (movable member) 274: compression coil spring (first biasing mechanism) 282: communication hole (low-pressure passage) 286: communication hole (high-pressure passage) 290: fluid passage (regulated-pressure chamber) P1: pilot chamber (second biasing mechanism) R1: first pressurizing chamber (pressurizing chamber) R3: input chamber R4: opposing chamber R5: inter-piston chamber 310: valve mechanism (braking-mode switching mechanism, inter-chamber-communication switching mechanism, low-pressure-source-communication switching mechanism) 364: primary cup (check valve) 400: hydraulic brake system 402: master cylinder device 404: pressure regulator device 412: housing 414: first pressurizing piston (pressurizing piston) 418: input piston 428: inward flange (partition portion) 430: through-hole (opening) 432: body portion 434: extension portion 436: flange 500: pressure regulator (pressure regulator device) 502: housing 504: movable rod (first plunger, valve mechanism) 506: spool (movable member) 508: reaction-force plunger (second plunger, third biasing mechanism) 510: reaction-force-plunger support member (second-plunger support member) 530: first compression coil spring (first biasing mechanism) 532: second compression coil spring (second-plunger biasing member, third biasing mechanism) 534: third compression coil spring (support-member biasing member) 536: communication hole (low-pressure passage) 541: space (regulated-pressure chamber) 542: communication hole (high-pressure passage) P2: pilot chamber (second biasing mechanism) R11: front-side chamber R12: rear-side chamber R14: opposing chamber R15: inter-piston chamber 600: hydraulic brake system 602: antilock device (pressure regulator device) 604: pressure regulator (pressure regulator device) 608: master-cut valve (braking-mode switching mechanism) 610: master-cut valve (braking-mode switching mechanism) 614: pressure-increase open/close valve (braking-mode switching mechanism) 618: pressure-decrease open/close valve (braking-mode switching mechanism) 630: housing (first valve device) 632: movable rod (first plunger, second valve device) 634: valve piston (movable member, first valve device, second valve device) 636: reaction-force plunger (second plunger, third biasing mechanism) 638: reaction-force-plunger support member (second-plunger support member, third biasing mechanism) 650: first compression coil spring (first biasing mechanism) 652: second compression coil spring (second-plunger biasing member, third biasing mechanism) 654: third compression coil spring (support-member biasing member, third biasing mechanism) 662: regulated-pressure chamber (third biasing mechanism) 670: communication hole (low-pressure passage) 672: communication hole (high-pressure passage) 680: regulated-pressure passage P3: pilot chamber (second biasing mechanism) 704: pressure regulator (pressure regulator device) 730: housing (first valve device) 732: movable rod (first plunger, second valve device) 734: valve piston (movable member, first valve device, second valve device) 736: reaction-force plunger (second plunger) 738: reaction-force-plunger support member (second-plunger support member, third biasing mechanism) 756: second compression coil spring (first biasing mechanism) 758: third compression coil spring (second-plunger biasing member, third biasing mechanism) 760: fourth compression coil spring (support-member biasing member, third biasing mechanism) 768: second regulated-pressure chamber (third biasing mechanism) 770: communication hole (low-pressure passage) 772: communication hole (high-pressure passage) P4: pilot chamber (second biasing mechanism)

The invention claimed is:

1. A vehicle brake system for braking a vehicle, comprising a hydraulic brake system configured to generate a braking force in dependence on a pressure of a working fluid, a regenerative brake system configured to generate a braking force while regenerating running energy of the vehicle into electric energy, and a brake controller configured to control the vehicle brake system,
   wherein the hydraulic brake system includes:
      a brake device provided for a wheel of the vehicle and configured to generate a braking force having a magnitude that depends on the pressure of the working fluid supplied thereto;
      a master cylinder device configured to pressurize the working fluid and to supply the pressurized working fluid to the brake device;
      a brake operation member which is connected to the master cylinder device and on which a brake operation by a driver is performed;
      a high-pressure-source device configured to highly pressurize a working fluid;
      a pressure regulator device configured to regulate the working fluid highly pressurized by the high-pressure-source device and to supply the working fluid whose pressure is regulated; and
      a braking-mode switching mechanism configured to selectively effectuate, as a braking mode of the hydraulic brake system, one of (A) a regulated-pressure-dependent braking mode in which the hydraulic brake system generates a regulated-pressure-dependent braking force having a magnitude that depends on a regulated pressure that is a pressure of the working fluid supplied from the pressure regulator device, without substantially depending on an operation force applied by the driver to the brake operation member and (B) a braking mode depending on the operation force and the regulated pressure in which the hydraulic brake system generates both of an operation-force-dependent braking force having a magnitude that depends on the operation force and the regulated-pressure-dependent braking force, and
   wherein the vehicle brake system is configured (a) to brake the vehicle by the operation-force-dependent braking force and the regulated-pressure-dependent braking force, such that the braking-mode switching mechanism effectuates the braking mode depending on the operation force and the regulated pressure and such that the regenerative brake system does not generate a regenerative braking force that is the braking force generated by the regenerative brake system, at least after the brake device becomes capable of generating the braking force in a period from a time point of initiation of the brake operation to a time point when an operation amount of the brake operation member becomes constant and (b) to brake the vehicle by the regulated-pressure-dependent braking force and the regenerative braking force such that the braking-mode switching mechanism effectuates the regulated-pressure-dependent braking mode and such that the regenerative brake system generates the regenerative braking force, when the operation amount becomes constant.

2. The vehicle brake system according to claim 1,
   wherein the pressure regulator device includes a pressure regulator configured to regulate a working fluid having a high pressure and supplied from a high-pressure-source device, to a pressure in accordance with a pilot pressure introduced thereinto and configured to supply the working fluid whose pressure is regulated, and:
   wherein the pressure regulator includes:
      a housing;
      a high-pressure passage which is formed in the housing and through which the working fluid supplied from the high-pressure-source device is introduced into the housing;
      a low-pressure passage which is formed in the housing and through which the working fluid is discharged from the housing to a low-pressure source;
      a regulated-pressure chamber from which the working fluid whose pressure is regulated is supplied;
      a pilot chamber that receives the working fluid whose pressure is equal to the pilot pressure;
      a movable member provided in and supported by the housing so as to be movable in an axial direction of the housing;
      a first plunger disposed on a first-end side of the movable member so as to be movable in the axial direction of the housing, the first-end side being defined as one of opposite sides of the housing in the axial direction;
      a second plunger disposed on the first-end side or a second-end side of the movable member so as to be movable in the axial direction of the housing, the second-end side being defined as the other of the opposite sides of the housing in the axial direction;
a first biasing mechanism configured to bias the movable member toward the first-end side;
a second biasing mechanism configured to bias the movable member toward the second-end side via the first plunger by a pressure of the pilot chamber;
a third biasing mechanism configured such that, when a pressure of the regulated-pressure chamber exceeds a set pressure, the third biasing mechanism biases one of the movable member and the first plunger toward the first-end side via the second plunger by the pressure of the regulated-pressure chamber, with the second plunger held in contact with the one of the movable member and the first plunger; and
a valve mechanism configured to selectively effectuate one of: (A) a state in which communication between the high-pressure passage and the regulated-pressure chamber is shut off while communication between the low-pressure passage and the regulated-pressure chamber is established; and (B) a state in which the communication between the high-pressure passage and the regulated-pressure chamber is established while the communication between the low-pressure passage and the regulated-pressure chamber is shut off, by an action of the movable member owing to biasing forces of the first biasing mechanism, the second biasing mechanism, and the third biasing mechanism, respectively.

3. The vehicle brake system according to claim 2, wherein the second plunger is disposed on the second-end side of the movable member so as to be movable in the axial direction of the housing, and
wherein the valve mechanism is configured to effectuate:
(a) the state in which the communication between the high-pressure passage and the regulated-pressure chamber is shut off while the communication between the low-pressure passage and the regulated-pressure chamber is established, when the movable member is located at a moving end position; and (b) the state in which the communication between the high-pressure passage and the regulated-pressure chamber is established while the communication between the low-pressure passage and the regulated-pressure chamber is shut off, when the movable member moves from the moving end position toward the second-end side.

4. The vehicle brake system according to claim 3, wherein the third biasing mechanism is configured such that a ratio of an increase in the biasing force for biasing the movable member with respect to an increase in the pressure of the regulated-pressure chamber increases when the pressure of the regulated-pressure chamber exceeds a second set pressure that is higher than the set pressure.

5. The vehicle brake system according to claim 2,
wherein the regulated-pressure chamber is formed around an outer circumference of the movable member,
wherein the first biasing mechanism is configured to also bias the first plunger toward the first-end side,
wherein the valve mechanism has:
a regulated-pressure passage formed in the movable member, the regulated-pressure passage communicating, at one end thereof, with the regulated-pressure chamber and having, at the other end thereof, an opening that is open to an end face of the movable member on the first-end side; and
a structure in which an end portion of the first plunger on the second-end side is abuttable on the movable member so as to close the opening of the regulated-pressure passage, and
wherein the valve mechanism is configured to effectuate (a) a state in which communication between the high-pressure passage and the regulated-pressure chamber is shut off while communication between the low-pressure passage and the regulated-pressure chamber is established, when the movable member is located at a moving end position in a state in which the first plunger is spaced apart from the movable member and (b) a state in which the communication between the high-pressure passage and the regulated-pressure chamber is established while the communication between the low-pressure passage and the regulated-pressure chamber is shut off, when the movable member moves from the moving end position toward the second-end side in a state in which the first plunger is in abutting contact with the movable member.

6. The vehicle brake system according to claim 5, wherein the third biasing mechanism is configured such that a ratio of an increase in the biasing force for biasing the one of the movable member and the first plunger, with respect to an increase in the pressure of the regulated-pressure chamber increases when the pressure of the regulated-pressure chamber exceeds a second set pressure that is higher than the set pressure.

7. The vehicle brake system according to claim 1,
wherein the master cylinder device has:
a housing;
a pressurizing piston disposed in the housing such that there is formed, forward of the pressurizing piston, a pressurizing chamber in which the working fluid to be supplied to the brake device is pressurized, the pressurizing piston being configured to move forward in dependence on a pressure of a working fluid supplied from the pressure regulator device to the master cylinder device; and
an input piston disposed in the housing so as to be located rearward of the pressurizing piston, the brake operation member being connected to a rear end of the input piston, and
wherein the braking-mode switching mechanism is configured to effectuate the braking mode depending on the operation force and the regulated pressure by permitting transmission of the operation force from the input piston to the pressurizing piston and to effectuate the regulated-pressure-dependent braking mode by substantially prohibiting the transmission of the operation force from the input piston to the pressurizing piston.

8. The vehicle brake system according to claim 7,
wherein the pressurizing piston has a body portion and a flange portion formed around an outer circumference of the body portion,
wherein the master cylinder device has:
an input chamber which is defined by the flange portion of the pressurizing piston so as to be located rearward of the flange portion and into which the working fluid supplied from the pressure regulator device is introduced;
an annular opposing chamber defined by the flange portion of the pressurizing piston so as to be located forward of the flange portion, the opposing chamber being opposed to the input chamber with the flange portion interposed therebetween; and an inter-piston chamber defined by the body portion of the pressurizing piston and the input piston so as to be located between the pressurizing piston and the input piston, wherein a pressure receiving area of the pressurizing piston on which a pressure of a working fluid in the inter-piston chamber acts and a pressure receiving area of the pressurizing piston on which a pressure of a working fluid in the opposing chamber acts are made substantially equal to each other, wherein the braking-mode switching mechanism has an inter-chamber-communication switching mechanism configured to switch between: communication between the inter-piston chamber and the opposing chamber; and shutting off of the communication therebetween and has a low-pressure-source-communication switching mechanism configured to switch between: communication between the opposing chamber and a low-pressure source; and shutting off of the communication therebetween, and wherein the braking-mode switching mechanism is configured to:

effectuate the braking mode depending on the operation force and the regulated pressure such that the inter-chamber-communication switching mechanism shuts off the communication between the inter-piston chamber and the opposing chamber and such that the low-pressure-source-communication switching mechanism permits the communication between the opposing chamber and the low-pressure source; and effectuate the regulated-pressure-dependent braking mode such that the inter-chamber-communication switching mechanism permits the communication between the inter-piston chamber and the opposing chamber and such that the low-pressure-source-communication switching mechanism shuts off the communication between the opposing chamber and the low-pressure source.

9. The vehicle brake system according to claim 1 configured to brake the vehicle by the operation-force-dependent braking force, the regulated-pressure-dependent braking force, and the regenerative braking force, such that the braking-mode switching mechanism effectuates the braking mode depending on the operation force and the regulated pressure and such that the regenerative brake system generates the regenerative braking force, when the operation amount again changes after once having become constant.

10. The vehicle brake system according to claim 1, wherein the regenerative brake system is configured to stop generation of the regenerative braking force when a speed of the vehicle becomes equal to or lower than a set speed by the brake operation.

11. The vehicle brake system according to claim 1, wherein the brake controller is configured to:

determine a required braking force that is required for the vehicle brake system as a whole, based on a degree of the brake operation by the driver, and control at least one of the pressure regulator device and the regenerative brake system such that a sum of the regulated-pressure-dependent braking force and the regenerative braking force becomes equal to a residuary braking force that is a remainder of subtraction of the operation-force-dependent braking force from the required braking force.

12. The vehicle brake system according to claim 1, wherein the master cylinder device is configured to always pressurize the working fluid in dependence on both of the operation force and the pressure of the working fluid supplied from the pressure regulator device, wherein the braking-mode switching mechanism includes: a regulated-pressure-fluid supply switching mechanism configured to switch between supply of the working fluid from the pressure regulator device to the brake device and shutting off of the supply; and a master-pressure-fluid supply switching mechanism configured to switch between supply of the working fluid from the master cylinder device to the brake device and shutting off of the supply, wherein the regulated-pressure-fluid supply switching mechanism shuts off the supply of the working fluid from the pressure regulator device to the brake device and the master-pressure-fluid supply switching mechanism supplies the working fluid from the master cylinder device to the brake device, whereby the braking mode depending on the operation force and the regulated pressure is effectuated, and wherein the regulated-pressure-fluid supply switching mechanism supplies the working fluid from the pressure regulator device to the brake device and the master-pressure-fluid supply switching mechanism shuts off the supply of the working fluid from the master cylinder device to the brake device, whereby the regulated-pressure-dependent braking mode is effectuated.

13. A vehicle brake system for braking a vehicle, comprising a hydraulic brake system configured to generate a braking force in dependence on a pressure of a working fluid, wherein the hydraulic brake system includes:

a brake device provided for a wheel of the vehicle and configured to generate a braking force having a magnitude that depends on the pressure of the working fluid supplied thereto;

a master cylinder device configured to pressurize the working fluid and to supply the pressurized working fluid to the brake device;

a brake operation member which is connected to the master cylinder device and on which a brake operation by a driver is performed;

a high-pressure-source device configured to highly pressurize a working fluid;

a pressure regulator device configured to regulate the working fluid highly pressurized by the high-pressure-source device and to supply the working fluid whose pressure is regulated; and a braking-mode switching mechanism configured to selectively effectuate, as a braking mode of the hydraulic brake system, one of (A) a regulated-pressure-dependent braking mode in which the hydraulic brake system generates a regulated-pressure-dependent braking force having a magnitude that depends on a regulated pressure that is a pressure of the working fluid supplied from the pressure regulator device, without substantially depending on an operation force applied by the driver to the brake operation member and (B) a braking mode depending on the operation force and the regulated pressure in which the hydraulic brake system generates both of an operation-force-dependent braking force having a magnitude that depends on the operation force and the regulated-pressure-dependent braking force, and wherein the vehicle brake system configured (c) such that the braking-mode switching mechanism effectuates the regulated-pressure-dependent braking mode before the brake device becomes capable of generating the braking force in a period from a time point of initiation of the brake operation to a time point when the operation amount becomes constant and (d) such that the braking-mode switching mechanism effectuates the braking mode depending on the operation force and the regulated pressure after the brake device becomes capable of generating the braking force in the period from the time point of initiation of the brake operation to the time point when the operation amount becomes constant.

14. The vehicle brake system according to claim 13, wherein the master cylinder device has:
a housing;
a pressurizing piston disposed in the housing such that there is formed, forward of the pressurizing piston, a pressurizing chamber in which the working fluid to be supplied to the brake device is pressurized, the pressurizing piston being configured to move forward in dependence on a pressure of a working fluid supplied from the pressure regulator device to the master cylinder device; and
an input piston disposed in the housing so as to be located rearward of the pressurizing piston, the brake operation member being connected to a rear end of the input piston, and
wherein the braking-mode switching mechanism is configured to effectuate the braking mode depending on the operation force and the regulated pressure by permitting transmission of the operation force from the input piston to the pressurizing piston and to effectuate the regulated-pressure-dependent braking mode by substantially prohibiting the transmission of the operation force from the input piston to the pressurizing piston.

15. The vehicle brake system according to claim 14,
wherein the pressurizing piston has a body portion and a flange portion formed around an outer circumference of the body portion,
wherein the master cylinder device has:
an input chamber which is defined by the flange portion of the pressurizing piston so as to be located rearward of the flange portion and into which the working fluid supplied from the pressure regulator device is introduced;
an annular opposing chamber defined by the flange portion of the pressurizing piston so as to be located forward of the flange portion, the opposing chamber being opposed to the input chamber with the flange portion interposed therebetween; and
an inter-piston chamber defined by the body portion of the pressurizing piston and the input piston so as to be located between the pressurizing piston and the input piston,
wherein a pressure receiving area of the pressurizing piston on which a pressure of a working fluid in the inter-piston chamber acts and a pressure receiving area of the pressurizing piston on which a pressure of a working fluid in the opposing chamber acts are made substantially equal to each other,
wherein the braking-mode switching mechanism has an inter-chamber-communication switching mechanism configured to switch between: communication between the inter-piston chamber and the opposing chamber; and shutting off of the communication therebetween and has a low-pressure-source-communication switching mechanism configured to switch between: communication between the opposing chamber and a low-pressure source; and shutting off of the communication therebetween, and wherein the braking-mode switching mechanism is configured to:
effectuate the braking mode depending on the operation force and the regulated pressure such that the inter-chamber-communication switching mechanism shuts off the communication between the inter-piston chamber and the opposing chamber and such that the low-pressure-source-communication switching mechanism permits the communication between the opposing chamber and the low-pressure source; and
effectuate the regulated-pressure-dependent braking mode such that the inter-chamber-communication switching mechanism permits the communication between the inter-piston chamber and the opposing chamber and such that the low-pressure-source-communication switching mechanism shuts off the communication between the opposing chamber and the low-pressure source.

16. The vehicle brake system according to claim 15,
wherein the inter-chamber-communication switching mechanism has an inter-chamber-communication shutoff valve configured to permit the communication between the inter-piston chamber and the opposing chamber before the brake device becomes capable of generating the braking force and to shut off the communication between the inter-piston chamber and the opposing chamber after the brake device becomes capable of generating the braking force, in a period from a time point of initiation of the brake operation to a time point when the operation amount becomes constant, and
wherein the low-pressure-source-communication switching mechanism has a low-pressure-source communication valve configured to shut off the communication between the opposing chamber and the low-pressure source before the brake device becomes capable of generating the braking force and to permit the communication between the opposing chamber and the low-pressure source after the brake device becomes capable of generating the braking force, in the period from initiation of the brake operation to the time point when the operation amount becomes constant.

17. The vehicle brake system according to claim 16,
wherein the braking-mode switching mechanism has: a check mechanism, as the inter-chamber-communication shutoff valve, configured to permit an inflow of the working fluid from the opposing chamber to the inter-piston chamber and to prohibit an inflow of the working fluid from the inter-piston chamber to the opposing chamber; and a pressure relief mechanism, as the low-pressure source communication valve, configured to permit the communication between the opposing chamber and the low-pressure source when a pressure of the working fluid of the opposing chamber is equal to or higher than a predetermined pressure, and
wherein (a) the check mechanism permits the inflow of the working fluid from the opposing chamber to the inter-piston chamber when the brake operation is initiated and the pressurizing piston moves forward, (b) the pressure relief mechanism permits the communication between the opposing chamber and the low-pressure source when pressures of the working fluid in the inter-piston chamber and the opposing chamber become equal to or higher than the predetermined pressure by the operation force after the brake device becomes capable of generating the braking force, and (c) the check mechanism prohibits the inflow of the working fluid from the inter-piston chamber to the opposing chamber when the pressure of the working fluid in the opposing chamber becomes less than the pressure of the working fluid in the inter-piston chamber by the communication between the opposing chamber and the low-pressure source.

18. The vehicle brake system according to claim 13, wherein the brake device includes a rotation member configured to rotate together with the wheel, a friction member supported by a carrier that rotatably supports the wheel, and a pressing mechanism configured to move the friction member toward the rotation member and to thereby press the friction member onto the rotation member, in dependence on the pressure of the working fluid supplied to the brake device, and wherein the vehicle brake system is configured to generate the braking force by use of a frictional force between the rotation member and the friction member.

19. The vehicle brake system according to claim 13, further comprising:

a regenerative brake system configured to generate a braking force while regenerating running energy of the vehicle into electric energy; and a brake controller configured to control the vehicle brake system, wherein the vehicle brake system is configured to brake the vehicle by the regenerative braking force such that the regenerative brake system generates the regenerative braking force before the brake device becomes capable of generating the braking force in the period from the time point of initiation of the brake operation to the time point when the operation amount becomes constant.

* * * * *